US007034292B1

(12) United States Patent
Whitehouse et al.

(10) Patent No.: US 7,034,292 B1
(45) Date of Patent: Apr. 25, 2006

(54) MASS SPECTROMETRY WITH SEGMENTED RF MULTIPLE ION GUIDES IN VARIOUS PRESSURE REGIONS

(75) Inventors: Craig M. Whitehouse, Branford, CT (US); David G. Welkie, Branford, CT (US); Gholamreza Javahery, Branford, CT (US); Lisa Cousins, Branford, CT (US)

(73) Assignee: Analytica of Branford, Inc., Branford, CT (US)

( * ) Notice: Subject to any disclaimer, the term of this patent is extended or adjusted under 35 U.S.C. 154(b) by 0 days.

(21) Appl. No.: 10/448,495

(22) Filed: May 30, 2003

Related U.S. Application Data

(60) Provisional application No. 60/385,100, filed on May 30, 2002.

(51) Int. Cl.
*H01J 49/00* (2006.01)
*B01D 59/44* (2006.01)

(52) U.S. Cl. ....................................... 250/289; 250/281

(58) Field of Classification Search ................ 250/287, 250/289, 288, 281, 282
See application file for complete search history.

(56) References Cited

U.S. PATENT DOCUMENTS 6,011,259 A * 1/2000 Whitehouse et al. ........ 250/287
6,093,929 A * 7/2000 Javahery et al. ............ 250/282
6,204,500 B1 * 3/2001 Whitehouse et al. ........ 250/287
6,452,168 B1 * 9/2002 McLuckey et al. .......... 250/292
6,646,258 B1 * 11/2003 Russ, IV ..................... 250/292
6,700,120 B1 * 3/2004 Hager ......................... 250/292

* cited by examiner

*Primary Examiner*—John R. Lee
*Assistant Examiner*—Kalimah Fernandez
(74) *Attorney, Agent, or Firm*—Levisohn, Berger & Langsam, LLP

(57) ABSTRACT

A mass spectrometer is configured with individual multipole ion guides, configured in an assembly in alignment along a common centerline wherein at least a portion of at least one multipole ion guide mounted in the assembly resides in a vacuum region with higher background pressure, and the other portion resides in a vacuum region with lower background pressure. Said multipole ion guides are operated in mass to charge selection and ion fragmentation modes, in either a high or low pressure region, said region being selected according to the optimum pressure or pressure gradient for the function performed. The diameter, lengths and applied frequencies and phases on these contiguous ion guides may be the same or may differ. A variety of MS and $MS/MS^n$ analysis functions can be achieved using a series of contiguous multipole ion guides operating in either higher background vacuum pressures, or along pressure gradients in the region where the pressure drops from high to low pressure, or in low pressure regions. Individual sets of RF, +/−DC and resonant frequency waveform voltage supplies provide potentials to the rods of each multipole ion guide allowing the operation of ion transmission, ion trapping, mass to charge selection and ion fragmentation functions independently in each ion guide. The presence of background pressure maintained sufficiently high to cause ion to neutral gas collisions along a portion of each multiple ion guide linear assembly allows the conducting of Collisional Induced Dissociation (CID) fragmentation of ions by axially accelerating ions from one multipole ion guide into an adjacent ion guide. Alternatively ions can be fragmented in one or more multipole ion guides using resonant frequency excitation CID. A multiple multipole ion guide assembly can be configured as the primary mass analyzer in single or triple quadrupole mass analyzers with or without mass selective axial ejection. Alternatively, the multiple multipole ion guide linear assembly can be configured as part of a hybrid Time-Of-Flight, Magnetic Sector, Ion Trap or Fourier Transform mass analyzer.

29 Claims, 36 Drawing Sheets

Hexatyrosine, Resolution 3800

MASS SPECTROMETRY WITH SEGMENTED RF MULTIPLE ION GUIDES IN VARIOUS PRESSURE REGIONS

RELATED APPLICATIONS

The present application claims the priority of U.S. Patent Application No. 60/385,100 filed May 30, 2002.

FIELD OF INVENTION

This invention relates to the field of mass spectrometric analysis. More specifically it relates to the utilization of RF multipole ion guides to improve the sensitivity and functionality of mass spectrometers. Specifically, the invention relates to RF multipole ion guides configured such that that extend between two or more vacuum pressure regions, providing efficient ion transport of precursor and fragment ions through various regions of low and high pressure, and enabling different mass to charge selection and fragmentation functions to achieve $MS/MS^n$ mass to charge analysis.

BACKGROUND OF THE INVENTION

Tandem mass spectrometers are well-established tools for solving an array of analytical problems. Common analytical problems involve liquid phase samples. Some ion source types, such as electrospray ionization (ESI), atmospheric pressure chemical ionization (APCI), or inductively coupled plasma (ICP), operate at or near atmospheric pressure. These are readily coupled to separation methods such as Gas Chromatography (GC), Liquid Chromatography (LC), Capillary Electrophoresis (CE) and other solution sample separation systems. However, most mass spectrometers operate at pressures substantially below atmospheric pressure. In such cases, the ions must be transferred from a high-pressure region to a lower pressure region.

Conventionally, electrically isolated apertures are used to separate adjacent pressure regions. Voltages are applied to the apertures to focus ions into adjacent vacuum regions. Ion losses occur during ion transfer due to scattering of ions against background neutral gas. As taught by Whitehouse et.al. in U.S. Pat. No. 5,652,427 and U.S. Pat. No. 6,011,259, which is fully incorporated herein by reference, one method that overcomes such problems involves transporting ions through RF multipole ion guides that extend between vacuum regions. The RF multipole ion guides are configured with an appropriate diameter to serve as conductance limiting elements, replacing the electrically isolated apertures.

Pressurized RF multipole ion guides have been used to achieve damping of ion kinetic energy during ion transmission from Atmospheric Pressure Ionization (API) Sources to mass analyzers. Ion collisions with the neutral background gas reduce the primary ion beam kinetic energy spread. Ion transmission efficiency through the ion guide and downstream of the ion guide is improved. Additionally, because the ion energy spread is low, the apparent resolving power of quadrupole mass analyzers is improved. A quadrupole ion guide, operated in RF only mode in the presence of increased background pressures, is taught by Douglas et. al. in U.S. Pat. No. 4,963,736.

An important application of tandem mass spectrometers is the identification of molecular ions and their fragments by mass spectrometric analysis (MS and MS/MS, respectively). A tandem mass spectrometer performs molecular ion identification performed by mass-selecting a precursor ion of interest in a first stage, fragmenting the ion in a second stage, and mass-analyzing the fragment in a third stage. Tandem MS/MS instruments are either sequential in space (for example, consisting of a two quadrupole mass filters separated by a collision cell) or sequential in time (for example, a single three-dimensional ion trap). Commercial three dimensional ion traps perform multiple stages of fragmentation ($MS/MS^n$). Currently existing commercial tandem mass spectrometers typically perform one stage of fragmentation (MS/MS).

Whitehouse et. al. in U.S. Pat. No. 5,652,427 describe a hybrid mass spectrometer wherein at least one multipole ion guide is configured with a Time-Of-Flight mass analyzer, which is fully incorporated herein by reference. As described, at least one quadrupole ion guide can be operated in ion transmission, ion trapping, mass to charge selection and/or collision induced dissociation (CID) fragmentation modes or combinations thereof coupled with Time-Of-Flight mass to charge analysis. In an improvement over the prior art, Whitehouse et. al. in U.S. provisional application Ser. No. 09/322,892, which is fully incorporated herein by reference, describe multiple quadrupole ion guides operated in a higher pressure vacuum region of a hybrid TOF mass analyzer, improving the mass analyzer performance and extending the analytical capability of a hybrid TOF mass analyzer. The hybrid quadrupole Time-Of-Flight apparatus and method described allows a range of MS, MS/MS and $MS/MS^n$ to be performed in the RF multipole ion guide configuration.

In the prior art, RF multipole ion guides are configured adjacent, end-to-end, to other multipole ion guides which also extend through various vacuum regions. The pressure within the multipole ion guides reduces continuously along the ion path, creating a pressure gradient. Each subsequent RF multipole ion guide operates in a region of reduced pressure from the previous one. This prior art configuration provides the ability to perform a range of MS, MS/MS and $MS/MS^n$ at elevated pressure. As an extension of these embodiments, increased analytical functionality can be achieved by operating a mass analyzer in a low-pressure region for MS followed by another high pressure region for MS/MS.

For example, it is sometimes preferable to perform mass selection utilizing an RF/DC resolving quadrupole resolving quadrupole, which routinely operate at low pressure. RF/DC resolving quadrupoles are the most commonly used mass filters for tandem mass spectrometers, because they are easy to use, they are very stable, and they provide suitable resolving power and sensitivity. As will be described below, RF/DC resolving quadrupole resolving quadrupoles require sufficiently low pressure that the ions undergo few or no collisions with background gas molecules.

Conventionally, the RF/DC resolving quadrupole quadrupoles are followed by a higher pressure RF multipole collision cell in which precursor ions undergo CID. RF multipole ion guides are used as collision cells for MS/MS in tandem MS/MS instruments. At elevated pressure, they efficiently contain the fragments produced by collision induced dissociation (CID). They are used as collision cells for the CID fragmentation of ions in triple quadrupoles, hybrid magnetic sector and hybrid TOF mass analyzers. Usually fragmentation is induced using an accelerating DC potential. RF multipole ion guide collision cells have been incorporated in commercially available mass analyzers. Commonly, they are configured as individual ion guide assemblies with a common RF applied along the collision cell multipole ion guide length. Quadrupole ion guides and ion traps have been configured as the primary elements in single and triple quadrupole mass analyzers and as part of hybrid mass spectrometers that include Time-Of-Flight, Magnetic Sector, Fourier Transform and three dimensional quadrupole ion trap mass analyzers.

Most commonly, quadrupole ion guides with RF/DC resolving quadrupole applied to either set of pole pairs are used. The well-known equations of ion motion in a quadrupole ion guide are described by Dawson, Chapter II of "Quadrupole Mass Spectrometry and Its Applications", Elsevier Scientific Publishing Company, New York, 1976. The first stability region is determined by the solution of the Mathieu parameters q and a where:

$$a=a_x=-a_y=4zU/m\Omega^2 r_0^2 \tag{1}$$

$$q=q_x=-q_y=2zV/m\Omega^2 r_0^2 \tag{2}$$

U is the +/−DC amplitude, m is the ion mass, z is the ion charge, V is the RF (peak-to peak) amplitude, $r_0$ is the distance from the centerline to the quadrupole rod inside surface and Ω (=2πf) is the angular frequency of the applied RF field. Solutions for the equations of motion are plotted along iso-β lines as a function of q and a. Only those ions having mass to charge values that fall within operating stability region have stable trajectories in the x and y (radial) directions during ion trapping or ion transmission operating mode in a quadrupole ion guide. In low vacuum pressure quadrupole ion guide operation, mass to charge selection is typically conducted by operating near the apex of stability region where a=0.23699 and q=0.70600. The stability coefficient β can be expressed in simple terms of a and q for q<0.4, and β<0.6:

$$\beta=(a+q^2/2)^{1/2} \tag{3}$$

A more accurate definition of β, appropriate for q>0.4 and β3>0.6, given in terms of an expansion in a and q, is provided in the text by Dawson.

Typically, resolving RF/DC quadrupole ion guides are operated in background vacuum pressures that minimize or eliminate ion to neutral background gas collisions. Collisions within the RF/DC resolving quadrupole ion guide change the phase space of the ion, causing the ion to be ejected from the region of stability, and dramatically reduce the transmission efficiency. As noted by Dawson, ions with mass to charge values that fall close to the stability diagram boundary increase their magnitude of radial oscillation. As the resolving power of the RF/DC quadrupole is increased, those ions with phase space coordinates outside an acceptable limit are ejected and strike the rods. This effect is worse at elevated pressures.

A second mass- to-charge selection mode uses a range of auxiliary excitation frequencies in combination with RF or RF/DC to reject unwanted ions. Unlike resolving RF/DC quadrupoles, in this mode several mass-to-charge values can be transmitted simultaneously. Thus this approach can increase the speed of an analysis. Additionally this approach performs suitably at elevated pressure, unlike RF/DC quadrupoles. Numerous approaches using this mode have been developed for three dimensional ion traps, as described by Wells et.al. in U.S. Pat. No. 5,608,216, and references therein. For example, Wells describes an approach whereby a set of auxiliary frequencies is applied to a three dimensional ion trap to eject unwanted ions, and the RF is scanned over a small range of voltage to modulate the ion secular frequency, bringing it into resonance with the applied auxiliary frequency.

Auxiliary excitation is usually performed using dipolar or quadrupolar excitation, and can be performed with or without +/−DC applied the rods. When no DC is applied, the x and y component of the secular motion are identical; there is no differentiation between the A pole (where +DC is applied) and B pole (where −DC is applied). When resolving DC is applied, the ion motion in the x direction moves to higher frequency, and the motion in the y direction moves to lower frequency, and eventually at the apex of the stability diagram βx~1 and βy~0. In general, the fundamental ion motion (n=0) is given by $$\omega_0=\Omega/2 \tag{4}$$

which can be expressed in terms of a and q for β<0.6 by the relation:

$$\omega_0=(a_u+q_u^2/2)^{1/2}\Omega_0/\sqrt{2} \tag{5}$$

Higher order components, expressed in terms of β, are:

$$\omega_{-1}=(1-\beta 2)\Omega \text{ for } n=-1 \tag{6}$$

$$\omega_{+1}=(1+\beta 2)\Omega \text{ for } n=+1 \tag{7}$$

$$\omega_{-2}=(2-\beta/2)\Omega \text{ for n=}-2\text{, etc.} \tag{8}$$

In dipolar excitation, an auxiliary voltage typically is superimposed on one pole of a pair (the A pole or the B pole) while the other pole is referenced to ground. For dipolar excitation, the fundamental resonance n=0 is excited at or near $$\overline{\omega}_x=\frac{\beta_x\Omega}{2};$$

$$\overline{\omega}_y=\frac{\beta_y\Omega}{2}$$

Thus dipole excitation applied along the A-pole results in a notch in $\omega_x$, and applied along the B-pole, a notch in $\omega_y$. For a=0, $\beta_x=\beta_y$ and therefore:

$$\overline{\omega}_x=\overline{\omega}_y=\frac{\beta\Omega}{2} \tag{9}$$

The subsequent ion motion is driven along the direction of the resulting dipole. When dipole excitation is applied to both pairs of rods (the A pole and the B pole), the ion motion is directed along some angle between the rods, depending on the selected phase between the two dipoles. The direction of ion motion can be determined by the vector sum of the forces along each axis. At a phase of 90°, the ion motion rotates about the axis, and this rotation can be useful in cases where it is desirable to prevent the ion from crossing the axis. Additionally, the ion energy is much more uniform than the other trajectories, where there is a large variation in energy due to the large periodic variations in radial amplitude.

For quadrupolar excitation, an additional, small amplitude quadrupolar voltage is superimposed on the larger amplitude quadrupolar voltage that is applied to the A and B poles:

$$V_A=C'\sin(2\omega' t+\phi) \text{ and} \tag{10}$$

$$V_{B=C}'\cos(2\omega' t+\phi) \tag{11}$$

Sudakov, et. al discussed in detail the theoretical basis for the resonance structure (JASMS, 1999, 11, 10). The most efficient excitation occurs for resonances for n=1 and K=1 at frequencies:

$$\frac{2\varpi_x}{K=1} = \frac{(1 \pm \beta)_x \Omega}{}; \frac{2\varpi_y}{K=1} = \frac{(1 \pm \beta)_y \Omega}{} \tag{12}$$

where the secular frequency is still defined as $\omega_x$ and $\omega_y$. Rearranged, this gives the resonances for quadrupolar excitation:

for a≠0

$$2\omega_x,\ \Omega-2\omega_x,\ \Omega+2\omega_x \tag{13}$$

$$2\omega_x,\ \Omega-2\omega_x,\ \Omega+2\omega_x \tag{14}$$

and for a=0

$$2\omega,\ \Omega-2\omega,\ \Omega+2\omega \tag{15}$$

In the simplest case excitation can occur at three distinct frequencies. The ion motion obtained by quadrupolar excitation is determined by the original position and momentum of the ion as it enters the quadrupole. Unlike dipole excitation there is no forced directionality. Thus the set of ions undergo a wide spread of trajectories. Commonly a is set to 0, and either dipolar excitation is used, exciting $\omega_0$, or quadrupolar excitation is used, exciting $2\omega_0$, $\Omega-2\omega_0$, or $\omega+2\omega_0$. Providing a small value of a permits better definition of the low q stability edge and improved definition of the high mass cut-off point.

Dipolar excitation is sometimes preferable to quadrupolar excitation, in part because of the fewer number of resonances, and in part because the ion motion is readily controlled, since the ion is driven along the axis of the applied dipole rather than moving with the quadrupolar field. In some applications, dipolar and quadrupolar excitation is used simultaneously in order to take advantage of the different range of excitation frequencies, the different trajectory patterns, or the different rates of radial excitation. Franzen (US patent, check) utilized combinations of dipolar and quadrupolar excitation in three dimensional traps. Additionally, quadrupole electrode structures can be constructed to contribute a small fraction of higher order field components to the primarily hyperbolic field, as described for three dimensional ion traps permitting an alternative method to affect the rate of radial excitation and ejection.

Although the radial excitation techniques described above are often performed at elevated pressure In ion guides or traps, the mass selectivity for continuous beams is superior at reduced pressure. At elevated pressure, the ion experiences collisional damping caused by energy loss due to momentum changing collisions with the background gas. The amplitude used for excitation must be increased to accommodate the energy loss due to collisions. High amplitude excitation yields poorer selectivity than low amplitude excitation for the same secular frequency, due to excitation of off-resonant frequencies near the secular motion of the ion.

As is also well known in the art, a third mass-to-charge selection mode for rejection of ions at some m/z values and selection of others is the use of high-q, low mass cut-off and low-q, high mass cutoff. Often a small amount of +/−DC is applied to the rods to enhance the definition of the stability edge, particularly for low-q. Here too the mass selectivity is best when the ion encounters few or no collisions.

Therefore, this invention is an extension of the prior art described in U.S. patent application Ser. No. 09/322,892, where the multiple RF multipole ion guides are positioned end-to-end along a continuously dropping pressure. In particular, the prior art does not provides means for low pressure mass-to-charge selection followed by high pressure CID. The present invention comprises multiple RF multipole ion guides, positioned end-to-end, with pressure suitably low in one RF multipole ion guide to provide functions such as mass-to-charge selection, followed by pressure suitably high in another RF multipole ion guide, to provide functions such as CID, and with multiple RF ion guides that extend between the various pressure regions, replacing electrostatic apertures.

Quadrupole ion guides, as described by Brubaker in U.S. Pat. No. 3,410,997, Thomson et. al. in U.S. Pat. No. 5,847,386 and Ijames, Proceedings of the 44th ASMS Conference on Mass Spectrometry and Allied Topics, 1996, p 795 have been configured with segments or sections where RF voltage generated from a single RF supply is applied to all segments of the ion guide assembly or rod set. Ijames describes operating the quadrupole assembly in RF only ion transport and trapping mode. The offset potential applied to segments of an ion guide can be set to trap ions within an ion guide section or segment as well. Douglas in U.S. Pat. No. 5,179,278 describes a quadrupole ion guide configured to transmit ions from an Atmospheric Pressure Ionization (API) source into a three dimensional quadrupole ion trap. The quadrupole ion guide described by Douglas in U.S. Pat. No. 5,179,278 can be operated as a trap to hold ions before releasing ions into the three dimensional quadrupole ion trap. During ion trapping, the potentials applied to the rods or poles of this quadrupole ion guide can be set to limit the range of ion mass to charge values released to the ion trap. The quadrupole ion guide can also be operated with resonant frequency excitation for collisional induced dissociation fragmentation of trapped ions prior to introducing the trapped fragment ions into the three dimensional ion trap. After the quadrupole ion guide has released all its trapped ion population to the three dimensional ion trap, it is refilled during the three dimensional ion trap mass analysis time period. Dresch et. al. in U.S. Pat. No. 5,689,111, which is fully incorporated herein by reference, describe a hybrid multipole ion guide Time-Of-Flight (TOF) mass spectrometer wherein the multipole ion guide is configured and operated to trap ions and release a portion of the trapped ions into the pulsing region of the TOF mass analyzer.

A conventional instrument configuration for tandem MS/MS and CID uses RF multipole ion guides for mass analysis. FIG. 1 illustrates a conventional triple quadrupole mass spectrometer. In conventional triple quadrupole mass analyzers, as shown in FIG. 1, single mass to charge range is selected in the first analytical quadrupole by applying appropriate RF and +/−DC potentials to the quadrupole rods. This is also the case for hybrid quadrupole TOF mass analyzers, where the third quadrupole in a triple quadrupole has been replaced by a TOF mass analyzer. Other mass analyzers, such as three dimensional ion traps, hybrid magnetic sector and Fourier Transform (FTMS) mass analyzers, also have been configured to perform MS/MS analysis. CID in triple quadrupoles and hybrid quadrupole-TOF mass analyzers is achieved by acceleration of ions along the quadrupole axis into a collision cell referred to herein as DC acceleration CID fragmentation. Ions are generally accelerated with a few to tens of eV in quadrupole DC acceleration CID fragmentation. Ion traps and FTMS mass analyzers perform MS/MS analysis, however, ion CID fragmentation is performed with relatively low energy resonant frequency excitation. Hybrid or tandem magnetic sector mass analyzers can perform high energy DC acceleration ion fragmentation with ions accelerated into collision cells with hundreds or even thousands of electron volts.

Conventionally, in a mass spectrometer that must transport ions through multiple vacuum stages from atmospheric to low pressure, electrostatic lenses with small apertures are positioned between the moderate and low vacuum chambers to permit differential evacuation as well as ion transport into the low pressure region. Typically, a first RF multipole ion guide is oeprated in a moderate pressure region (1–100 mtorr), substantially reducing the kinetic energy spread and angular distribution of the ions. However, as the ions are focused through the electrostatic aperture, their energy and angular distribution becomes perturbed by collisions. Conventionally, in the lower pressure vacuum stage, the ions are then transported through the RF plus +/−DC quadrupole ion guide for mass to charge selection. However, scattering collisions encountered through the electrostatic lenses prior to entering the RF plus +/−DC resolving quadrupole increases the phase space of the ion beam, reducing its compatibility to the phase space entrance requirements. Therefore sensitivity and resolving power are reduced. Conventionally, commercially available mass spectrometers use RF Brubaker lenses in between the electrostatic lens and the resolving quadrupole in an attempt to recover losses. Similarly, CID is often performed in an RF multipole collision cell that is enclosed by electrostatic apertures. Ions are accelerated into a high pressure region through the first electrostatic aperture. The subsequent fragment ions are extracted out of the RF multipole collision cell by the second electrostatic aperture. Scattering collisions are agin encountered, reducing the transmission of the ion beam as well as increasing the phase space of the beam, making it less compatible for the final mass analyzer.

A diagram of the multipole ion guide configuration of a conventional triple quadrupole mass analyzer 1 interfaced to Atmospheric Pressure Ion source 2 is shown in FIG. 1. Individual multipole ion guide assemblies 3, 4, 5 and 6 are aligned along the same centerline axis in a three stage vacuum pumping system. Capillary 7 provides a leak from atmospheric pressure Electro spray ion source 2 into first vacuum pumping stage 8. Ions produced in Electro spray source 2 are transferred into vacuum through a supersonic free jet expansion formed on the vacuum side of capillary exit 9. A portion of the ions are directed through the including orifice in skimmer 10, multipole ion guide 3, the orifice in electrode 11, multipole ion guide 4, the orifice in electrode 12, multipole ion guide 5, the orifice in electrode 13, multipole ion guide 6, the orifice in electrode 14 to detector 15. The pressures in vacuum stages 8, 16 and 17 are typically maintained at 0.5 to 4 torr, 1 to 8 millitorr and $<1\times10^{-5}$ torr respectively while the pressure inside collision cell 18 is maintained at 0.5 to 8 millitorr. Triple quadrupoles are configured to perform MS or a single MS/MS sequence mass analysis functions. In an MS/MS experiment, ions produced at or near atmospheric pressure, are transported through multiple vacuum stages to the low pressure vacuum region 17 where mass to charge selection occurs in quadrupole 4 with little or no ion to neutral collisions. Mass to charge selected ions are then accelerated through an electrostatic aperture into a region of elevated pressure in collision cell multipole ion guide 5. The resulting fragment ion population is extracted through yet another electrostatic aperture and is directed into quadrupole 6 residing in low pressure vacuum region 17. Mass to charge selection is conducted on the ion population traversing quadrupole 6 with few or no ion to neutral collisions prior to detection of stable trajectory ions exiting quadrupole 6 by ion detector 15. Quadrupole 4 is configured with RF only sections 19 and 20 at its entrance and exit end respectively. Quadrupole 6 is shown with RF only section 21 at its entrance. In commercially available hybrid quadrupole TOF mass analyzers quadrupole 6 is replaced by a TOF mass analyzer residing in a fourth vacuum pumping stage. Commonly, in this case the ions are extracted directly from collision cell 5, using electrostatic apertures and grid lenses, into the TOF.

The invention disclosed herein is an improvement over the prior art described in FIG. 1. In FIG. 1, electrodes 11, 12 and 13 are used extract ions from a higher pressure region to low pressure region 17. These incur sensitivity losses due to scattering. In this invention, an RF multipole ion guides replaces the differential pumping aperture into an RF/DC resolving quadrupole. This preserves the phase space of the ion beam, and improves the resolution-transmission characteristics of the resolving mass analyzer.

In this invention, multipole ion guides replace the differential pumping apertures within the collision cell, and are of sufficient diameter to limit conductance through the collision cell entrance and exit. The invention herein greatly reduces scattering losses that occur due to extraction of the ion beam from collision cell 5, and preserves the ion beam quality.

It is important to have a well-defined beam, of low radial divergence, for mass analysis by the TOF. In the example in FIG. 1, ions are extracted from collision cell 5 into the TOF, using electrostatic apertures and grid lenses. In the invention disclosed herein, an RF multipole ion guide is configured to extend between a high pressure region of the RF multipole collision cell and one or more low pressure regions adjacent to the entrance of a TOF, or other mass analyzers. Thus ions are smoothly transported out of collision cell 5 and into the lower pressure regions by use of the exit RF multipole ion guide, with few scattering losses. Similarly this invention provides the ability to decouple the extraction of ions from the higher pressure collision cell from the process of ion transport into the TOF, or other mass analyzer region, providing a well-defined beam with appropriate phase space conditions following the collision cell.

Finally, this invention provides additional forms of CID. For example, CID can be achieved by accelerating the ions in regions of pressure gradients. In particular it is possible to induce fragmentation in the RF multipole ion guide a portion of which is positioned in the collision cell. In this case the ions can fragmented in a higher pressure region, near the exit of the collision cell, but only undergo one or two collisions with substantially little cooling thereafter. In such cases there can be reduced internal relaxation through collisions, and it may be possible to generate new fragmentation pathways.

This invention comprises RF multipole ion guide configurations contained in regions of low and high pressure, as well as in regions of the pressure gradients. Multiple RF multipole ion guides are positioned end-to-end, and extend continuously between high and low pressure regions, and between low and high pressure regions. As discussed above, there are numerous functions that may be optimally performed at low pressure. In this invention, the RF multipole ion guide is configured to permit mass to charge selection in either a low pressure or high pressure region, or in a region of pressure gradient. Additionally, additional functions such as low pressure CID can be performed by operating within pressure gradients.

The present invention has a variety of advantages, including improving the RT characteristics of an RF/DC resolving quadrupole, improving the entrance beam profile for a TOF or other mass analyzer, decoupling CID processes from ion transport, and permitting new functionality within ion guides, as will discussed below. This invention, also provides improved mass to charge isolation and selection. Resonant excitation isolation techniques are more selective using lower amplitudes at low pressure. Lower amplitudes reduce the power requirement, which saves complexity, cost and development cost. The present invention provides MS, MS/MS and MS/MS$^n$ mass analysis functions suitable for resolving RF/DC quadrupole mass filters, single or multiple ion mass-to-charge selection, axial DC acceleration CID ion fragmentation or resonant frequency excitation CID ion fragmentation.

Additionally, eliminating the electrostatic lenses between multipole ion guide assemblies increases ion transmission efficiency and allows ions to be efficiently directed forward and backward between quadrupole ion guide assemblies with high throughput. The functions of ion transfer, ion trapping and ion release are highly efficient. For example, ions can be released from one end of an ion guide assembly or segment simultaneously while ions are entering the opposite end of the ion guide assembly or individual segment. Due to this feature, an RF multipole ion guide receiving a continuous ion beam while operating in trapping mode can selectively release all or a portion of the ions located in the ion guide into another ion guide, ion guide segment or another mass analyzer that performs mass analysis on the released ions. Ion populations can be released from one end of an ion guide or ion guide segment operating in single pass or ion trapping mode simultaneously while ions are entering the opposite end of the multipole ion guide or individual segment. A segmented ion guide receiving a continuous ion beam can selectively release only a portion of the ions located in the ion guide into another multipole ion guide or other mass analyzer that performs mass analysis on the released ions. In this manner ions delivered in a continuous ion beam are not lost in between discrete mass analysis steps.

It is, therefore, an object of this invention to provide an improved multiple RF multipole configuration utilizing RF multipole ion guides that extend between various vacuum regions, with one RF multipole ion guide in the center held at reduced pressure, followed by another RF multipole ion guide held at elevated pressure. This permits the additional functionality, for example low pressure mass-to-charge selection followed by CID at elevated pressure.

It is another object of this invention to provide means for efficiently transporting ions from atmospheric pressure to vacuum, by means of RF multipole ion guides that extend between the high and low pressure regions, and to provide means of transporting ions through pressurized RF multipole ion guides, by means of one or more RF multipole ion guides that extend between a low pressure region and an elevated pressure region of the RF multipole collision cell.

It is, therefore, a further object of this invention to provide an improved means of transporting ions through pressurized RF multipole ion guides, by utilizing one or more RF multipole ion guides that extend between a low pressure region and an elevated pressure region of the RF multipole collision cell.

SUMMARY OF THE INVENTION

The present invention comprises means for MS, MS/MS and MS/MS$^n$ mass analysis functions with RF plus +/−DC or resonant excitation, single or multiple value quadrupole mass to charge selection, single or multiple axial DC acceleration CID ion fragmentation or resonant frequency excitation CID ion fragmentation, with relatively few losses. Efficient bidirectional transport of ions along the axis of a multiple quadrupole assembly allows a wide range analytical functions to be run on a single instrument. A series of multiple RF multipole ion guides is configured adjacent to each other, some or all of which extend continuously through multiple pumping stages. The RF multipole ion guides are configured end-to-end, eliminating or reducing the number of electrostatic lenses between ion guides. In the present invention, multiple RF multipole ion guides are configured in various pressure regions in such a way that the pressure may be controllably increased or decreased along a portion of the ion path. Numerous forms of mass selection and fragmentation can be performed (MS, MS/MS and MS/MS$^n$) in the various pressure regions.

Each RF multipole ion guide can be operated in trapping mode, mass to charge selection mode and CID ion fragmentation mode using RF, +/−DC and applied resonant frequency waveforms. Ions trapped in an RF multipole ion guide are free to move along the ion guide axis. The term two dimensional trapping is used when referring to trapping in multipole ion guides. As will become apparent in the description of the invention given below, two dimensional ion trapping in multipole ion guides allows increased analytical flexibility when compared with three dimensional ion trap operation. MS/MS$^n$ analysis functions can be performed using resonant frequency excitation or DC acceleration CID fragmentation or combinations of both. The invention allows the full range of analytical three dimensional ion trap and triple quadrupole functions in one instrument and allows the performing of additional mass analysis functions not available with current mass analyzers.

The invention, as described below, includes a number of embodiments. Each embodiment contains at least one multipole ion guide positioned and operated in a lower pressure region where few or no collisions occur, and additional ion guides positioned either upstream and/or downstream in a higher background pressure vacuum region where multiple collisions between ions and neutral background gas occur. Although the invention can be applied to multipole ion guides with any number of poles, the descriptions that entail mass to charge selection will primarily refer to quadrupole ion guides.

Each embodiment comprises one multipole ion guide that extends continuously across two or more pressure regions, such that at least one portion of its length is positioned in a higher pressure region, another portion is positioned in a lower pressure region, and a pressure gradient is created and contained within the ion guide.

The embodiments described below comprise multiple RF multipole ion guides configured adjacent and end-to-end, in a variety of configurations. Each RF multipole ion guide comprises a set of poles, as described below, of particular length and diameter. The embodiments described below include all the various combinations of multipole ion guides diameters and lengths. For example, along the multiple RF ion guide, some of the RF multiple ion guides may consist of large diameter rods and long lengths; others may consist of smaller diameter rods and shorter lengths; yet others may consist of large diameter rods and short lengths, and so forth.

Multipole ion guides are typically configured with an even set of poles, 4 poles (quadrupole), 6 poles (hexapole), 8 poles (octapole) and so on. Odd number multipole ion guides have also been described but have not been commonly used in commercial instruments. Quadrupoles, hexapoles and octapoles operating with RF only voltages applied have been configured as multipole ion guides in mass spectrometer instruments. An RF multipole ion guide configured with a higher numbers of poles, operated in RF only mode, can transfer a wider range of ion mass to charge values in a stable trajectory than an RF multipole ion guide configured with a lower number of poles. The multipole ion guides described in the invention can be configured with any number of poles.

One embodiment comprises quadrupole ion guides that have pole dimensions considerably reduced in size from quadrupole assemblies typically found in commercially available triple quadrupoles or hybrid quadrupole TOF mass analyzers. The reduced quadrupole rod or pole diameters, cross center rod spacing ($r_0$) and length minimizes the ion transmission time along each quadrupole assembly axis. This increases the analytical speed of the mass spectrometer for a range of mass analysis functions. The reduced quadrupole size requires less space and voltage to operate, decreasing system size and cost without decreasing performance.

The invention can be configured with several types of ion sources, however, the embodiments of the invention described herein comprise mass analyzers interfaced to atmospheric pressure ion sources including but not limited to Electrospray, APCI, Inductively Coupled Plasma (ICP) and Atmospheric Pressure MALDI. In the embodiments described, one source of background gas in the multipole ion guides configured in higher pressure vacuum regions is from the Atmospheric Pressure Ion source itself.

In another aspect of the invention, embodiments of the invention can be configured in single or triple quadrupole mass analyzers or configured in hybrid three dimensional ion trap, Magnetic Sector, Fourier Transform and Time-Of-Flight mass analyzers interfaced to atmospheric pressure ion sources or ion sources that produce ions in vacuum.

One embodiment of the invention includes RF-only quadrupole ion guides configured between each analytical quadrupole assembly to minimize any transmission losses. In another aspect of the invention, the RF only quadrupoles may be configured as RF only segments of each quadrupole assembly, capacitively coupled to the adjacent quadrupole ion guide RF supply. In yet another aspect of the invention, the junctions between individual quadrupole assemblies are located in the higher pressure vacuum region where little or no axial pressure gradient exists at the junction between quadrupole assemblies. Ion collisions with the background gas serve to damp stable ion trajectories to the quadrupole centerline where fringing field effects between quadrupoles are minimized. This collisional damping of ions trajectories by the background gas aids in maximizing ion transmission in the forward and backward direction between individual quadrupole ion guide assemblies even when different applied RF, DC and secular frequency AC fields are present between adjacent quadrupoles.

In another embodiment of the invention, the quadrupole ion guide is configured in a vacuum region with background pressure maintained sufficiently low to remove collisional effects, and using the analytical quadrupole ion guide, positioned in the lower pressure vacuum region, operated in either RF plus +/−DC mode in trapping mode or single pass ion transmission mode, or in single or multiple mass to charge selection mode using resonant excitation and ejection techniques.

In another embodiment of the invention, the quadrupole ion guide series is configured in a vacuum region with at least one ion guide with a background pressure maintained sufficiently low to substantially reduce collisional effects, and another contiguous ion guide maintained at a moderate or high pressure, and using the quadrupole ion guide positioned in the lower pressure vacuum region, operated in either RF plus +/−DC mode in trapping mode or single pass ion transmission mode, or in single or multiple mass to charge selection mode using resonant excitation and ejection techniques, and/or axial acceleration CID and/or resonant frequency CID ion fragmentation mode with or without stopping a continuous primary ion beam.

Another embodiment of this invention comprises alternate CID functions in the lower pressure ion guides and in pressure gradients within ion guides.

In another embodiment of the invention, the quadrupole ion guide series is configured in a vacuum region with at least one ion guide with a background pressure maintained sufficiently low to substantially reduce collisional effects, and another contiguous ion guide maintained at a moderate or high pressure, and using the quadrupole ion guide positioned in the lower pressure vacuum region, operated in either RF plus +/−DC mode in trapping mode or single pass ion transmission mode, or in single or multiple mass to charge selection mode using resonant excitation and ejection techniques, and/or axial acceleration CID and/or resonant frequency CID ion fragmentation mode with or without stopping a continuous primary ion beam.

Another preferred embodiment comprises an RF multipole ion guide positioned end to end, with at least one ion guide in the center of the assembly held at low pressure , and with at least one ion guide positioned behind at elevated pressure.

Another embodiment comprises an RF multipole ion guide positioned end to end with the ability to increase pressure in one, several or all ion guides.

Another preferred embodiment comprises a pressurized RF multipole ion guide, and at least one RF multipole ion guide configured with a sufficiently small diameter to limit conductance through the collision cell entrance or exit, replacing one or both collision cell apertures. The diameter, length, frequency and number of poles of this RF multipole ion guide can vary. It can be positioned in various regions along the pressure gradients of the collision cell.

In another embodiment of the invention, the quadrupole ion guide is configured in a vacuum region with background pressure maintained sufficiently high to cause collisional damping of the ions traversing the ion guide length. Each analytical quadrupole ion guide, positioned in the higher or lower pressure vacuum region, can be operated in RF plus +/−DC mode, trapping mode, single pass ion transmission mode, single or multiple mass to charge selection mode and/or resonant frequency CID ion fragmentation mode with or without stopping a continuous primary ion beam.

In another embodiment of the invention, the quadrupole ion guide is configured in a vacuum region with background pressure maintained sufficiently high to cause collisional damping of the ions traversing the ion guide length. Each resolving quadrupole ion guide, positioned in a lower pressure vacuum region, can be operated in trapping mode, single pass ion transmission mode, single or multiple mass to charge selection mode and/or resonant frequency CID ion fragmentation mode with or without stopping a continuous primary ion beam.

In another embodiment of the invention, a low pressure quadrupole ion guide is operated to achieve single or multiple mass to charge range selection by ejected unwanted ions traversing or trapped in the quadrupole volume defined by the inner rod radius ($r_0$) and rod length. Unwanted ions are ejected by applying resonant or secular frequency waveforms to the ion quadrupole rods over selected time periods with or without ramping or stepping of the RF amplitude.

In yet another embodiment of the invention ion, +/−DC potentials are applied to the poles of the quadrupole ion guide during mass to charge selection. The +/−DC potentials are applied to the quadrupole rods or poles while ramping or stepping the RF amplitude and applying resonant frequency excitation waveforms to eject unwanted ion mass to charge values.

In another embodiment of the invention, at least one quadrupole ion guide positioned in a higher pressure region and operated in mass to charge selection and/or ion CID fragmentation mode is configured as a segmented or sectioned multipole ion guide. The segmented ion guide may include two or more sections where the RF voltage is applied to all segments from a common RF voltage supply. In one embodiment of the invention at least one segment of the segmented quadrupole is operated in RF only mode while at least one other segment is operated in mass to charge selection and/or CID ion fragmentation mode. Individual DC offset potentials can applied to each segment independently allowing trapping of ions in the segmented quadrupole assembly or moving of ions from one segment to the an adjacent segment.

In another embodiment, multiple RF multipole ion guides configured in a vacuum region of elevated background vacuum pressure wherein each quadrupole can be operated in mass to charge selection and/or ion fragmentation modes to achieve MS/$MS^n$ mass analysis functions.

In another embodiment, the analytical functionality of triple quadrupoles, three dimensional ion traps and hybrid quadrupole TOF mass analyzers are configured into a single instrument. The invention includes but is not limited to resonant frequency CID ion fragmentation, DC acceleration CID fragmentation even for energies over one hundred eV, RF and +/−DC mass to charge selection, single or multiple mass range RF amplitude and resonant frequency ion ejection mass to charge selection, ion trapping in quadrupole ion guides and TOF mass analysis.

Using the mass analysis capabilities described, the hybrid quadrupole TOF according to the invention can operated with several combinations of MS/$MS^n$ analysis methods. For example, MS/$MS^n$ where $n>1$ can be performed using DC acceleration fragmentation for each CID step or combinations of resonant frequency excitation and DC acceleration CID ion fragmentation. Ion trapping with mass to charge selection or CID ion fragmentation can be performed in each individual quadrupole assembly without stopping a continuous ion beam. These techniques, according to the invention, as described below increase the duty cycle and sensitivity of a hybrid quadrupole-TOF during MS/MS experiments.

In one embodiment of the invention, the electrostatic lens separating two adjacent multipole ion guide assemblies is replaced by independent RF only quadrupole segments, either capacitively coupled to adjacent ion guides, or driven by an individual RF supply.

In one embodiment of the invention, individual quadrupole ion guide assemblies require separate RF, +/−DC and supplemental resonant or secular frequency voltage supplies to achieve ion mass to charge selection, CID ion fragmentation and ion trapping mass analysis functions.

One aspect of the invention is the configuration of multiple quadrupole assemblies along a common axis with no electrode partitions in between. Each quadrupole assembly configured according to the invention can individually conduct mass selection, CID fragmentation and trapping of ions. One or more multiple vacuum stage quadrupole assemblies can be configured, according to the invention in a multiple quadrupole assembly. Multiple vacuum stage multipole ion guides have been described by Whitehouse and Dresch et. al. in U.S. Pat. Nos. 5,652,427, 5,689,111 and U.S. patent application Ser. No. 08/694,542.

Alternatively, MS/$MS^n$ analysis can be performed with or without trapping of a continuous ion beam during mass selection and ion fragmentation steps. The hybrid quadrupole-TOF configured according to the inventions is a lower cost bench-top instrument that includes the performance capabilities described in U.S. Pat. Nos. 5,652,427 and 5,689,111 and U.S. patent application Ser. Nos. 08/694,542 and 60/021,184, which are fully included herein by reference. Emulation and improved performance of prior art API triple quadrupole, three dimensional ion trap, TOF and hybrid quadrupole TOF mass analyzer functions can be achieved with the hybrid quadrupole TOF mass analyzer configured according to the invention. The assemblies of multiple quadrupole ion guides configured according to the invention can be interfaced to all mass analyzer types, tandem and hybrid instruments and most ion source types that produce ions from gas, liquid or solid phases.

In another embodiment of the invention, individual multipole ion guide assemblies are configured along a common centerline where the junction between two ion guides is positioned in a higher pressure vacuum region. Ion collisions with the background gas on both sides the junction between two axially adjacent multipole ion guides serve to damp stable ion radial trajectories toward the centerline where fringing fields are minimized. Minimizing the fringing fields effects at the junction between two multipole ion guides maximizes forward and reverse direction ion transmission efficiency between multipole ion guides. An electrostatic lens may or may not be positioned between two adjacent quadrupole assemblies.

In another aspect of the invention, no electrode is configured in the junction between two adjacent quadrupole ion guides configured along the common quadrupole axis. The two adjacent quadrupole assemblies, configured according to the invention have the same radial cross section pole dimensions and pole elements are axially aligned at the junction between the two quadrupole ion guides. Each quadrupole assembly has an independent set of RF, resonant frequency, +/−DC and DC offset voltage supplies. In another aspect of the invention, common RF frequency and phase and common DC polarity is maintained on adjacent and axially aligned poles of adjacent axially aligned quadrupole ion guides. The RF amplitude, resonant frequency waveforms, +/−DC amplitude and the DC offset potentials applied to the poles of adjacent quadrupole ion guides can be independently adjusted for each quadrupole ion guide assembly. Adjustment of relative DC offset potentials allows ions with stable trajectories to move in the forward or reverse direction between two adjacent quadrupoles with high transmission efficiency due to minimum fringing field effects.

In another aspect of the invention, at least one segmented quadrupole ion guide assembly is configured in axial alignment with another quadrupole ion guide assembly where the junction between the two quadrupole ion guide assemblies is positioned in a region of higher background pressure. The junction between the adjacent quadrupole ion guides may or may not be configured with an additional electrode. Alternatively, the junction between two adjacent quadrupole assemblies is configured with an axially aligned quadrupole assembly operated in RF only mode. RF and DC potentials are supplied to this junction quadrupole from power supplies independent from those supplying the two adjacent quadrupole assemblies.

In another aspect of the invention at least one quadrupole ion guide that extends continuously into multiple vacuum pumping stages is configured in axial alignment adjacent to another quadrupole ion guide assembly.

It is another aspect of the invention that at least one section of at least one quadrupole in the above listed axially aligned quadrupole combinations is operated in a lower pressure region.

It is another aspect of the invention that at least one section of at least one quadrupole in the above listed axially aligned quadrupole combinations is operated in mass to charge selection and/or CID ion fragmentation mode. Mass to charge selected ions traversing one quadrupole assembly can be accelerated from one quadrupole into an adjacent quadrupole through an offset voltage amplitude difference sufficient to cause CID ion fragmentation. The background gas present in the region of the junction between the two adjacent quadrupole ion guides serves as the collision gas for ions axially accelerated from one quadrupole ion guide into the next. Forward or reverse direction ion acceleration with sufficient offset voltage amplitude differential applied between quadrupole assemblies can be used to fragment ions through DC acceleration Collisional Induced Dissociation.

At least one section of each quadrupole ion guide configured in a multiple quadrupole axially aligned assembly is configured to operate in ion trapping or single pass ion transmission mode, single or multiple mass to charge selection mode and resonant frequency CID ion fragmentation modes. MS/MS$^n$ analytical functions can be achieved by running mass to charge selection in conjunction with DC acceleration CID ion fragmentation. DC acceleration fragmentation is achieved by accelerating mass to charged ions in the forward or reverse direction between adjacent ion guides. Alternatively, ions can be fragmented using resonant frequency excitation CID fragmentation in the volume defined within an ion guide segment in at least one quadrupole ion guide configured in the axially aligned set of quadrupoles. Combinations of mass to charge selection with DC acceleration and resonant frequency excitation CID fragmentation can be run in the axially aligned multiple quadrupole ion guide assembly configured in a higher pressure vacuum region to achieve a wide range of MS/MS$^n$ analytical functions.

In one aspect of the invention, the final mass analysis step in an MS/MS$^n$ analysis sequence can be conducted using a quadrupole mass analyzer. A dual quadrupole ion guide assembly can be configured according to the invention as part of a triple quadrupole mass analyzer. Alternatively, a three quadrupole ion guide assembly can be configured according to the invention encompassing the entire triple quadrupole mass analyzer MS and MS/MS functionality operated with continuous ion beams delivered from an Atmospheric Pressure Ion source.

In another embodiment of the invention, a multiple quadrupole ion guide axially aligned assembly wherein at least one junction between two adjacent ion guides is located in a higher pressure vacuum region, is configured with a TOF mass analyzer. At least one quadrupole ion guide in the multiple quadrupole assembly is configured to be operated in mass to charge selection and/or CID ion fragmentation mode. In one aspect of the invention, the TOF mass analyzer is configured and operated to conduct mass analysis of product ions formed in any step of a MS/MS$^n$ analytical sequence. Single step MS/MS analysis can be achieved by first conducting a mass to charge analysis step and second an ion fragmentation step with resonant frequency excitation or DC acceleration CID within the multiple quadrupole ion guide assembly configured according to the invention. The mass to charge analysis of the resulting MS/MS product ions is conducted in the Time-Of-Flight mass analyzer. The mass to charge selection and ion fragmentation steps in the MS/MS analysis can be conducted with or without ion trapping and without stopping the primary in beam. MS/MS$^n$ analysis, where n>1, can be achieved by conducting sequential mass to charge selection and ion fragmentation steps using the multiple quadrupole ion guide assembly configured according to the invention. Different methods for conducting mass to charge selection and ion fragmentation can be combined in a given MS/MS$^n$ sequence wherein the final mass to charge analysis step or any interim mass analysis step is conducted using the TOF mass analyzer. In one embodiment of the invention, an API source is interfaced to the multiple quadrupole TOF hybrid mass analyzer configured according to the invention.

In yet another embodiment of the invention, a segmented ion guide wherein at least one segment extends continuously into multiple vacuum pumping stages is configured with a TOF mass analyzer. At least one segment of the multiple vacuum pumping stage segmented multipole ion guide is configured to conduct ion mass to charge selection and CID fragmentation with or without trapping of ions.

In one embodiment of the invention comprises at least one multiple vacuum stage segmented quadrupole ion guide is included in a multiple quadrupole ion guide assembly configured with a TOF mass analyzer. MS/MS$^n$ analytical functions can be achieved by conducting one or more ion mass to charge selection and CID fragmentation steps in the multiple quadrupole ion guide assembly prior to conducting mass to charge analysis of the product ion population using the Time-Of-Flight mass analyzer.

In one embodiment of the invention, the size of the quadrupole assembly is reduced resulting in decreased cost and size of a bench top API multiple quadrupole-TOF mass analyzer.

In one aspect of the invention, the multiple quadrupole TOF hybrid mass analyzer can be operated whereby ion mass to charge selection and fragmentation can be conducted in a manner that can emulate the MS and MS/MS mass analysis functions of a triple quadrupole mass analyzer. Alternatively, the same multiple quadrupole TOF hybrid mass analyzer can be operated whereby ion trapping, with single or multiple steps of ion mass to charge selection and ion fragmentation can be conducted in a manner that can emulate the MS and MS/MS$^n$ mass analysis functions of three dimensional ion traps mass analyzers.

In addition, the same multiple quadrupole TOF mass analyzer configured according to the invention can be operated with MS and MS/MS$^n$ mass analysis functions that can not be conducted triple quadrupoles, three dimensional ion traps or by other mass spectrometers described in the prior art.

In another embodiment of the invention, multiple quadrupole ion guide assemblies configured and operated according to the invention, are included in hybrid Fourier Transform, three dimensional ion trap or magnetic sector mass spectrometers. In one embodiment of the invention, segmented multipole ion guides that extend continuously into multiple vacuum pumping stages are configured with Fourier Transform, three dimensional ion trap or magnetic sector mass analyzers.

DESCRIPTION OF THE INVENTION

Figure 1:
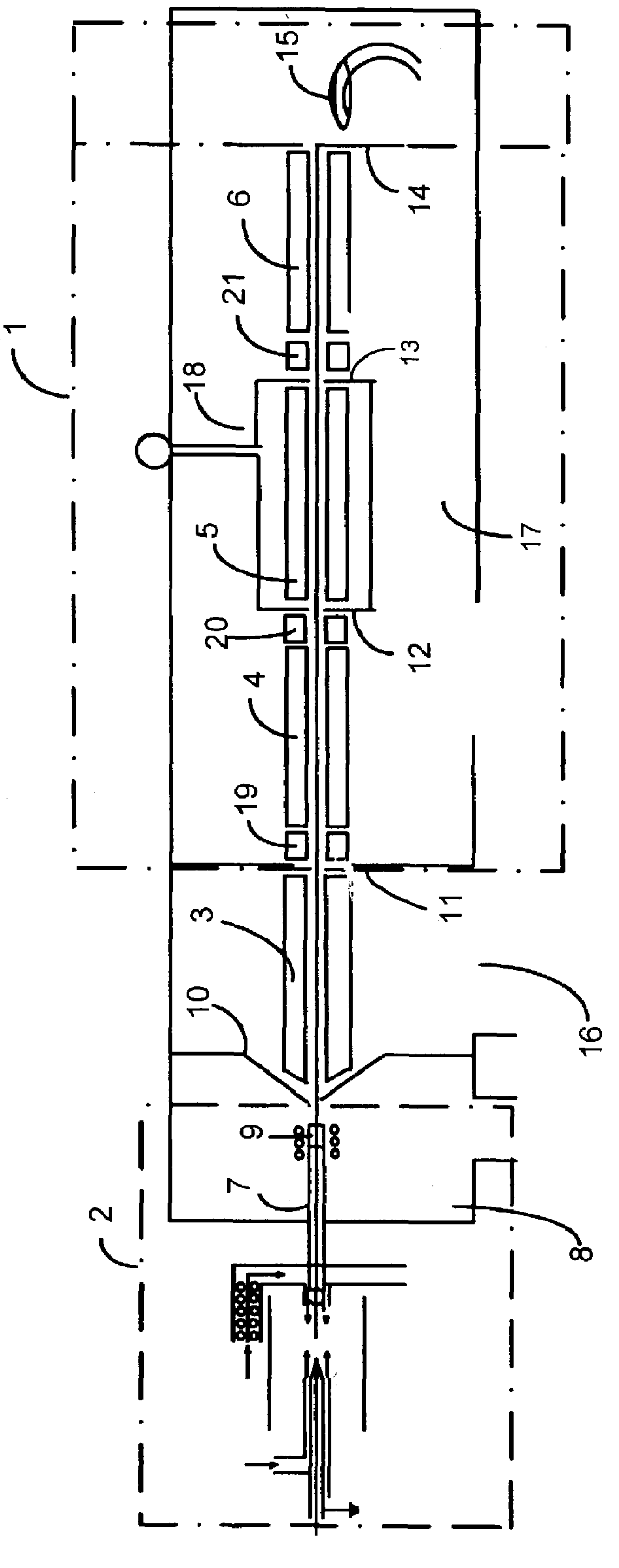
FIG. 1 illustrates an electrospray ion source triple quadrupole mass spectrometer configured with four quadrupole ion guides and an electron multiplier detector positioned in series along a common axis.

An RF multipole ion guide that extends continuously from one vacuum pumping stage into at least one additional vacuum pumping stage configured in a mass analyzer apparatus has been described in U.S. Pat. No. 5,652,427. Ion trapping within an RF multipole ion guide coupled with release of at least a portion of the ions trapped within the multipole ion guide followed by pulsing of the released ions into the flight tube of a Time-Of-Flight mass analyzer flight tube is described in U.S. Pat. No. 5,689,111. The operation of an RF multipole ion guide configured in an API TOF mass analyzer to achieve MS and MS/MS analytical capability has been described in U.S. patent application Ser. No. 08/694,542. The operation of a variety of configurations with multiple ion guides primarily in high pressure regions has been described in patent Ser. No. 09/322,892. Operating a portion of an RF multipole ion guide in higher background pressure in an API MS system to improve ion transmission efficiencies has been described in U.S. Pat. Nos. 5,652,427 and 4,963,736. Operating an RF multipole ion guide in a high pressure region or a region in which the pressure gradient extends from high to low pressure has been described in patent application Ser. No. 09/322,892.

Segmented or non segmented multipole ion guides which extend continuously from one vacuum pumping stage into another in an atmospheric pressure ion source mass spectrometer instrument, can efficiently transport ions over a wide range of background pressures, and can deliver ions from an atmospheric pressure ion source to a mass analyzers including but not limited to TOF, FTMS, quadrupoles, triple quadrupoles, magnetic sector or three dimensional ion traps. Alternatively, assemblies of segmented or non segmented multipole ion guides configured with at least portion of the multiple ion guide assembly positioned in a higher vacuum pressure region can be operated directly as a mass analyzer with MS and MS/MS analytical capability.

The present invention, described in the following sections, utilizes adjacent multipole ion guides that extend continuously throughout various higher and/or lower pressure regions, providing additional mass spectrometer functions and function effectiveness over prior art. The invention includes new embodiments of multipole ion guides, new configurations of multiple ion guide assemblies and their incorporation into mass analyzers with new methods of operating said multipole ion guides and mass analyzers. Single section or segmented multipole ion guide assemblies can be configured such that at least one segment extends from one vacuum pumping stage continuously into at least one adjacent vacuum pumping stage. Multipole ion guides that extend into more than one vacuum stage are configured with relatively small inner diameters (small $r_0$) to minimize the neutral gas conductance from one vacuum stage to the next. Minimizing gas conductance reduces vacuum pumping costs for a given background target pressure.

In one aspect of the invention, individual multipole ion guides are configured as axially aligned assemblies, with one or several ion guide assemblies extending between multiple pressure regions, and with one or several ion guides positioned in a high pressure region, and with one or several ion guides positioned in a low pressure region. This configuration permits the utilization of several distinct physical processes within one ion guide. Each stage has an impact on the analytical performance of the mass spectrometer, and can improve the performance when utilized optimally. For example, in the higher pressure region, the ions experience multiple collisions with the background gas, which reduce the radial and axial kinetic energy of the ion beam. As the gas flows toward lower pressure, a pressure gradient is produced within the ion guide. This provides a changing rate of collisions, which permits the ability to control competing processes, such as energy deposition vs. collisional damping, for example, eventually freezing one or more processes at various positions along the ion guide. Finally, the other section of the same ion guide is positioned in a region where few or no collisions occur, permitting the performance of a function without perturbing the frozen state of the ion.

In the present invention, analytical functions such as collision-induced dissociation (CID) that are performed in a pressurized collision cell or region benefit from the use of continuous ion guides extending through various pressure regions. Typically a collision cell is configured with an entrance and exit aperture that serves the dual purpose of differential pumping and electrostatic focussing. As discussed previously, the electrostatic lens tends to cause scattering losses in moderate pressure regions, reducing ion transmission. In the present invention, single section or a segmented multipole ion guide assemblies are configured such that one or more segments extend continuously from the entrance and/or exit of the collision cell, into the lower pressure vacuum regions, enhancing total ion transmission and increasing mass spectrometer functionality.

Some advantages of the invention, as will be discussed below, include: improved RT characteristics of an ion beam transmitted into an RF/DC quadrupole mass filter from a high pressure (1–10T) region; improved RT characteristics of ion beam transmitted into an RF/DC quadrupole mass filter from a collision cell; enhanced decoupling of multiple functions such as CID and collisional cooling; improved mass to charge selection; and enhanced CID functions such as high efficiency, near single collision CID.

At the same time, many other advantages of multiple ion guides are utilized. For example, an important feature of adjacent ion guides operating in ion trapping mode is that ions can be released from one end of an ion guide assembly or segment simultaneously while ions are entering the opposite end of the ion guide assembly or individual segment. Due to this feature, an RF multipole ion guide receiving a continuous ion beam while operating in trapping mode can selectively release all or a portion of the ions located in the ion guide into another ion guide, ion guide segment or another mass analyzer that performs mass analysis on the released ions. As was described above, an important feature of multipole ion guides is that ions in stable trajectories can be released from one end of an ion guide or ion guide segment operating in single pass or ion trapping mode simultaneously while ions are entering the opposite end of the multipole ion guide or individual segment. Due to this feature, a segmented ion guide receiving a continuous ion beam can selectively release only a portion of the ions located in the ion guide into another multipole ion guide or other mass analyzer that performs mass analysis on the released ions. In this manner ions delivered in a continuous ion beam are not lost in between discrete mass analysis steps.

Multipole ion guides have been used for a wide range of functions including the transport of ions in vacuum and for use as ion traps, mass to charge filters and as a means to fragment ion species. An RF multipole ion guide comprises a set of parallel electrodes, poles or rods evenly spaced at a common radius around a center point. Sinusoidal voltage RF potentials and +/−DC voltages are applied to the ion guide rods or electrodes during operation. The applied RF and DC potentials are set to allow a stable ion trajectory through the internal volume of the rod length for a selected range of mass to charge (m/z) values. These same RF and DC voltage potentials can be set to cause an unstable ion trajectory for ion mass to charge values that fall outside the operating stability window. An ion with an unstable trajectory will be radially ejected from the ion guide volume by colliding with a rod or pole before the ion traverses the ion guide length.

Multipole ion guides are typically configured with an even set of poles, 4 poles (quadrupole), 6 poles (hexapole), 8 poles (octapole) and so on. Odd number multipole ion guides have also been described but have not been commonly used in commercial instruments. Quadrupoles, hexapoles and octapoles operating with RF only voltages applied have been configured as multipole ion guides in mass spectrometer instruments. An RF multipole ion guide configured with a higher numbers of poles, operated in RF only mode, can transfer a wider range of ion mass to charge values in a stable trajectory than an RF multipole ion guide configured with a lower number of poles. The multipole ion guides described in the invention can be configured with any number of poles.

Due to the performance differences in multipole ion guides with different numbers of poles, a suitable choice of ion guide will depend to a large measure on its application. For example, where ion mass to charge selection is desired, higher resolving power can be achieved with quadrupoles when compared to mass to charge selection performance of hexapoles or octapoles.

Quadrupole ion guides operated as mass analyzers or mass filters have been configured with round rods or with the more ideal hyperbolic rod shape. In an ideal quadrupole ion guide the pole shapes would be hyperbolic but commonly, for ease of manufacture, round rods are used. For a given internal rod to rod spacing ($r_0$), the effective entrance acceptance area through which an ion can successfully enter the multipole ion guide without being rejected or driven radially out of the center volume, increases with an increasing number of poles. Where an assembly of individual multipole ion guides are configured, a mixture of quadrupole and hexapole or octapoles may be preferred for optimal performance. The same RF, auxiliary AC and DC potentials are applied to opposite pole sets for most quadrupole operating modes. Adjacent poles have the same RF frequency and amplitude but a phase difference of 180 degrees. When the offset or common DC potential is subtracted, adjacent poles generally have the same amplitude but opposite polarity DC potentials applied. In addition to the drive RF, single or multiple resonant frequency AC waveform voltages can be applied to the quadrupole rods to achieve ion mass to charge selection and ion fragmentation functions. A common DC offset can be applied to all rods. The primary RF, opposite +/−DC, common DC and resonant frequency AC potentials can be applied simultaneously or individually to the poles of a segmented quadrupole ion guide to achieve a range of analytical functions.

As discussed in patent Ser. No. 09/322,892, single or multiple mass to charge selection can be achieved by applying a combination of RF and DC potentials; specific resonant frequencies at sufficient amplitude to reject unwanted ion m/z values; variable RF frequency or amplitude with or without +/−DC; or combinations of these techniques, at low and/or high pressure. Those portions of multiple quadrupoles located in the higher pressure region or within pressure gradients can also be configured to operate in ion transfer, ion trapping, and collisional induced dissociation fragmentation modes as well as m/z selection mode or with any combination of these individual operating modes.

Mass to charge selection in higher pressure regions can provide the advantage that ions are slowed in both r and z directions by collisions with the background gas. Ions spending increased time in the multipole ion guide are exposed to an increased number of RF cycles. In this manner higher resolving power can be achieved for shorter multipole ion guide lengths than can be attained using a quadrupole mass analyzer with the more conventional method of operating in low background pressure collision free single pass non trapping mode. Additionally, ions can be slowed as they are delivered from a high pressure region to a low pressure region, and the collisions that result from the pressure gradient can aid the resolving power when operating low pressure mass to charge filters. For example, ions can be trapped in low pressure quadrupoles by cooling in the gaseous pressure gradients established either downstream or upstream or both, at one or both ends, of the quadrupole ion guide. The +/−DC can correspond to the stability tip, or it can be reduced to prevent any scattering losses at the tip, and resonant excitation such as quadrupolar or dipolar excitation can be used to eject ions within the small stability region. In this way higher resolving power can be achieved even with low pressure quadrupoles.

Multipole ion guide rod assemblies have been described by Thomson et. al. in U.S. Pat. No. 5,847,386 that are configured with segmented, non parallel or conical rods operated in RF only mode, producing an asymmetric electric field in the z or axial direction during operation. This axial electric field can aid in pushing the ions through the length of the ion guide more rapidly than can be achieved with a parallel set of non segmented rods for a given application. Conical or asymmetric rod assemblies can be used in some embodiments of the invention where RF only operation is used for a given multipole ion guide assembly. In an effort to limit the number of embodiments presented, the invention will be described for multipole ion guides configured with parallel rod or electrode ion guide assemblies. Axial fields within a given multipole ion guide assembly are applied as described in some embodiments using RF only entrance and exit pole sections or segments.

The multipole ion guide assemblies can operate individually and jointly in both trapping and non trapping modes with DC acceleration fragmentation and resonant frequency excitation CID fragmentation and mass to charge selection with RF and +/−DC and resonant frequency ejection of unwanted ions. Optimal quadrupole geometries, segmentation, gas pressure and composition, RF and +/−DC amplitudes and secular frequencies applied and the timing of applying RF, +/−DC and auxiliary potentials may not be the same for each analytical function mentioned below and will vary with the mass to charge of an ion of interest. In cases where the ion guides serve as differential pumping tubes, the ion quadrupole geometries are optimized for conductance limit.

A preferred embodiment of the invention includes a hybrid API source-quadrupole-TOF mass analyzer, comprising: an API source; an assembly of seven quadrupole ion guides with at least one ion guide operated in a lower pressure region for mass to charge selection, and at least one ion guide operated in a higher pressure region for fragmentation; and a Time-of-Flight mass analyzer. A multiple quadrupole ion guide assembly configured according to the invention in such a hybrid API source quadrupole TOF mass analyzer allows the conducting of a wide range of MS and $MS/MS^n$ analytical functions with high sensitivity, high resolving power and high mass measurement accuracy. Patent application Ser. No. 09/322,892 describes in detail MS, MS/MS, and MS/MSn functions of multipole ion guides held at high pressure.

These functions are directly applicable to the invention here, which relates to a range of low and high pressures. Another preferred embodiment comprises a multiple RF multipole ion guide assembly, positioned end to end, with the pressure at entrance of ion guide sufficiently high where ion collisions with background gas occurs, permitting effective ion beam cooling, and with at least one ion guide in the center of the assembly being evacuated to low pressure where effectively no ion collisions occur. All of the non-trapping and trapping methods for MS and MS/MSn capability described in patent application Ser. No. 09/322,892 are applicable, plus additional capability, such as low pressure RF plus +/−DC resolving capability near the stability tip ($\beta x=1,\beta y=0$) and isolation and excitation methods within multiple pressure gradients within the ion guide assemblies.

The second configuration is the assembly of individual quadrupole ion guides that extend either continuously from regions of low pressure to high pressure, or regions high pressure to low pressure, or both, including continuous extensions within pressurized ion guides to evacuated regions, and including regions of pressure gradients within the ion guides which extend between adjacent regions of differential pressure.

The third configuration described is the assembly of adjacent segmented quadrupoles that contain at least on segment that continuously extends between two regions of differential pressure.

The fourth configuration described is an ion guide assembly with discretely variable ro that extends continuously through contiguous vacuum regions.

The embodiments can be operated to perform the API MS mass analysis functions similar to conventional single quadrupole mass analyzers operated in low vacuum pressure. Although the hybrid instrument as described includes a TOF mass analyzer, an FTMS, magnetic sector, three dimensional ion trap or quadrupole mass analyzer can be substituted for the Time-Of-Flight mass analyzer.

PREFERRED EMBODIMENT

Figure 2A:
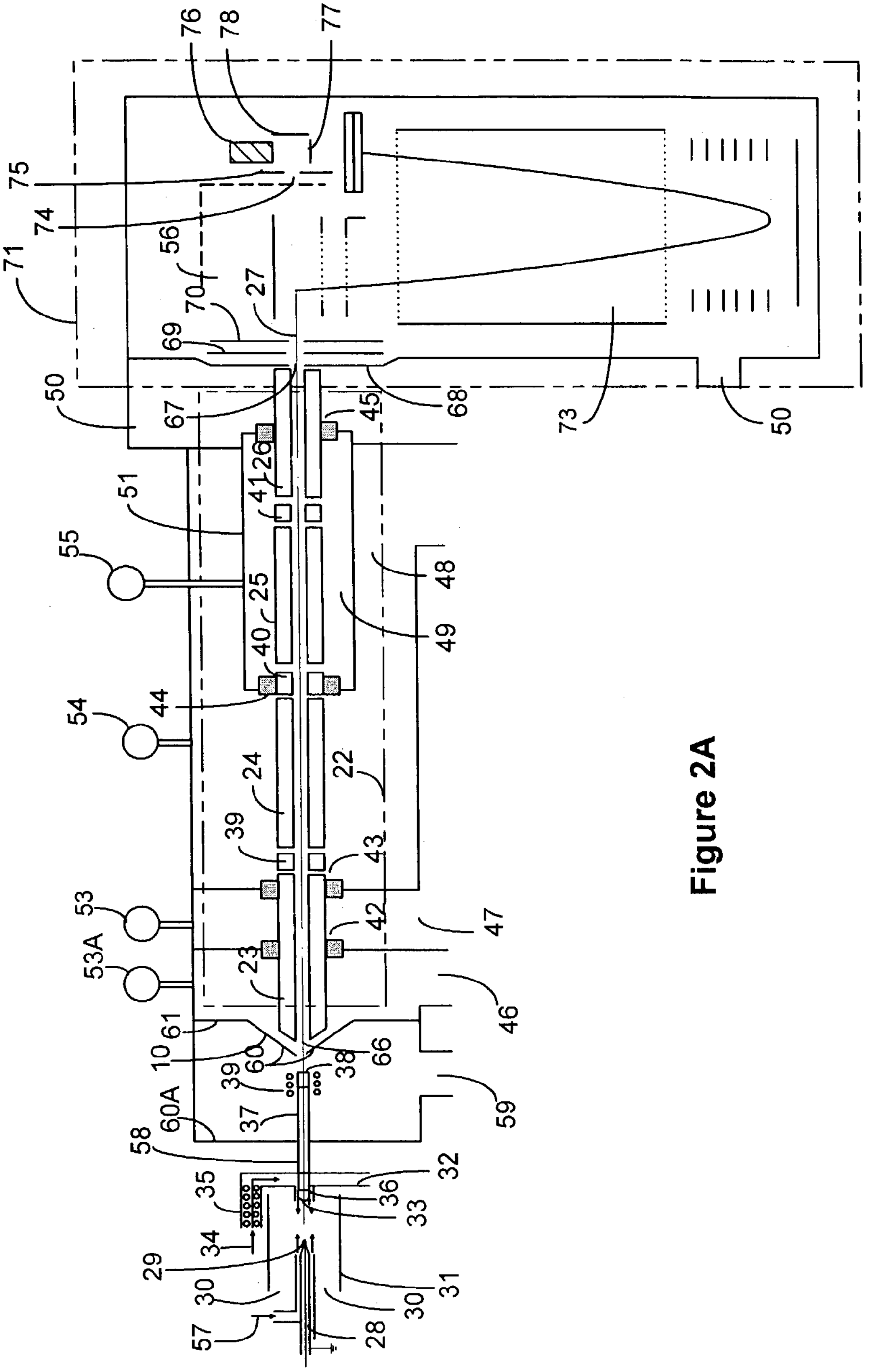
FIG. 2A illustrates an electrospray ion source orthogonal pulsing Time-Of-Flight mass analyzer with an ion reflector configured with seven multipole ion guides positioned in series along a common axis, and six differentially pumped vacuum regions. The first, fourth and seventh multipole ion guides extend continuously from a high pressure region to a lower pressure region. The first ion guide extends continuously through two vacuum regions.

A preferred embodiment of the invention is illustrated in FIG. 2A. A linear assembly 22 of four independent quadrupole ion guides 23, 24, 25 and 26 and three smaller quadrupole ion guide segments 39, 40 and 41 are positioned along common axis 27 and are configured in a six vacuum pumping stage hybrid API source-multiple quadrupole TOF mass analyzer. (Each quadrupole ion guide 23, 24, 25 and 26 and three quadrupole ion segments 39, 40 and 41 comprise four parallel electrodes, poles or rods equally spaced around a common centerline 27. Each electrode of ion guide 23 has a tapered entrance end contoured to match the angle of skimmer 10. The junctions 42 and 43 are positioned in stages that separate vacuum stages 46, 47 and 48. Ion guide 23 is of appropriate design with sufficient diameter and length to restrict the pumping through the vacuum chamber junctions 42 and 43, for differential pumping in regions 46, 47 and 48. An electrostatic lens is neither used for differential pumping nor to separate the ion guides in space. Segment 39 of ion guide 24 separates in space ion guide 23 from ion guide 24 and serves as an ion gate for trapping and release of ions in ion guide 23. Similarly the junctions 44 and 45 separate higher pressure regions 49 within the collision cell assembly 51 using ion guide 40 and 26 of appropriate diameter and length to restrict the pumping through the vacuum chamber junctions 44 and 45. Segment 40 separates in space ion guide 24 from ion guide 25, and ion guide segment 41 separates ion guide 25 and 26 and serves as an ion gate for trapping and release of ions in ion guide 23. Ion guide section 40 extends continuously through the cell junction 44 into the vacuum chamber region 48, and ion guide 26 extends continuously through the collision cell junction 45 into the vacuum chamber region 49. The TOF, Time-Of-Flight mass analyzer, configured in sixth vacuum stage 52. Vacuum stages 59, 46, 47, 48, 50 and 51 are typically maintained at pressures 0.5 to 3 torr, 0.1 to 10 mTorr, $0.5–5\times10^{-4}$ torr, $0.005–5\times10^{-3}$ torr, 1 to $8\times10^{-5}$ torr and 0.1 to $5\times10^{-7}$ torr respectively.

Multiple valves 53A, 53, 54, and 55 located in vacuum region 46, 47, 48 and collision cell 51 can be used to increase or shut off excess gas for various operations. For example, it may be desirable to operate at slightly elevated pressure (e.g. 1e–4 torr) in region 48 to perform multiple mass to charge selection in ion guide 24 using resonant excitation methods with or without trapping, for example in cases where high throughput is required and the product ions are well known.

Figure 3:
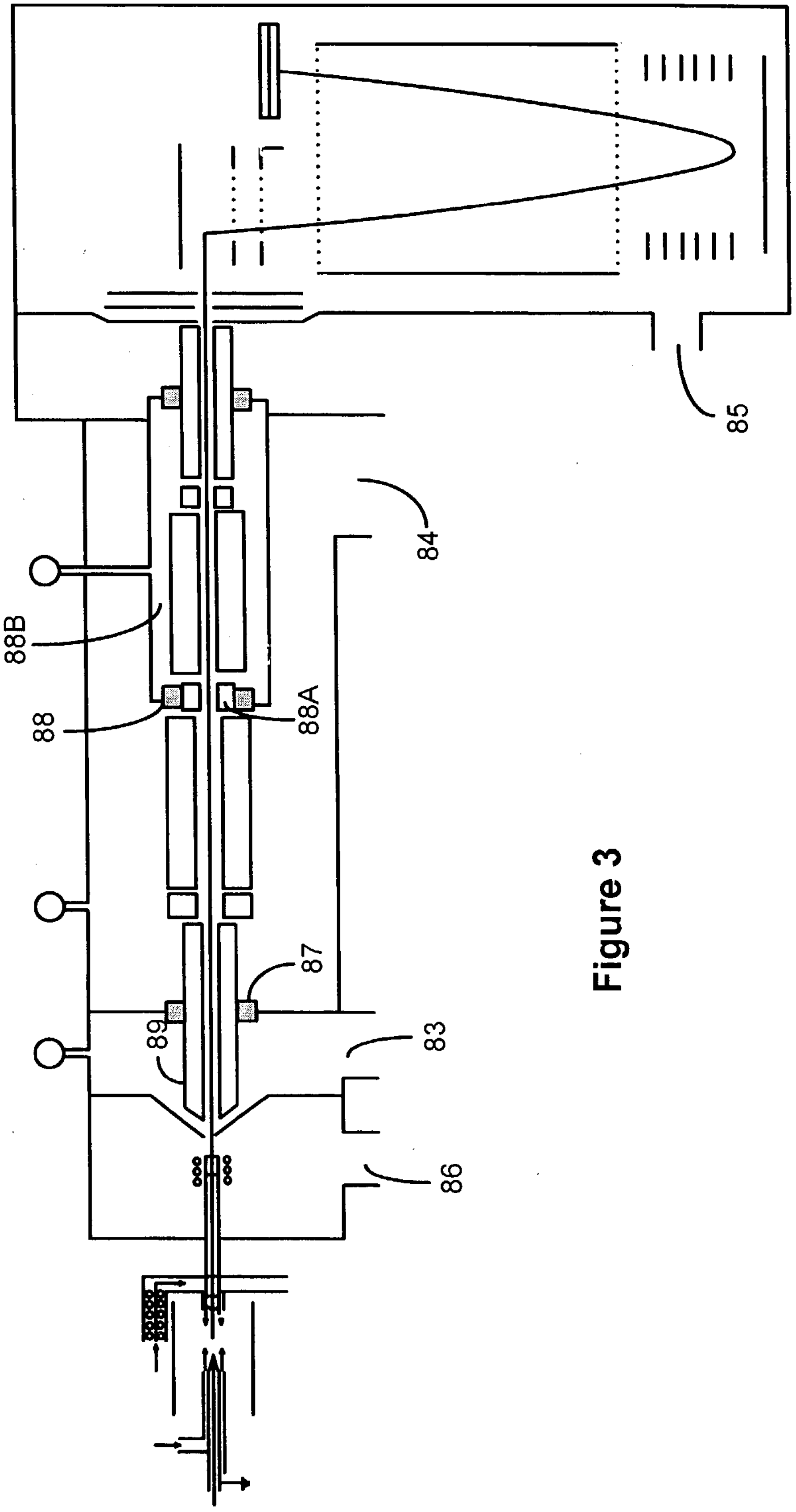
FIG. 3 illustrates an electrospray ion source orthogonal pulsing Time-Of-Flight mass analyzer with an ion reflector configured with seven multipole ion guides positioned in series along a common axis, and five differentially pumped vacuum regions. The first, fourth and seventh multipole ion guides extend continuously from a high pressure region to a lower pressure region.

Although FIG. 2A demonstrates a six pumping stage device with a continuous extension of ion guide 23 through vacuum chambers 46 and 47 and junctions 42 and 43, which is appropriate for a particular combination of ion guide diameters, lengths and vacuum pumping speeds, the number of stages as such can vary from one to several depending on the particular combination of rod dimensions and pump speed. Similarly, although ion guide 26 extends into collision cell regions 49 and vacuum stage 50 through junction 45, any number of vacuum junctions and regions may be used for a particular configuration, from either the entrance or exit of the collision cell. For example, FIG. 3 illustrates a representation of the linear ion guide with five vacuum regions 86, 83, 84 and 85 with typical pressures of 2 torr, 5 mTorr, 1x10-5 torr, 1x10-6 torr, and 1x10-7 torr, respectively. Junction 87 is electrically insulated supporting ion guide 89 which extends the two vacuum regions 83 and 84 with minimum conductance of neutral gas. Junction 88 is an electrical insulator supporting ion guide section 88A which extends from inside collision cell region 88B into vacuum pumping stage 84.

Figure 4A:
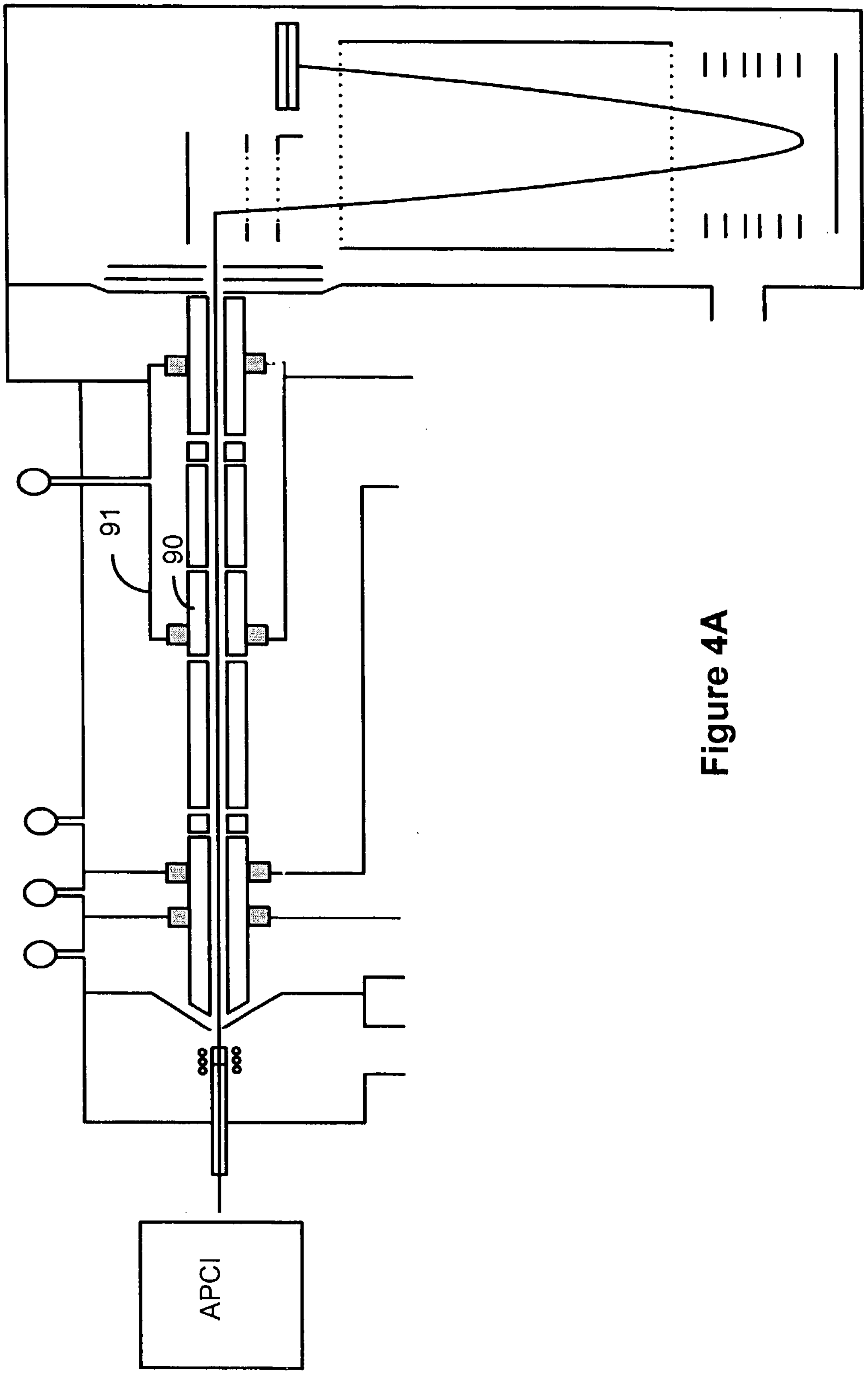
FIG. 4A illustrates an RF multipole ion guide with an ion guide protruding into the collision cell.
Figure 4B:
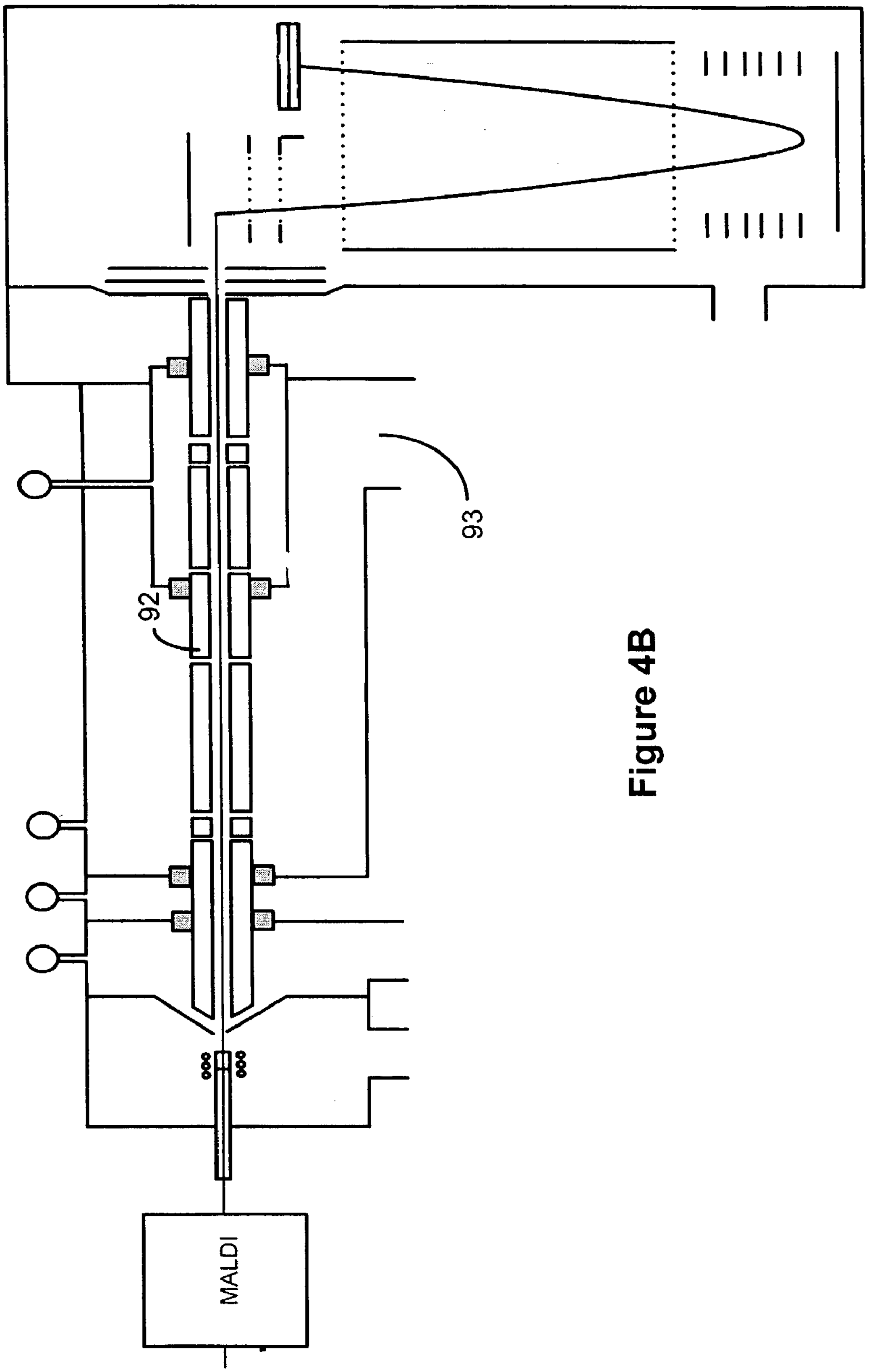
FIG. 4B illustrates an RF multipole ion guide with an ion guide protruding into a low pressure region.

The lengths of each ion guide section may vary. For example the length and the degree to which the ion guide extends into or through various pressure gradients can be selected judiciously on the basis of conductance considerations, desired transit time within a particular pressure region, and desired pressure gradients. FIG. 4*a* displays a similar configuration as shown in FIG. 2 except that ion guide 90 in FIG. 4*a* has been extended to protrude deeply into collision cell 91. Alternatively, as shown in FIG. 4*b*, the configuration can be designed to permit ion guide 92 to extend more deeply into the lower pressure region 93.

As stated earlier, any number of multipoles, any frequency, with any radial cross section, may be used for this invention, as long as it is suitable for the pumping requirements. In some cases quadrupole rods may be preferable to provide additional functionality is possible such as m/z selection, and the collisional focusing tends to create a narrower beam profile.

Electrospray probe 28, illustrated in FIG. 2A is configured to direct solution flow rates to probe tip 29 ranging from below 25 nl/min to above 1 ml/min. Alternatively, the API MS embodiment illustrated in FIG. 2 can be configured with an Atmospheric Pressure Chemical Ionization (APCI) source, an Inductively Coupled Plasma (ICP) source, a Glow Discharge (GD) source, an atmospheric pressure MALDI source or other atmospheric pressure ion source types. API sources may be configured with multiple probes or combinations of different probes in one source. Ion sources that operate in vacuum or partial vacuum including but not limited to chemical Ionization (CI), Electron Ionization (EI), Fast Atom Bombardment (FAB), Flow FAB, Laser Desorption (LD), Matrix Assisted Laser Desorption Ionization (MALDI), Thermospray (TS) and Particle Beam (PB) can also be configured with the hybrid mass analyzer apparatus illustrated in FIG. 2. Sample bearing solutions can be introduced into ES probe 28 using a variety of liquid delivery systems. Liquid delivery systems may include but are not limited to, liquid pumps with or without auto injectors, separation systems such as liquid chromatography or capillary electrophoresis, syringe pumps, pressure vessels, gravity feed vessels or solution reservoirs. ES source 30 is operated by applying potentials to cylindrical electrode 31, endplate electrode 32 and capillary entrance electrode 33. Counter current drying gas 34 is directed to flow through heater 35 and into the ES source chamber through endplate nosepiece 36. Bore or channel 58 through dielectric capillary tube 37 begins at entrance electrode 33 and exits at exit electrode 38. The electrical potential of an ion being swept through dielectric capillary tube 37 into vacuum may change relative to ground as described in U.S. Pat. No. 4,542,293. Ions enter or exit the dielectric capillary tube with different potential energy. The use of dielectric capillary 37 allows different potentials to be applied to the entrance and exit ends of the capillary during operation. This effectively decouples the API source from the vacuum region both physically and electrostatically allowing independent tuning and optimization of both regions. To produce positive ions, negative kilovolt potentials are applied to cylindrical electrode 31, endplate electrode 32 with attached electrode nosepiece 36 and capillary entrance electrode 33. ES probe 28 remains at ground potential during operation. To produce negative ions, the polarity of electrodes 31, 32 and 33 are reversed with ES probe 28 remaining at ground potential. Alternatively, if a nozzle or conductive (metal) capillaries are used as orifices into vacuum, kilovolt potentials can be applied to ES probe 28 with lower potentials applied to cylindrical electrode 31, endplate electrode 32 and electrode 33 during operation. With conductive orifices or capillaries, the entrance and exit potentials are equal, so the API source potentials are no longer decoupled from the vacuum region potentials. Heated capillaries can be configured as the orifice into vacuum used with or without counter current drying gas. Capillary exit heater 39 is configured with dielectric capillary 37 to independently heat the exit end of capillary 37.

General Functionality

Referring again to FIG. 2, the general functionality of a preferred embodiment will be described. With the appropriate potentials applied to elements in ES source 30, electrosprayed charged droplets are produced from a solution or solutions delivered to ES probe tip 29. The charged droplets exiting ES probe tip 29 are driven against the counter current drying gas 34 by the electric fields formed by the relative potentials applied to ES probe 28 and ES chamber electrodes 31, 32, and 33. A nebulization gas flow 57 can be applied through a second layer tube surrounding the sample introduction first layer tube to assist the electrospray process in the formation of charged liquid droplets. As the droplets evaporate, ions are formed and a portion of these ions are swept into vacuum through capillary bore 58. Vacuum partition 60 includes a vacuum seal with dielectric capillary 37. If a heated capillary is configured with heater 39 as an orifice into vacuum with or without counter current drying gas, charged droplet evaporation and the production of ions can occur in capillary bore 58 as charged droplets traverse the length of capillary 37 towards first vacuum pumping stage 59.

The neutral background gas forms a supersonic jet as it expands into vacuum from capillary bore 38 and sweeps the entrained ions along through multiple collisions during the expansion. A portion of the ions entering first stage vacuum 59 are directed through the skimmer orifice 60 and into second vacuum stage 46. Referring to FIGS. 2A and B, ions entering second vacuum stage 46 through skimmer orifice 60 enter segmented quadrupole ion guide assembly 62 (ion guide 23) where they are trapped radially by the electric fields applied to the quadrupole rods. The locally higher pressure in the entrance region 66 quadrupole ion guide 23 damps the ion radial motion as they pass through the quadrupole RF fringing fields. The collisional damping of ion motion in this locally higher pressure region 66 results in a high capture efficiency for ions entering quadrupole assembly 62. Ion m/z values that fall within the operating stability window will remain radially confined within the internal volume described by the rods of quadrupole assembly 62. The trajectories of ions that fall within the stability window defined by the potentials applied to the rods of ion guide 23 will damp towards centerline 27 while traversing the length of ion guide 23. In this configuration, the ions are transported through vacuum regions 46, 47 into vacuum region and 48, separated by vacuum seals at the junctions 42 and 43. Each rod of ion guide 23, 40 and 26 passes through but is electrically insulated from vacuum partitions 42, 43, 44 and 45. As the ions are transported through vacuum regions 46 and 47, they experience a rapidly decreasing number of collisions due to the pressure gradient along the ion path. As the ions enter vacuum region 48, the pressure is sufficiently low that collisions essentially stop, and the ions no longer experience velocity changing due to collisions. Ion trajectories that have been damped to centerline 27 are efficiently transferred into segment 39 of quadrupole assembly 63 when the appropriate relative bias voltages are applied between ion guide 23 and ion guide 24 with RF section 39.

As described earlier, ions experience several collisions with the neutral background gas molecules as they traverse the volume defined by quadrupole ion guide 23 in vacuum stage 46, and the number of collisions decreases continuously through vacuum stage 47 until eventually very few collisions are experienced in the low pressure vacuum stage 48. In continuous beam mode, ions are transported through ion guide sections 40 and 41, with the ion guides adjusted to allow maximum transmission in RF-only mode. In this mode, the ion beam is passed through collision cell ion guide 25, operating in RF-only mode, at low collision energy, i.e. the DC offset between ion guides 23, 24, and 25 are similar enough to prevent acceleration and fragmentation of the ion beam with background collision gas in collision cell 51. The ion beam is efficiently transported through ion guide assembly 64 and 65. Collision cell 51 may be sufficiently pressurized to permit ion beam translational energy cooling through ion guides 25 and 26, providing a phase space profile suitable for the TOF entrance and pulsing optics 56.

In one embodiment of MS/MS, ion guide 24 is operated in mass selection mode, for example as an RF/DC resolving quadrupole mass filter, and in this configuration a particular m/z value (or set of values) is selected from the well-defined ion beam. Due to the design of ion guide 23 in region 46 and 47, as discussed earlier, selected ion losses are minimized in ion guide 24 during mass-to-charge selection operation. The selected ion can be fragmented the with conventional methods such axial acceleration CID, whereby the ions are accelerated into a high pressure region, typically as they are transported through collision cell 51 by applying an acceleration potential between either ion guides 23, 24 and 40 or 40 and 25. Alternatively the ions can be fragmented using a low acceleration voltage by auxiliary excitation CID with the auxiliary frequency tuned to the mass of the precursor ion applied to the rods of ion guide 25. The resulting product ions are then further transported through ion guide 26 that extends from inside collision cell 51 into vacuum pumping stage 50. Ion guide 26 is configured with an appropriate dimension to provide a sufficient conductance limit across junction 45, with the appropriate choice of pumping. As the ions exit collision cell 51, they traverse a smoothly varying pressure gradient within ion guide 26 that initially provides damping of ion translation energies. Ions exiting ion guide 26 experience minimum collisions with background gas, preserving the low ion beam energy spread required for precise focusing through lens 68 into time of flight pulsing region 56.

Ions traversing the pulsing region 56 are either pulsed into TOF flight drift region 73 or continue through pulsing region 56 passing through orifice 74 in lens 75. By applying appropriate voltages to lens 75, electron multiplier detector 76, conversion dynode 77 and Faraday cup 78, ions passing through orifice 74 can be directed to impact on conversion dynode 77 or be collected on Faraday cup 78. Secondary electrons or photons released from conversion dynode 77 after an ion impact are detected by electron multiplier 76. The TOF analyzer 71 is described in detail in patent application Ser. No. 09/322,892.

In the embodiment of the hybrid TOF shown in FIG. 2, full fragment ion spectra are recorded in the TOF analyzer without scanning, resulting in higher sensitivity and resolving power than can be achieved in triple quadrupole operation. The hybrid TOF MS as illustrated in FIG. 2 can be operated in such a way as to provide full triple quadrupole functionality, with the TOF mass spectra acquired replacing the third quadrupole single mass selection and mass scan analytical functions. Provided that the ion population delivered to pulsing region 56 is properly focused with a minimum off axis component of energy, a range of analytical functions can be achieved upstream of pulsing region 56 without modifying optimal tuning of TOF mass analyzer 71.

To generate a non-continuous beam for trapping in ion guide 23, 24 or 25, appropriate DC voltages can be applied to ion guide segments 39, 40 and 41. Trapping ions in ion guide 26 is performed by applying the appropriate potentials to lens element 68, as described in U.S. Pat. No. 5,689,111. It is also possible to operate ion guides 23 and 26 as resolving mass filters. In this case the hybrid TOF illustrated in FIG. 2 can contain a full triple quadrupole coupled to a TOF mass analyzer 71. Detector 76 can be used for direct triple quadrupole analysis.

Minimization of Capacitive Coupling Effects

Figure 2B:
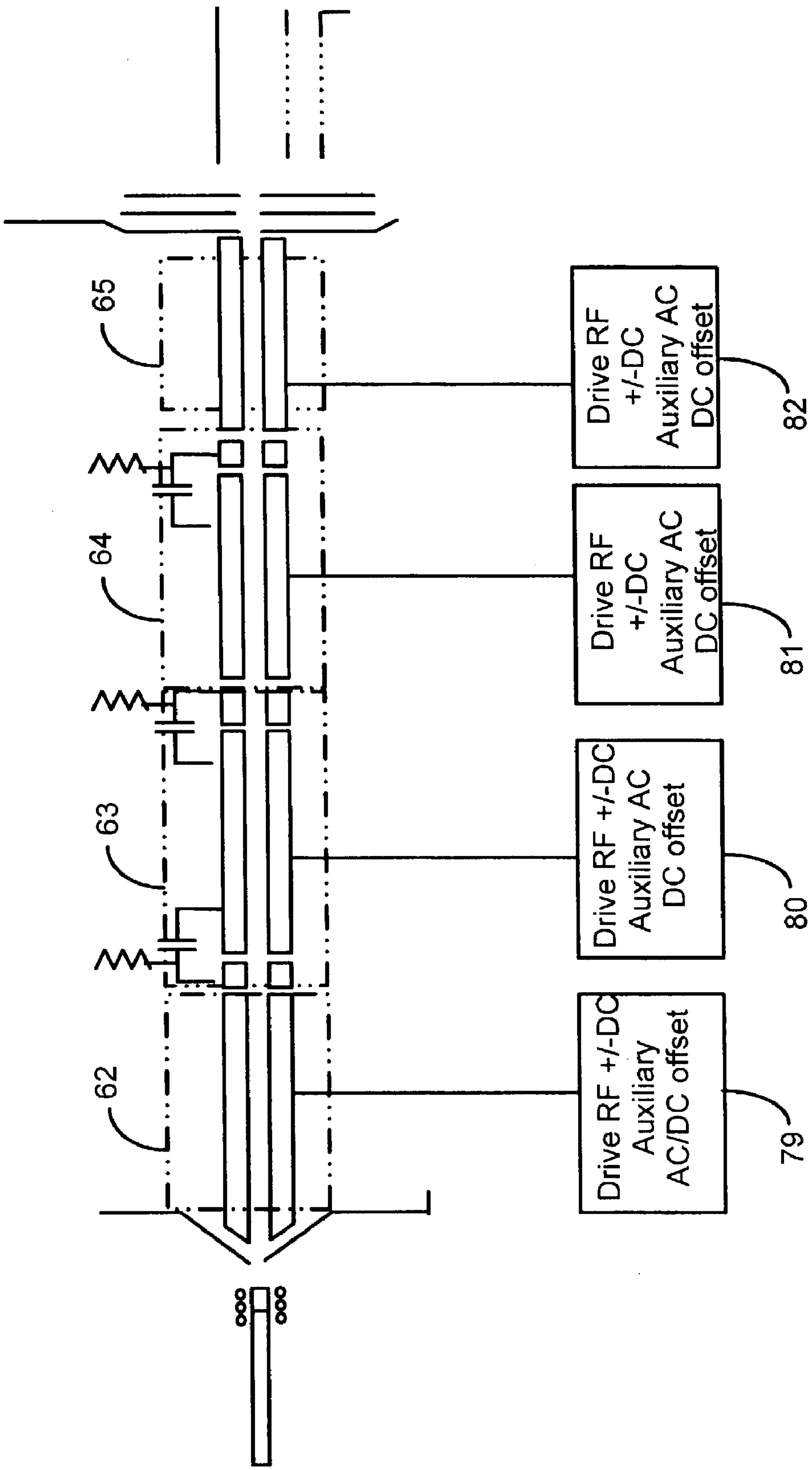
FIG. 2B illustrates the configuration of electronic voltage supply units and control modules for the seven multipole ion guide assembly and surrounding electrodes diagrammed in FIG. 2*a*.

Adjacent ion guides, particularly of similar diameter and frequency, require additional considerations to minimize capacitive coupling and fringe field effects. Capacitive coupling induces voltage pickup on the neighboring-rods, and can reduce the overall response time of the ion guide elements. As described in patent application Ser. No. 09/322,892, quadrupole ion guides 23, 24, 25 and 26 and segments 39, 40, and 41 can be configured with the same radial cross section geometries, with each adjacent pole axially aligned to avoid fringing field effects and to maximize ion transmission between quadrupole assemblies. Referring to FIG. 2*b*, power supply modules 79, 80, 81 and 82 apply RF, auxiliary and DC potentials to ion guide assemblies 62, 63, 64 and 65. Quadrupole ion guide segments 39, 40 and 41 of FIG. 2A serve to decouple quadrupole ion guides 23, 24, 25 and 26 both electrically and functionally, as well as provide an element to apply high and low voltages for ion trapping, with gated release as will be discussed later. These segments may be capacitively coupled to the neighboring ion guides as shown in FIG. 2B; alternatively some or all can be driven by separate supplies.

As described in patent application Ser. No. 09/322,892, independent RF generators in power supply modules 79, 80, 81 and 82 can be configured and tuned to apply the same RF frequency and phase to axially aligned adjacent quadrupole electrode. In this way, as the ion beam traverses the ion guide assembly 22 it experiences a single oscillatory field (of different amplitudes), reducing the likelihood of transmission losses due to fringe field effects at the ends of the segments.

Vandermay in U.S. Pat. No. 6,340,814 B1 describes an alternative approach to removing the problem of capacitive coupling of adjacent quadrupoles whereby the capacitance between adjacent but opposite poles is neutralized. Whitehouse, et. al. in patent Ser. No. 09/322,892 describes methods for reduction of deleterious effects due to capacitative coupling, which are incorporated herein by reference.

Electrostatic Lenses

Figure 5:
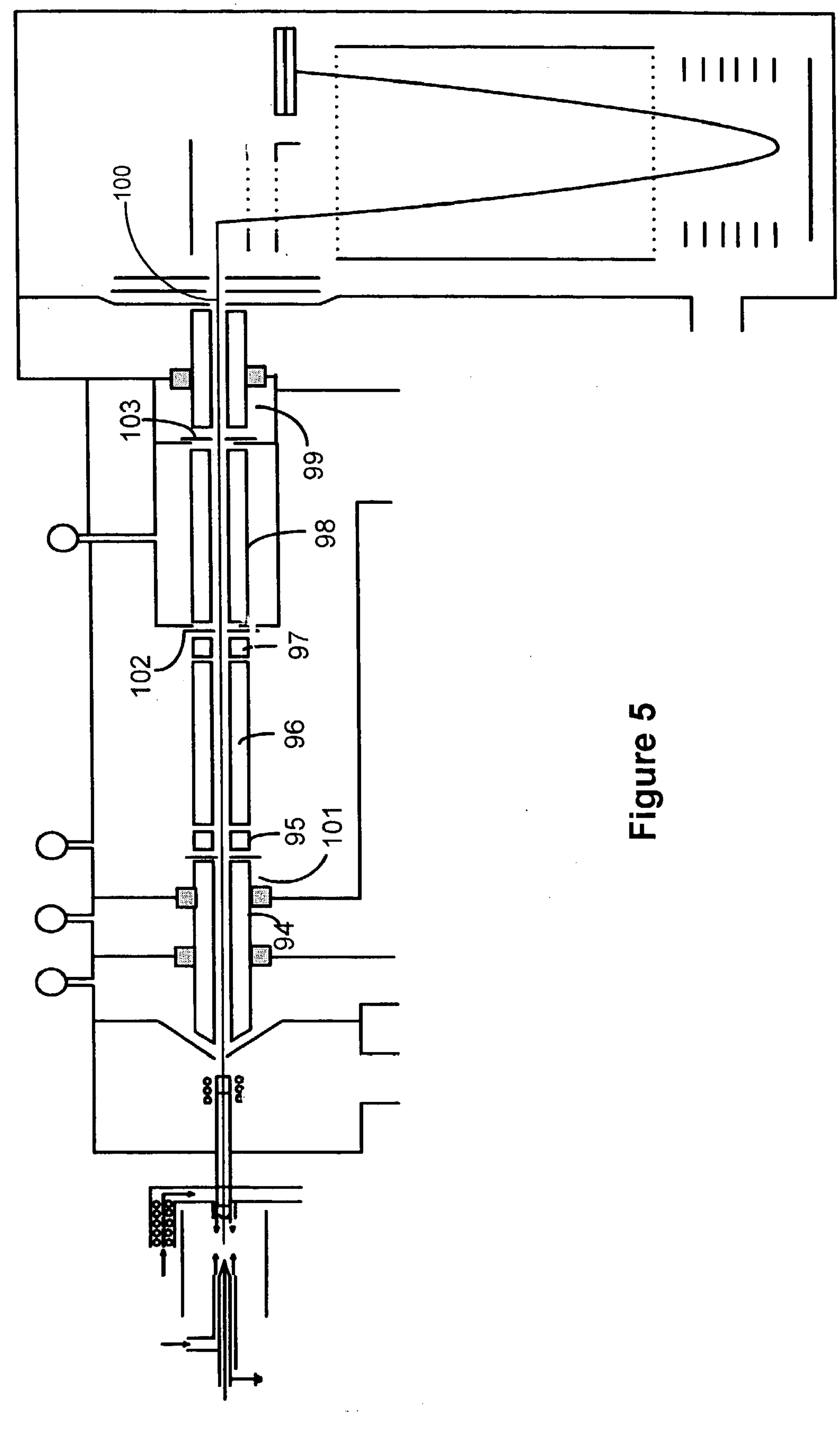
FIG. 5 illustrates a configuration similar to FIG. 2A using electrostatic lenses.
Figure 6:
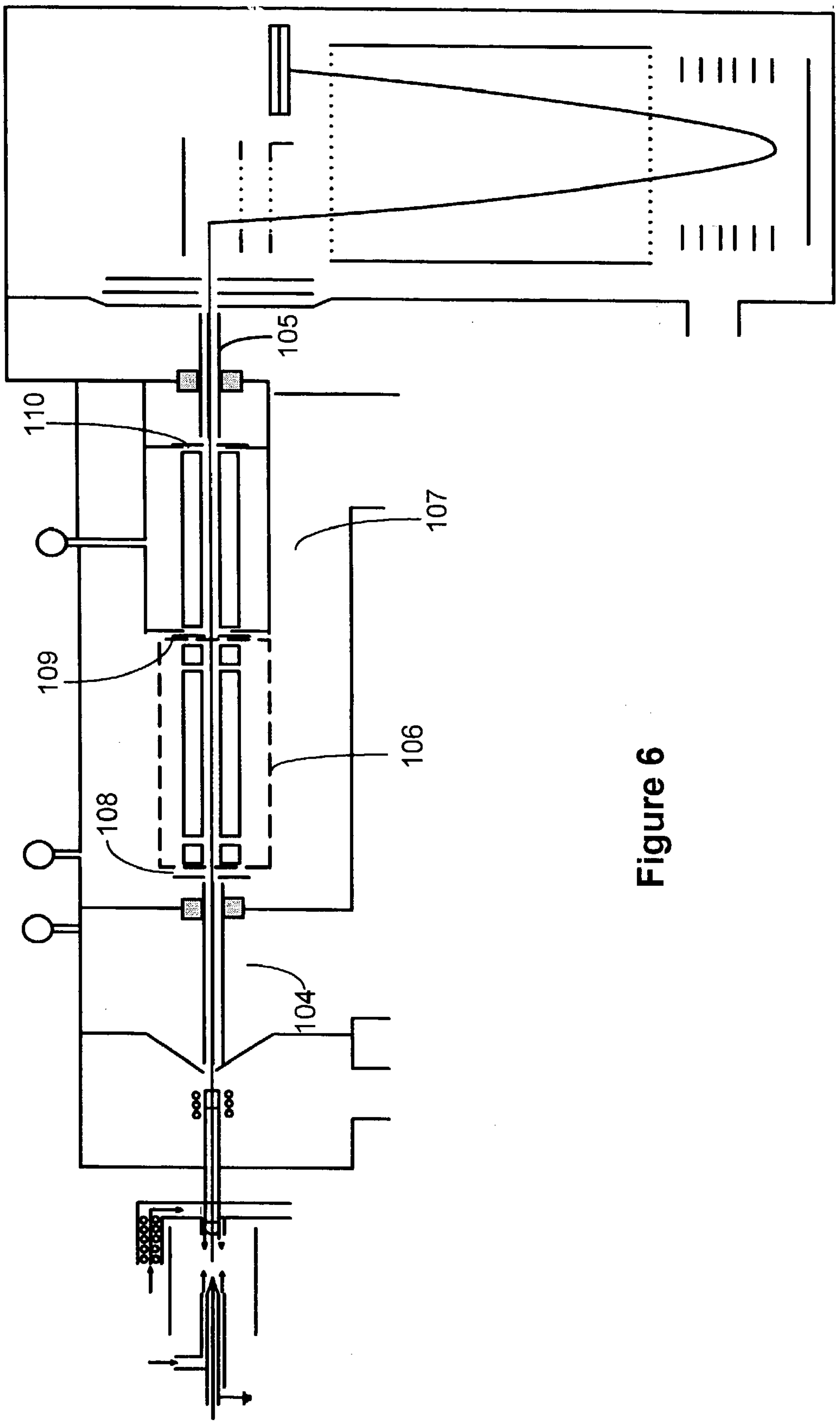
FIG. 6 illustrates a configuration similar to FIG. 2A using smaller multipole ion guides and electrostatic lenses.

Alternatively, electrostatic lenses can serve to decouple adjacent segments physically and electronically, for example from any rapidly changing RF and +/−DC potentials applied to the rods. They can also be used as differential pumping apertures, and additionally they can enable rapid switching of voltages between ion guides. An alternative embodiment of the invention consisting of three electrostatic ion lenses is illustrated in FIG. 5 which displays an electrospray source-orthogonal pulsing Time-Of-Flight mass analyzer with an ion reflector, and six differentially pumped vacuum regions, and is configured with six multipole ion guides 94, 95, 96, 97, 98 and 99 positioned in series along common axis 100. Ion guides 94 and 95 are separated by electrostatic lens 101, and likewise electrostatic lenses 102 and 103 decouple ion guides 97 from 98, and 98 from 99 respectively. Lenses 102 and 103 also provide differential pumping apertures. FIG. 6 displays a similar arrangement as shown in FIG. 35 but ion guides 104 and 105 are smaller diameter hexapole ion guides aligned with larger diameter quadrupole ion guide assemblies 106 and 107. Lenses 108, 109 and 110 separate ion guide assemblies 104, 106, 107 and 105 respectively.

Improved Transmission Characteristics of an RF/DC Quadrupole Mass Analyzer

Figure 7A:
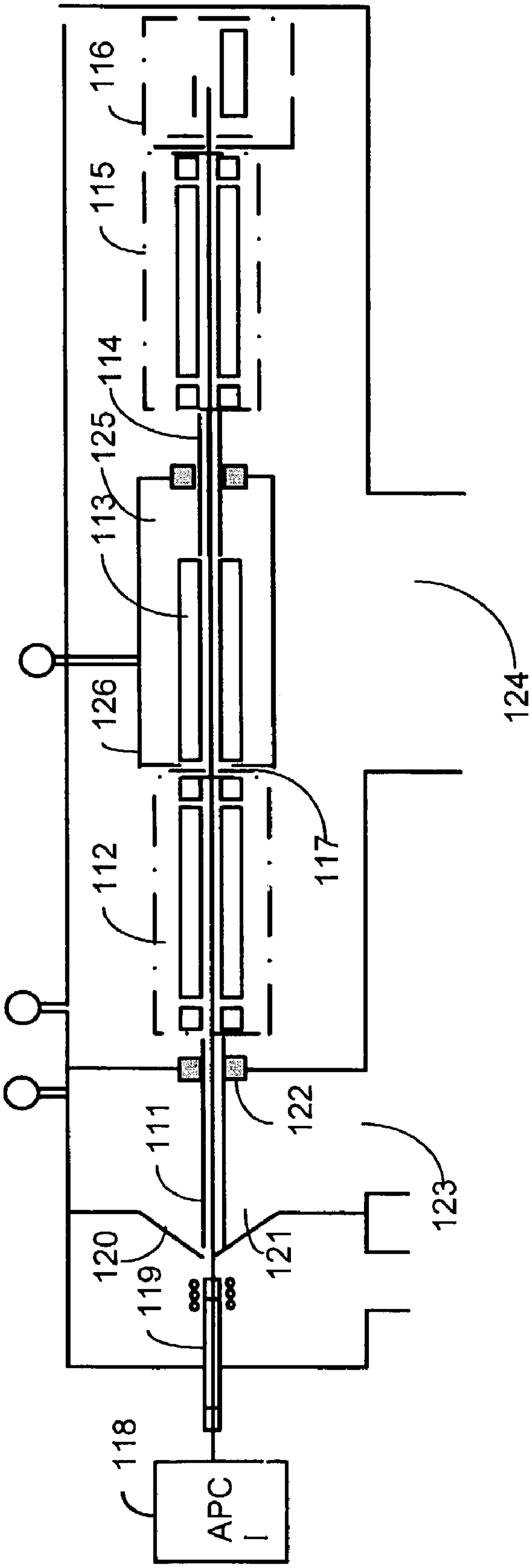
FIG. 7A illustrates an alternative embodiment of an Atmospheric Pressure Chemical Ionization Source analyzer configured with a hexapole ion guide at the entrance of the skimmer and at the exit of the collision cell, both which continuously extends between two vacuum regions, and are close-coupled to an quadrupole ion guide assembly with brubaker lenses on either end.

Mass to charge selection resolving power and transmission efficiency in an RF/DC quadrupole can be improved by using a continuous hexapole ion guide extended between two vacuum stages. FIG. 7A illustrates an embodiment of the invention, using a configuration of an ion guide assembly containing individual ion guide assemblies 111, 112, 113, 114 coupled with a resolving RF plus +/−DC quadrupole assembly 115 and an electron multiplier detector assembly 116. Electrostatic lens 117 serves as a differential pumping aperture for the collision cell 113. Ion guide assembly 112 can be operated as an RF/DC resolving quadrupole. Ions are generated using APCI source 118 and sampled through the capillary 119 and skimmer 120 as described above. Ion guides 111 and 114 are configured as small diameter hexapoles with 1 mm rods, approximately 7 cm in length. Ion guide 111 extends from skimmer orifice region 121 and extends through vacuum junction 122 which separates the higher-pressure region 123 of ~10 mTorr from the lower pressure region 124 of ~$3e^{-5}$ torr. Ion guide 111 may have a tapered entrance to match the internal angle of skimmer 120. Ion guide 114 extends into the collision cell assembly 126 with internal pressure region 125 maintained at elevated vacuum pressures up to 20 mTorr.

Figure 7B:
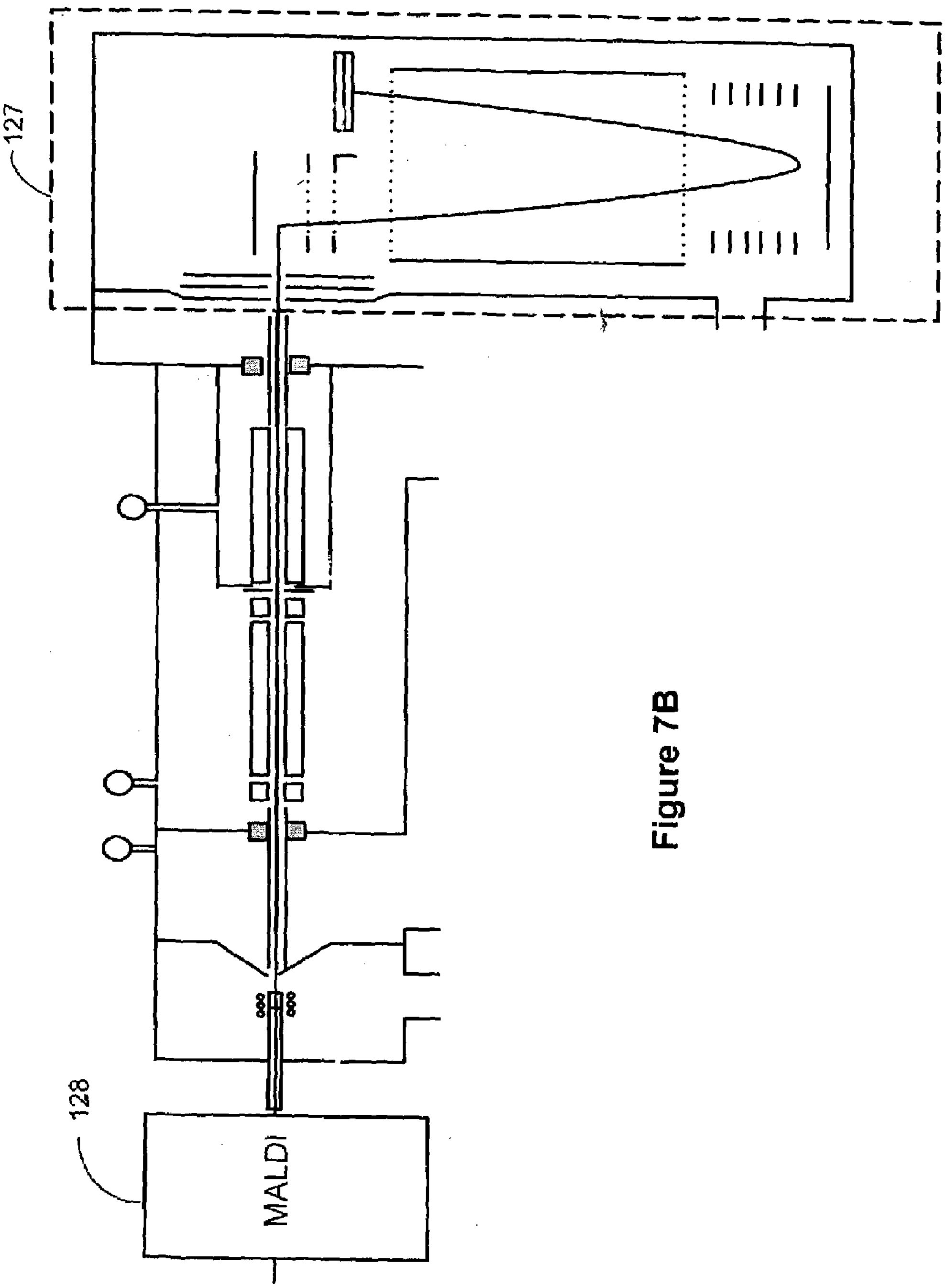
FIG. 7B illustrates the configuration of FIG. 7A using a TOF analyzer.

As will be illustrated below, the transmission of the RF/DC resolving quadrupole is improved at both unit resolution and at moderately high resolving power. The transmission is also improved somewhat at elevated pressures. This is the case for both ion beam entering a first resolving quadrupole 112, and a second resolving quadrupole 115 placed down stream of collision cell 126 and ion guide 114. Although FIG. 7A illustrates a triple quadrupole arrangement, assemblies 115 and 116 can be replaced with a TOF analyzer 127, as is shown in FIG. 7B, here configured with an atmospheric pressure MALDI source 128.

Figure 8:
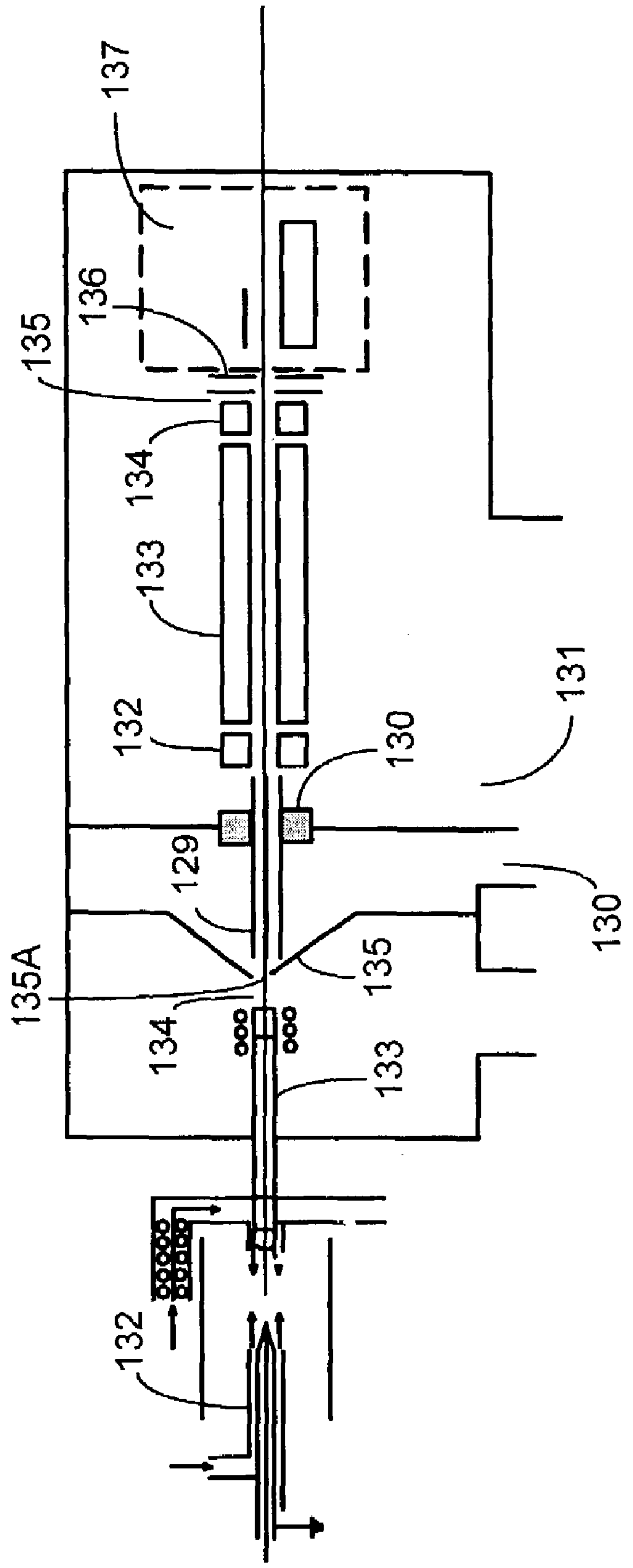
FIG. 8 illustrates an alternative embodiment of an Atmospheric Pressure Ion Source analyzer configured with a hexapole ion guide which continuously extends between two vacuum regions, close-coupled to an quadrupole ion guide assembly with brubaker lenses on either end.

FIG. 8 illustrates a configuration using hexapole ion guide 129 to transport ions between vacuum regions 130 and 131. Protonated molecules are generated by electrospray of a 50 picomolar solution of hexatyrosine (for m/z 997), Ultramark (for m/z 922), or reserpine (for m/z 609) using 50:50 MeOH:MeCN in 0.1% acetic acid. The ions are transported through capillary 133 and expanded with neutrals through a free jet expansion in vacuum region 134. Ionspass through a 1.2 mm orifice diameter 125 in skimmer 135. Ions are then transported through vacuum region 130, maintained at a pressure of approximately 5 mTorr through hexapole ion guide 129 operating at 2.5 MHz through ion guide 129 and exit in low-pressure region 131 (3x10-5 torr). There they are transferred into Brubaker lens element 132, and mass to charge selected by the RF/DC resolving quadrupole mass filter 133 operating at 880 kHz (with $r_o$~9 mm, l=20 cm). No electrostatic lenses separate the ion guides even though the ion guides operate at different frequencies. The ion beam is mass analyzed by scanning ion guide 133, transmitted through segment 134 and lenses 135 and 136, where the ions are detected with electron multiplier assembly 137.

Figure 9:
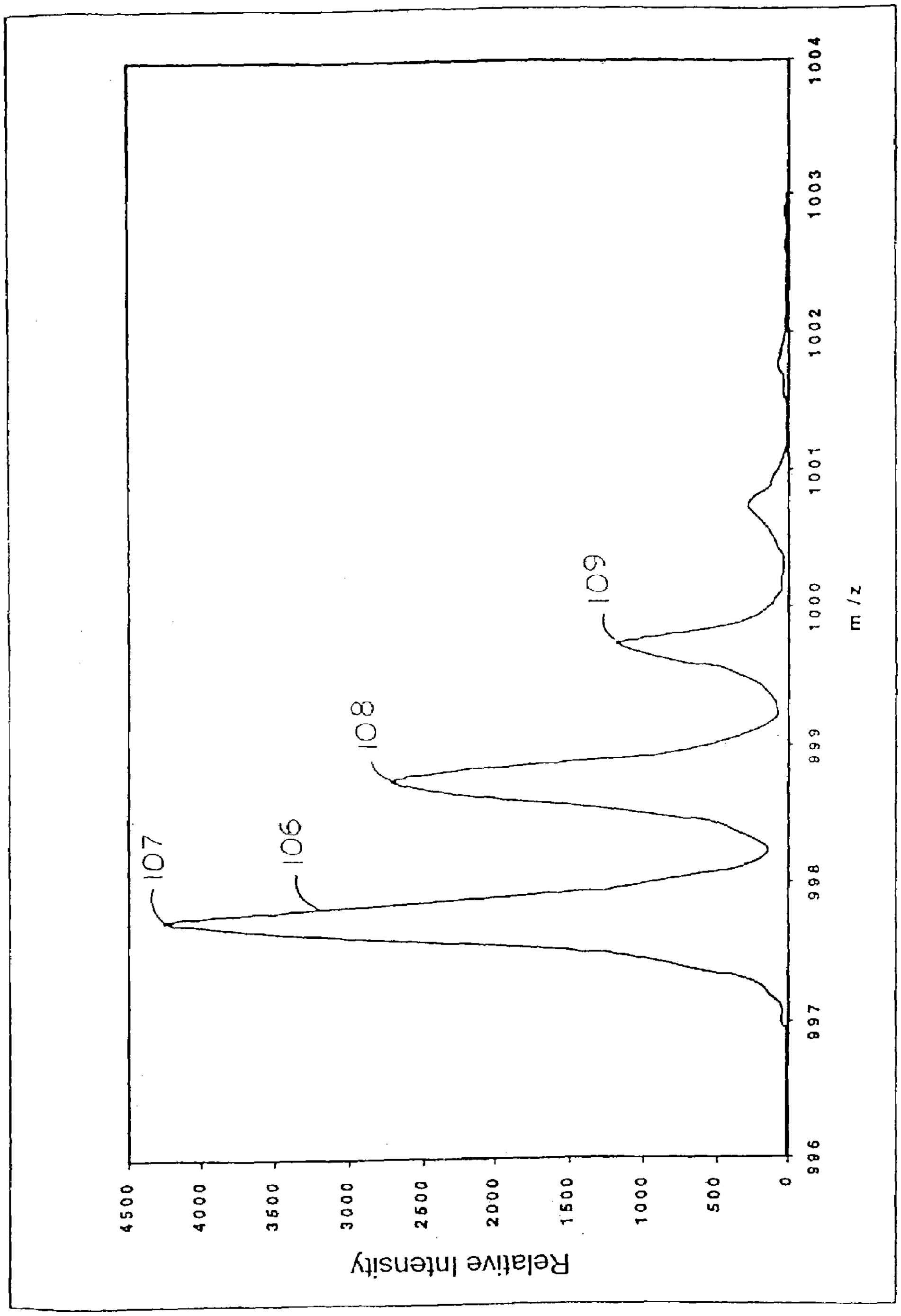
FIG. 9 illustrates a mass spectrum of a molecular ion and isotopes with m/z near 997, obtained with the configuration in FIG. 8.
Figure 10:
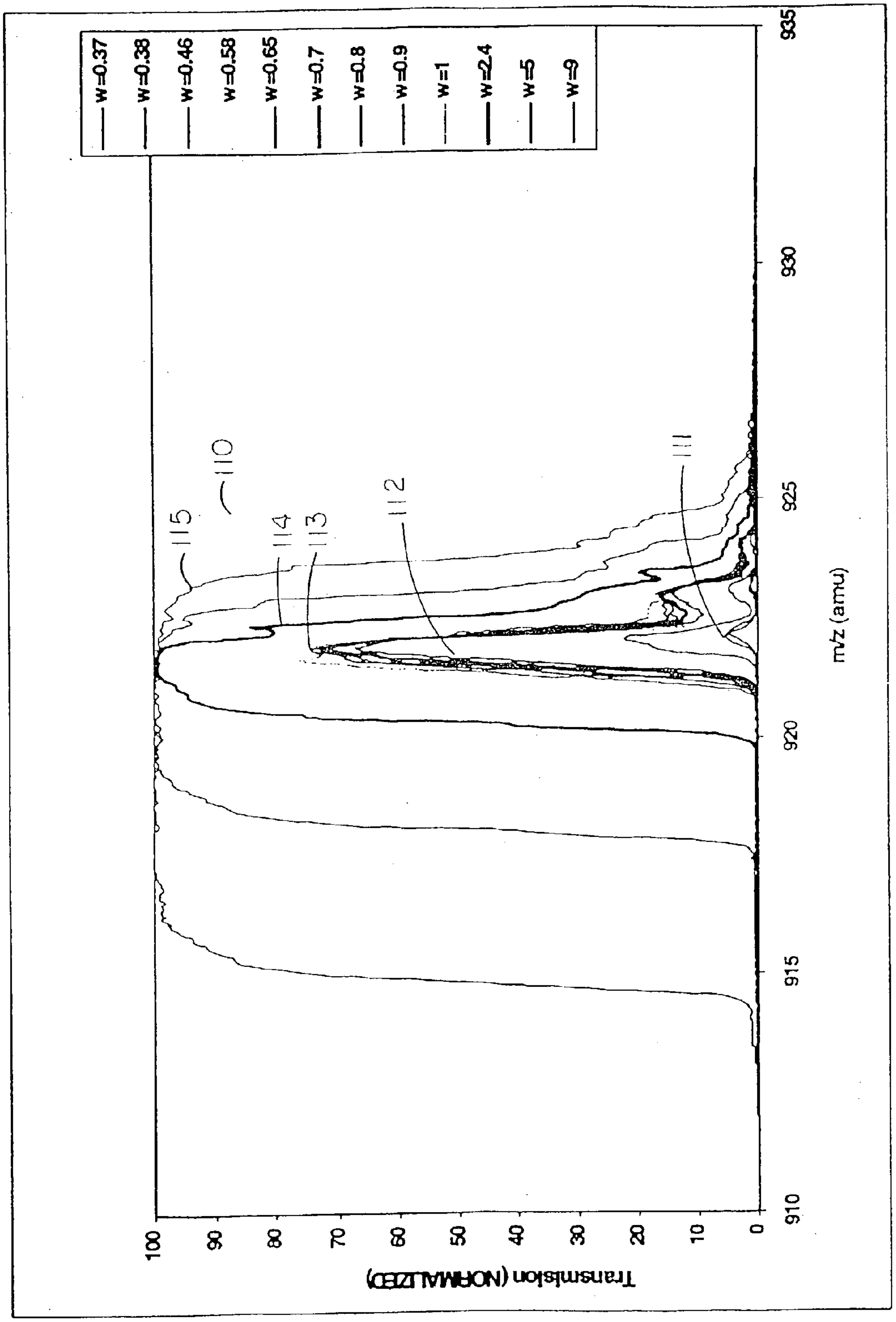
FIG. 10 illustrates a set of transmission vs. RF voltage (labeled m/z) at various peak widths for a nearly monoisotopic ion near m/z 922.

This advantage of the invention is demonstrated in FIG. 9, using the configuration in FIG. 8. Here curve 106 illustrates excellent resolving power, shown for the molecular ion hexatyrosine, with mass isotopes 107, 108 and 109 of m/z 997, 998 and 999 Da. The FWHM (full width half maximum), is approximately 3800 for m/z 997. A set of transmission curves 110 of an ion beam consisting of ions with m/z 922 is shown in FIG. 10 for various RF/DC ratios applied to the RF/DC resolving quadrupole mass filter 133. Peak widths are increased by increasing the RF to DC ratio. For example, curves 111, 112, 113, 114 and 115 correspond to peak widths of 0.37, 0.58, 0.8 and 2.4 and 9 Da. Only a 25% loss in sensitivity is observed at standard operating conditions (typically 0.8 FWHM, curve 114), above the maximum transmission achievable, curve 115. Typically losses near ×2 to ×4 are observed with a similar configuration and electrostatic lenses. These data are acquired at a background pressure of 3.5e–5 torr.

Figure 11:
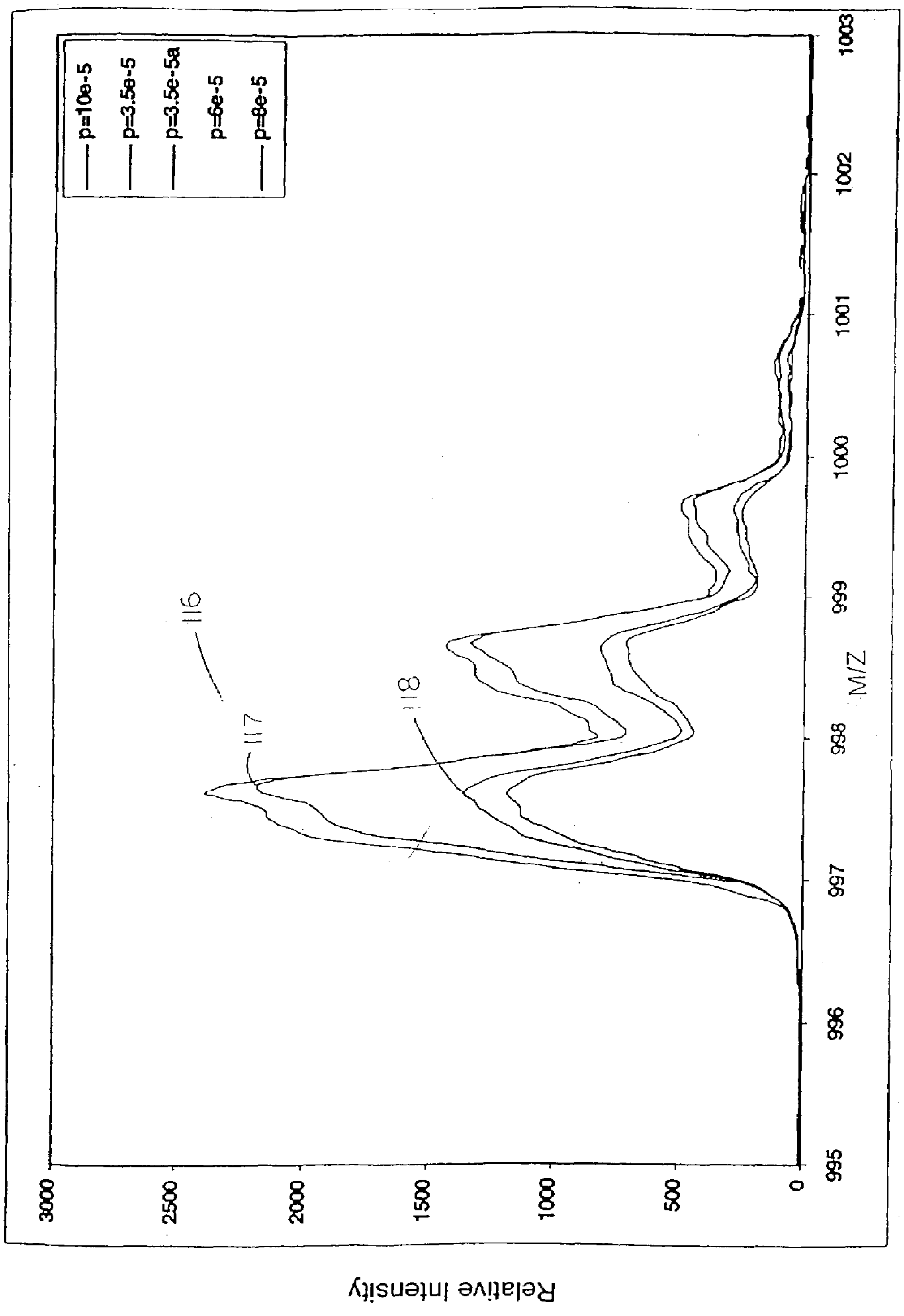
FIG. 11 illustrates a set of transmission vs. RF voltage (labeled m/z) at various pressures for a molecular ion and isotopes near m/z 997.

In addition to improved transmission at lower pressure, the configuration in FIG. 8 also yields improved transmission at higher pressure. Referring to FIG. 11, a set of mass spectral curves 116 is shown for a variety of background gas pressures. As discussed above, ions that undergo collisions with the background gas suffer changes in position and velocity that repel them from the RF and +/−DC field. Intensities are shown for a number of pressures in FIG. 11. Curves 117 and 118 are obtained at pressures of 3.5 e–5 torr to 6e–5 torr, respectively. Typically, as the pressure is increased from 3.5 e–5 torr to 6e–5 torr, the sensitivity drops by approximately a factor of 2. Here there is an improvement, with the signal only dropping about 35%. This is rationalized in terms of the improved initial beam quality entering the resolving quadrupole ion guide 129 in FIG. 8. Even though the ions suffer the same number of collisions as they move through the resolving quadrupole, a smaller fraction of them change the phase space significant enough to scatter them out of the stability region.

Figure 12:
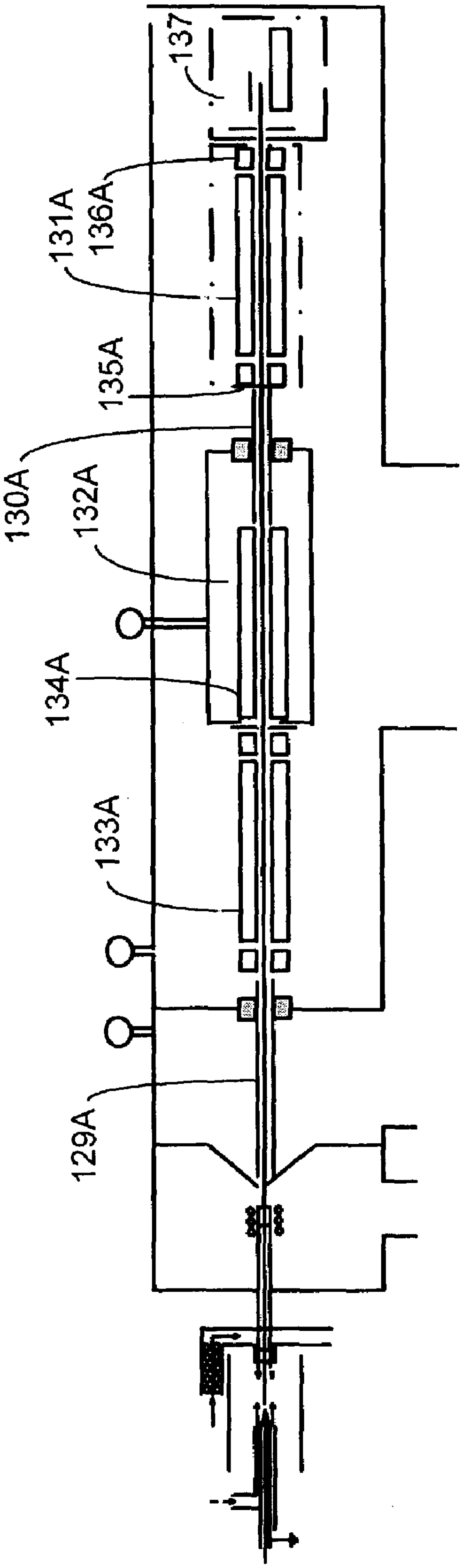
FIG. 12 illustrates an alternative embodiment of an Atmospheric Pressure Ion Source analyzer configured with a hexapole ion guide at the entrance of the skimmer and at the exit of the collision cell, both which continuously extends between two vacuum regions, and the first which is close coupled to a 3 mm quadrupole ion guide assembly.
Figure 13:
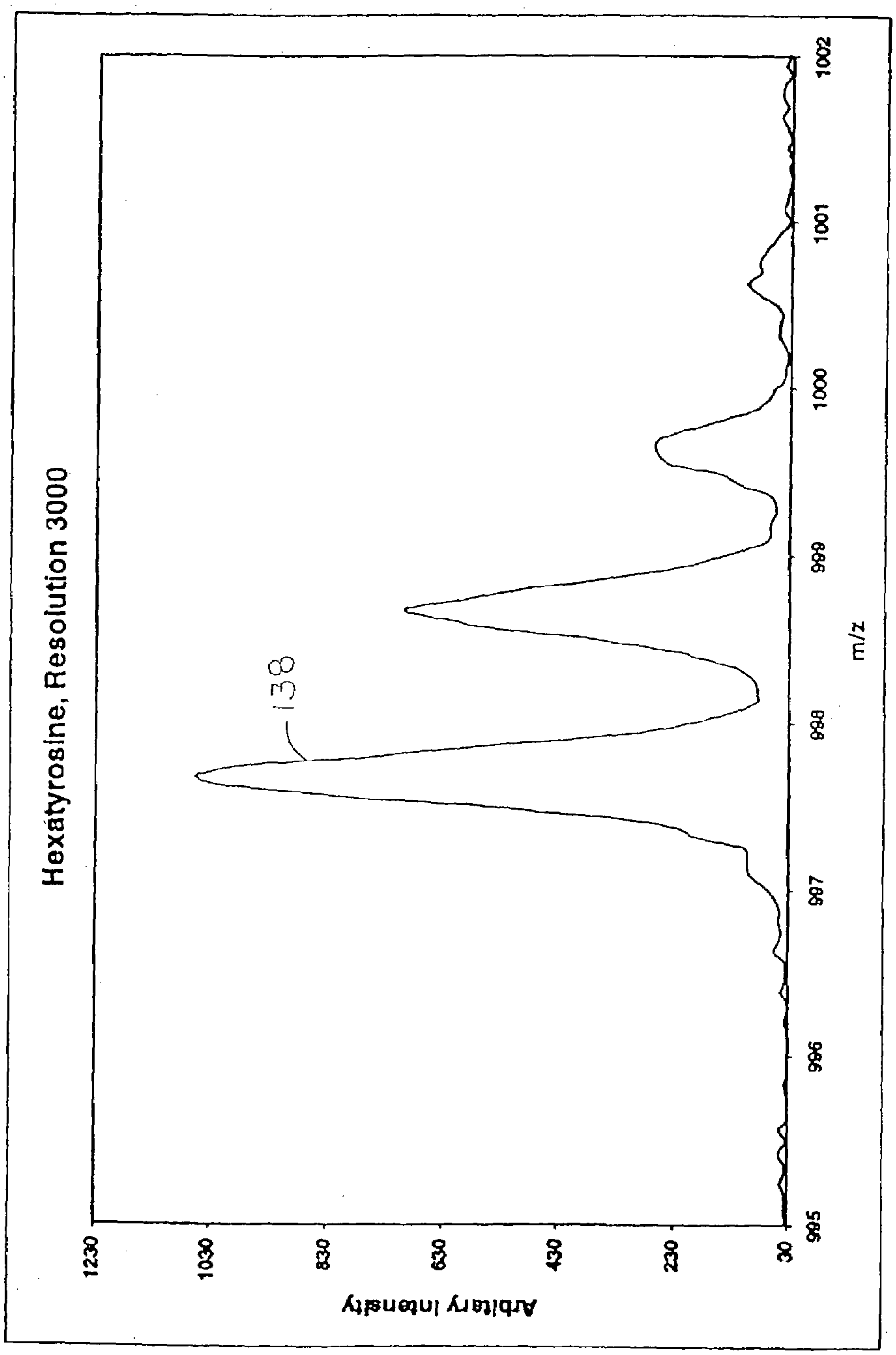
FIG. 13 illustrates a mass spectrum of a molecular ion and isotopes with m/z near 997, obtained with the configuration in FIG. 12.

FIG. 12 illustrates a configuration of the invention that is designed to study the ion beam phase space obtained by utilizing hexapole ion guide 130A to transport fragment ions from the collision cell 132A into the RF/DC resolving quadrupole 131A. In this case, ion guide 132A is pressurized to 1–5×10-3 torr and the RF/DC resolving quadrupole 131A operates at 3.5e–5 torr. Here, hexatyrosine or reserpine molecular ions are mass to charge selected using a quadrupole ion guide 133A at low resolving power (R~200). First attention is paid to the analysis of precursor ions that are transported but not fragmented by collision cell 132A. Precursor ions are transported through the pressurized ion guide at 1×10-3 torr via a weak acceleration field, using a small relative DC offset between ion guides 133A and 134A. Ion guide 134A operates at 880 kHz and a voltage is applied to yield q=0.35 for the selected ion. Precursor ions are transmitted through a hexapole ion guide 130A, where they are injected into Brubaker lens element 135A and resolved by the RF plus +/−DC quadrupole mass filter 131A operating at 880 kHz (with ro~9 mm, l=20 cm). The ions are transported through the Brubaker exit lens 136A and detected by the electron multiplier assembly 137. No electrostatic lenses separate the ion guides 134A, 130A and 135A even though they operate at different frequencies. FIG. 13, curve 138 illustrates a spectrum of hexatyrosine with a resolving power of 3000 and a sensitivity loss of ×8 over unit resolution. This result is very similar to that described above in FIG. 9.

Figure 14:
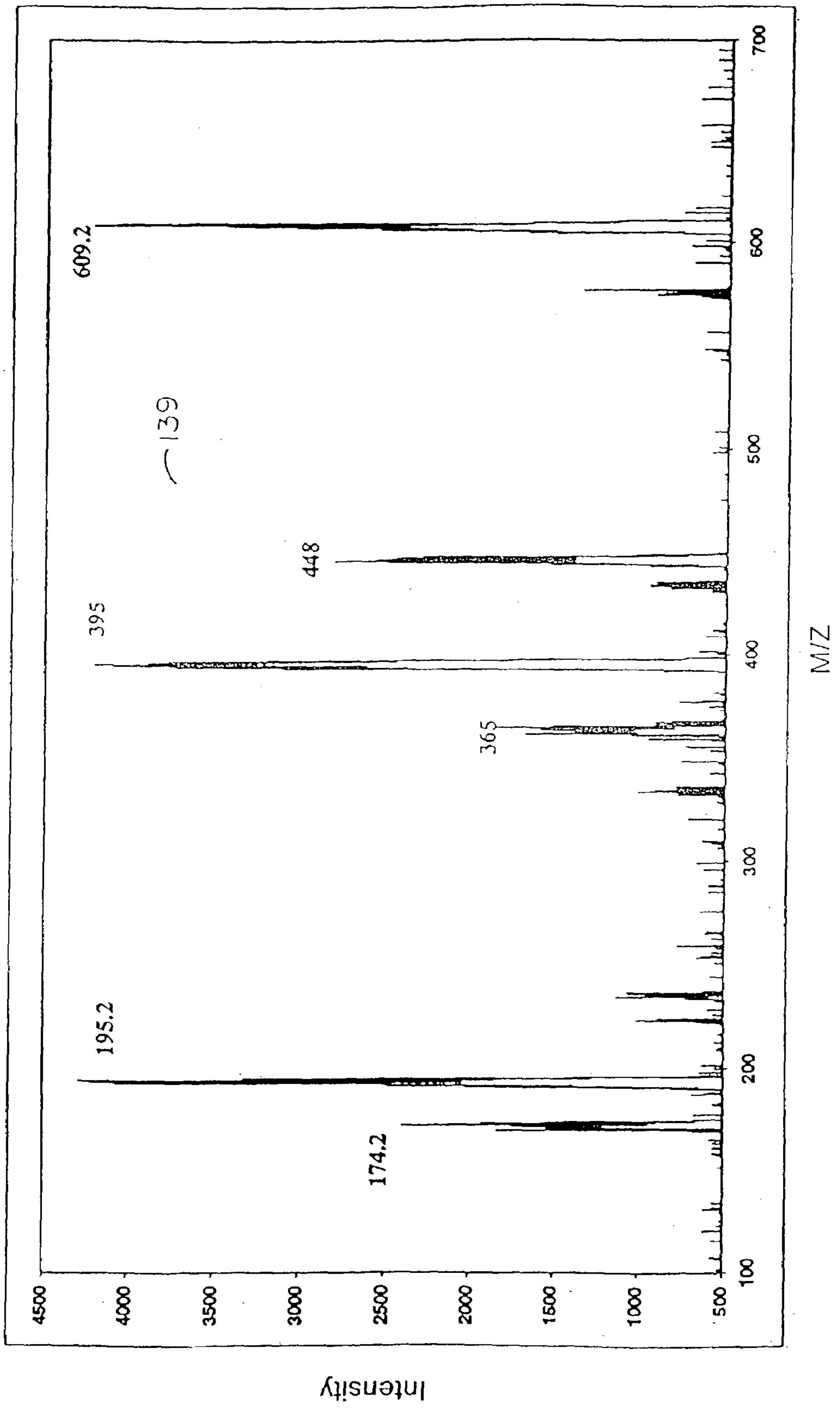
FIG. 14 illustrates an MS/MS spectrum of a fragments from the molecular ion with m/z near 609, obtained with the configuration in FIG. 12.
Figure 15:
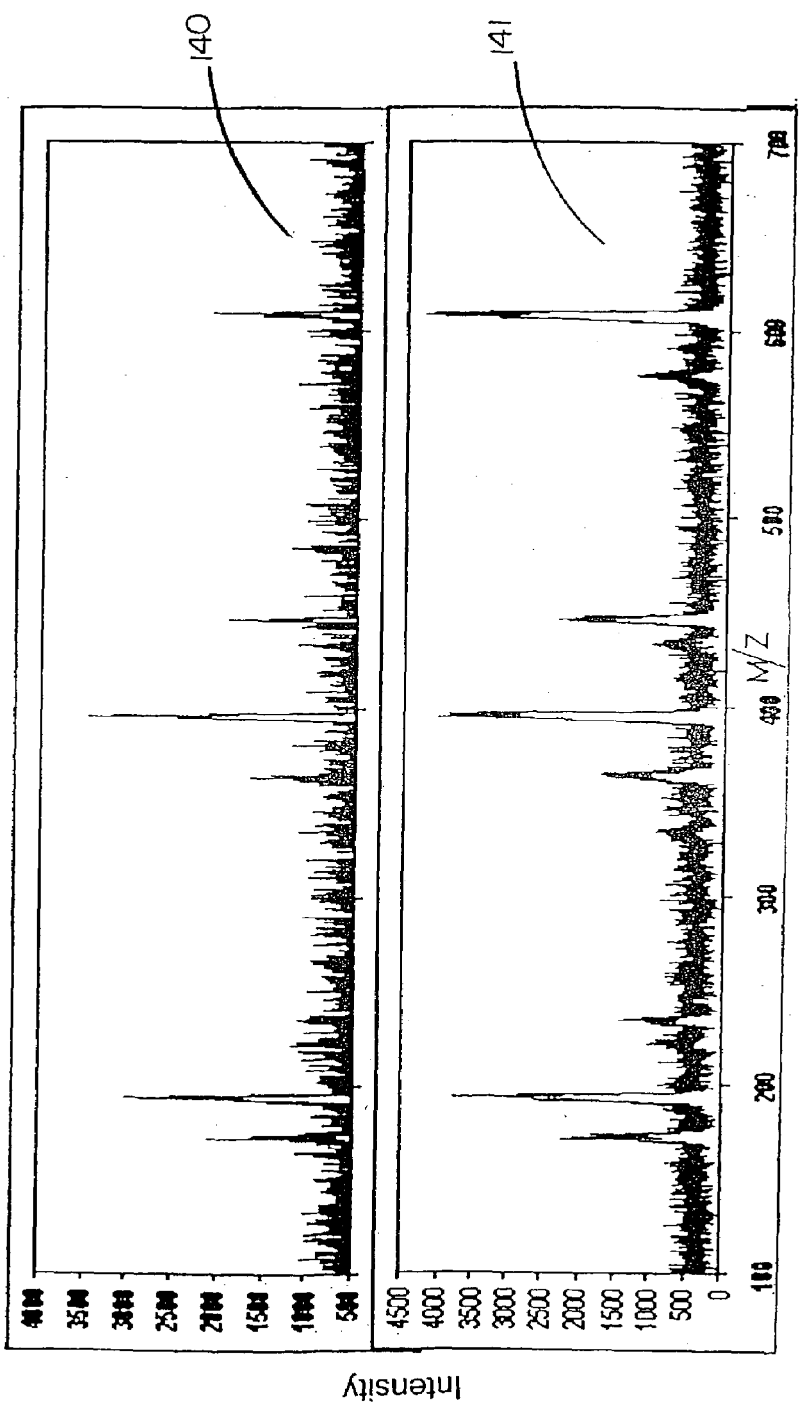
FIG. 15 illustrates an MS/MS spectrum of a fragments from the molecular ion with m/z near 609, comparing the configuration in FIG. 12 with a conventional collision cell as in FIG. 1.

Next attention is paid to the analysis of fragment ions created by CID of the precursor ion. FIG. 14 illustrates a CID spectrum 139 of protonated reserpine, m/z 609, and using the configuration in FIG. 12. Here ions are accelerated into the collision cell 132A using 50 eV lab frame collision energy, by adjusting the appropriate upstream ion guide DC offsets. The mid-mass capture efficiency is estimated to be at least 4× larger than a lens alone, and 2× better than a brubaker lens in series with an electrostatic lens. Although the efficiency is better for the invention herein, we note that the fragmentation patterns are identical, as shown in FIG. 15, where curves 140 and 141 represent the respective CID spectra using an electrostatic lens as the exit of collision cell 132A in place of the ion guide 130A.

As discussed, an ion beam that is transported through continuous ion guides 129A and 130A from a moderate pressure region of 1–10 mTorr, into low pressure region of $0.1–5e^{-5}$ torr, results in improved transmission characteristics of the RF/DC quadrupole mass filter. The improvements are believed to be due to an enhanced ion beam quality whereby ions are collisional damped in a high-pressure region and smoothly transferred to a low-pressure region with minimal perturbation. As discussed earlier, collisions with the background gas serve to radially and axially reduce the ion kinetic energy spread. This produces a well-defined, narrow ion beam, with phase space coordinates suitable for transmission into an RF plus +/−DC quadrupole operating near the stability tip. As described by Dawson, losses in transmission at moderately high resolving power tend to be caused by ions with unsuitable phase space coordinates. Therefore, when acceptable phase space can be maintained, the resolution-transmission characteristics are improved.

Multiple Segment Ion Guide Functions

Single quadrupole MS and $MS/MS^n$ TOF operating sequences are described in U.S. patent application Ser. No. 08/694,542 and are included herein by reference. Analytical MS and $MS/MS^n$ TOF operating sequences employing multiple quadrupoles operating in ion mass to charge selection an ion fragmentation modes are described in patent application Ser. No. 09/322,892 and also are included herein by reference. The hybrid segmented ion guide TOF embodiment illustrated in FIG. 2 can be configured to achieve all triple quadrupole and ion trap MS/MS functions using a number of different ion mass to charge selection and ion fragmentation techniques, and combinations of DC acceleration and resonant frequency excitation CID ion fragmentation operation not conducted in either triple quadrupoles or an ion traps. Several combinations of m/z selection and ion fragmentation and mass analysis can be performed sequentially or simultaneously using the embodiment illustrated in FIG. 2. Specific examples of segmented ion guide operating modes will be described below as a means to achieve MS, MS/MS and $MS/MS^n$ analytical functions with and without ion trapping.

Decoupling of Ion Guide Functions

Referring again to FIG. 2, the invention offers the advantage of decoupling the CID ion guide 25 function from the ion transport function in ion guide 26. For many analytical applications, CID can occur in ion guide 25 either via axial or radial acceleration methods. The ions then undergo a continuing number of low energy collisions as they are transported through segment 41 and the higher pressure portion of ion guide 26. This provides the reduction in the radial components of velocity, whereby a minimum off-axis component of energy is required to properly resolve ions in TOF analyzer 71. The ions are then smoothly transported into the lower pressure portion of ion guide 26 with minimal perturbation to the beam quality prior to extraction into the TOF analyzer 71. Furthermore, the advantages of inventions from the U.S. Pat. No. 5,689,111 can be preserved, where the ions are best focused through lens 68 in a low pressure region.

Ion Trapping

The present invention provides high transmission of ion transport through the multiple segments of the ion guides. Ions can be moved back and forth, enabling multiple functionality, with little transmission loss. Ions can be moved efficiently from one segment or quadrupole assembly to an adjacent segment or quadrupole assembly in blocks. All ions trapped in one segment or quadrupole are transferred to the next sequential segment or quadrupole ion guide assembly before accepting a new population of ions from the previous segment or quadrupole assembly. Each segment or quadrupole assembly can independently perform single or multiple m/z selection, and/or DC acceleration CID as ions are transferred between assemblies, and/or resonant frequency excitation CID within assemblies.

Trapping functions can be performed by raising the DC offset potentials of ion guide elements 39, 40, 41 and lens 68 in FIG. 2 to generate a repulsive field relative to the kinetic energy and polarity of the ions located in each respective upstream ion guide. Trapping with DC offset potentials applied to the poles of segments 39, 40 and 41 reduces any defocusing effects that may occur due to fringing field effects that can occur when using DC lenses. Electrostatic lenses can be positioned near the ion guide elements if faster response times are required than the ion guides can provide. For example, ring electrodes can be placed around the ion guide poles to yield a net repulsive field within $r_0$.

Referring to FIGS. 2A and 2B, the electrospray ion source 30 delivers a continuous ion beam into vacuum. By trapping and release of ions in multiple quadrupole assembly 62, 63, 64 or 65 (FIG. 2B), a continuous ion beam can be efficiently converted into a pulsed ion beam, with very high duty cycle as is described in U.S. Pat. No. 5,689,111. Multiple quadrupole assemblies 62–65 can be operated in non trapping or trapping mode where individual quadrupoles or segments of segmented quadrupoles are selectably operated in trapping or non trapping modes. For example, ions are trapped in quadrupole 24 by raising the DC offset potential applied to the rods of segments 39 and 40. As well, segments 39 and 40 can be operated primarily in RF only ion transfer mode to reduce or minimize any asymmetric DC fringing field effects that may exist at the entrance and exit of quadrupole ion guide 24.

Synchronous trapping and release of ions can be performed in several ion guides simultaneously. For example, ions can be trapped in ion guide 23 while mass spectrometer functions are performed in ion guide 25, and ions can be released from both ion guides 23 and 25 simultaneously, when the DC offset potentials applied to poles of segment 41 are decreased to release ions into ion guide 26. Additionally, ions can be stored in ion guide 23 while an ion packet is transported through ion guides 24, 25 and 26, and reverse-accelerated back into ion guide 25, for example. The three smaller ion guide segments 39, 40, 41 and lense 68 are configured in such a way that they can be switched sufficiently fast to enable trapping within the ion guides 23, 24, 25 or 26. Ion trapping during ion mass to charge selection allows the ion population in a given segment or quadrupole to be exposed to more RF cycles before being released to an adjacent segment, effectively increasing resolving power. Additionally, lower power requirements for resonant excitation and isolation methods are typically required when trapping vs. non-trapping. Mass to charge selection with ion trapping can be conducted with or without preventing the ions in the primary ion beam from entering the quadrupole where ion mass to charge selection or ion CID fragmentation is being conducted.

MS m/z Selection Functions

Single or multiple ranges of ion mass to charge selection can be performed as described in patent application Ser. No. 09/322,892. This is accomplished by applying to the rods of a quadrupole assembly, or to one or several segments of a segmented quadrupole assembly, with or without trapping, at low or moderate pressure, or within pressure gradients, the following:

Mass to Charge Selection

1. RF and +/−DC near the apex of the first stability region;
2. High mass rejection using high-q with RF-only or with RF and δ+/−DC;
3. Low mass rejection using low-q with RF-only or with RF and δ+/−DC;
4. Resonant frequency rejection of one or more ranges of ions;
5. RF, RF and δ+/−DC in combination with resonant frequency ejection, scanned or static Dipolar and/or quadrupolar resonant excitation can be performed using fundamental or higher order modes of excitation, in combination or alone, and dipolar excitation can be performed on one pole pair or both. Adjusting the phase between the dipolar frequency applied to the two pole pairs permits control of the ion trajectory within the quadrupole. For example, ions can be, rotated through the quadrupole by applying 90° phase shift between dipolar frequencies on the two pole pairs.

Each mass to charge selection technique list above can be applied individually or in combination in the hybrid quadrupole TOF illustrated in FIG. 2. Various approaches can be taken to achieve ion mass to charge selection in ion guide 24. Low amplitude RF plus +/−DC applied to ion guide 24 yields a large range of transmitted ions which can be further reduced using a mixture of resonant frequency waveforms. Alternatively, at low pressure, RF plus +/−DC near the apex of the first stability region can be applied, with or without additional resonant.

An approach suitable for trapped ions in two dimensional ion traps is described by Wells et. al. in U.S. Pat. No. 5,521,380 for mass to charge selection in three dimensional quadrupole ion traps. The frequency and amplitude composition of the applied resonant frequency waveform can be made of a number of subranges of frequencies. The ions are drawn into resonance within the subrange by sweeping the RF amplitude from power supply 80 applied to ion guide 24. This approach minimizes the number secular frequency components required to eject non selected ion m/z values and minimizes selected ion losses from off resonant frequency excitation during single or multiple ion mass to charge selection. Additionally, low masses can be ejected at the high q cutoff point near q=0.9 and high mass ions can be ejected near the low q~0 point.

The above approaches are expected to be more efficient in lower pressure regions if a low ion axial velocity can be maintained. The approaches discussed above were specifically applied to ion guide 24, but can as well be applied to ion guides 23, 25 and 26. Ion guide 25 is positioned in a higher pressure vacuum region, and therefore RF plus +/−DC at the apex is likely unsuitable.

An important aspect of the invention is that ion guides 23 and 26 are both positioned across pressure gradients. Typically, lower amplitude excitation is required in a low pressure region, and lower amplitude yields improved selectivity. Collisional cooling, which occurs in the high pressure portion of the ion guide, provides axial and radial velocity reduction; meanwhile resonant excitation and ion ejection, are applied in the lower pressure region using reduced amplitude than is required in a high pressure region. In this way, the amplitude can be set to provide improved selectivity only within the low pressure portion of the ion guide 23 or 26.

Narrowed Mass Ranges

Preventing unwanted ion m/z values from entering TOF drift region 73 allows more efficient detector response for those ion m/z values of interest, minimizing charge depletion. Radially ejecting undesired m/z value ions from the multipole ion guide prior to TOF pulsing to limit the ion population pulsed into flight tube drift region 73 to only those m/z values of analytical interest for a given application, helps to improve the TOF sensitivity, consistency in detector response and improves detector life. Referring again to FIG. 2*a*, ion guide 24 is a preferable notch filter relative to a higher pressure ion guide, since notch filter resolving power is better when using low pressure, due to lower required ejection amplitudes.

Low pressure RF plus +/−DC can be used on ion guide 24 in a low pressure region, efficiently passing a small range of ions according to the applied resolving power. Low pressure multi-frequency auxiliary excitation can also be applied to ion guide 24. This technique can permit several ranges of m/z to be transmitted simultaneously.

Fragmentation Functions

Ion m/z fragmentation as described in patent application Ser. No. 09/322,892, can be achieved by applying the appropriate voltages and waveforms to the rods of a quadrupole assembly, or to one or several segments 23, 24, 25, 26, 39, 40, or 41 of a multiple quadrupole assembly, with or without trapping, at low, moderate or high pressure, or within pressure gradients: Several techniques used to perform CID are outlined in patent application Ser. No. 09/322,892 and are included herein by reference. The following includes this list and extends it in part due to the extended capabilities of the present invention, within pressure gradients or in low or high pressure ion guides:

1. Axial DC ion acceleration in pressurized ion guide;
2. Axial DC ion acceleration in pressurized ion guide within pressure gradients or in low pressure ion guides;
3. Resonant excitation/radial acceleration of single or multiple ions, using dipolar or quadrupolar excitation, or some combination of dipolar and quadrupolar excitation, with dipolar used on one or both pole pairs in pressurized ion guide;

4. Resonant excitation/radial acceleration of single or multiple ions, using dipolar or quadrupolar excitation, or some combination of dipolar and quadrupolar excitation, with dipolar used on one or both pole pairs within pressure gradients or in low pressure ion guides;
5. Non-resonant AC ion acceleration;
6. Up-front capillary-skimmer CID;
7. High energy CID;
8. Boundary-activated dissociation;
9. A combination of boundary activated dissociation, axial DC acceleration and resonant excitation/radial acceleration;
10. Radial or DC acceleration along the z-axis in fringe fields;
11. Radial or DC acceleration along the r-axis in fringe fields;
12. Overfilling of quadrupoles during ion trapping until CID fragmentation occurs;
13. Fragmentation via ion-molecule reactions;
14. Fragmentation via ion—ion reactions;
15. Fragmentation via electron capture;
16. Fragmentation via photodissociation.

Each of these CID fragmentation techniques can be used individually or in combination in with the multiple quadrupole assembly 62, 63, 64 and 65. Dipolar and/or quadrupolar resonant excitation can be performed using fundamental or higher order modes of excitation, in combination or alone, and dipolar excitation can be performed on one pole pair or both.

The present invention provides the ability to perform improved and alternative CID functions in the pressure gradients. One aspect of the invention in FIG. 2, whereby ion guide 26 extends between a pressurized collision cell 51 and a low pressure region 50 through vacuum junction 45, is the ability to perform CID in the ion guide 26. This provides an alternative pressure regime that contributes to controlling the fragmentation pathway. Typically, when fragment ions are generated in ion guide 25, either by axial or radial acceleration techniques in the pressurized region 51, they are rapidly cooled, depending on the collision frequency. Because the fragmentation pathway depends on the rate of cooling, the fragmentation pathway can be controlled to some degree by controlling the rate of change of the collision frequency along the ion guide. In this way, axial or radial CID in ion guide 26 will give a different set of fragmentation patterns than ion guide 25, providing additional information not otherwise available.

Ion guide 26 extends between a pressurized collision cell 51 and a low pressure region 50 through vacuum junction 45. When fragment ions are generated in ion guide 25, either by axial or radial acceleration techniques in the pressurized region 51, they can then be transported through ion guide 26 at low energies prior to entering the low pressure region 50. As the ions exit the collision cell 51, they traverse a smoothly varying pressure gradient within an RF ion guide, whereby eventually the phase space of the ion beam freezes, and the high quality ion beam is preserved for exact focusing into the TOF 71. As stated earlier, an additional advantage of the invention is that the trap-pulse function described in U.S. Pat. No. 5,689,111 is decoupled from the higher pressure CID region 51. Here, trap-pulse ion release takes place in a low pressure region 49, permitting few losses due to scattering collisions, and a better defined focal point of the of the ion packet released into the TOF 71.

As is described in U.S. patent application Ser. No. 08/694,542 higher energy CID fragmentation can be achieved by accelerating ions back into quadrupole ion guide 26 a portion of which is located in the low pressure region of fifth vacuum pumping stage 50. Ions gated into the gap between lenses 68 and 69 are raised in potential by rapidly increasing the voltage applied to lenses 68 and 69. The potential applied to lens 68 is then decreased to accelerate ions back into multiple quadrupole ion guide 26. The reverse direction DC accelerated ions impact the background gas in ion guides 26, 41 and 25. In a similar manner, quadrupole ion guide 24 and 39 can be used to reverse accelerate ions into ion guide 23 in a repetitive manner to rapidly increase the internal energy of an ion population.

MS/MS$^n$ Hybrid TOF Functions n=2,3, . . . m

Continuous Flow Methods

Continuous flow methods have the potential advantage of speed, no duty cycle losses during fill and isolation steps, no requirement for synchronizing in the overall timing of pulse-trap, and no ion guide state change during acquisition.

1. Axial CID in ion guide 25 with simultaneous with radial excitation in ion guide 25 or 26, plus rapid background subtraction, plus on-the-fly or post-acquisition processing
2. Axial CID in ion guide 25 with simultaneous with radial-ejection filtering, followed by CID (radial or axial) in ion guide 25 or 26

Continuous beam MS/MS$^n$ analytical functions can be run using a segmented ion guide operating at high pressure with a non-continuous primary ion beam as described in U.S. provisional patent Ser. No. 09/322,892.

In one approach, background subtraction methods can be used to obtain MS/MS spectra with a continuous primary ion beam. Some of these techniques were described in U.S. patent application Ser. No. 08/694,542 and by Cousins et. al. (RCM in press), where the m/z selection does not take place prior to ion fragmentation. Instead two spectra are acquired sequentially, the first with a combination of parent or fragment ions and the second with the next generation fragment ions. The first acquired TOF mass spectrum is subtracted from the second to give a spectrum containing peaks of just the MS/MS$^n$ fragment ions. Referring again to FIG. 2, axial DC acceleration is applied to ions entering ion guide 25 in pressurized assembly 51 by adjusting the relative DC voltages of ion guide elements 23, 39, 24, 40 and 25. Resonant excitation in the form of dipolar or quadrupolar excitation is applied to ion guide 25 simultaneously. The selectivity of the MS/MS$^2$ is determined by the width of the excitation notch required to excite and fragment the precursor ion in ion guide 25. This process can be switched at a rapid rate by switching the excitation amplitude on and off (or high and low) applied to ion guide 25. This permits better averaging of short term fluctuations from the ion source, and therefore better background subtraction spectra. Typical rates correspond to the number of spectra acquired; for example, operating at 100 spectra per second requires a switch rate of 100 Hz. Additional improvements can be obtained by using on-the-fly or post-acquisition signal processing techniques to identify small fragment signals in the presence of strong precursor ion signals. For example, wavelet methods can be used to simultaneously compress the data, and simultaneously output with high certainty the MS$^n$ signal. Signal processing and correlation techniques may be used to further confirm the identity of the precursor ion in the case where the excitation source overlaps neighboring ions. In an analogous way, MS/MS$^4$ spectra can be obtained, by subtracting a similarly obtained MS$^3$ from MS$^4$. For example, a TOF mass spectrum can be generated with a two component resonant frequency excitation applied to ion guide 25, from which is subtracted a spectrum obtained with a single resonant excitation frequency applied, resulting in a mass spectrum containing fourth generation fragment or product ions and their specific parent ion. Although this approach may appear to be limited by the lack of isolation of the precursor ion prior to fragmentation, it may nonetheless be a preferred method for high sensitivity and high speed. Little or no loss is incurred during ion transport, and the speed is only limited by the transit time of an ion through the collision cell.

Referring again to FIG. 2, it is also possible to perform some or all of the above MS/$MS^n$ functions in ion guide 26, of which a portion extends into the collision cell assembly 51 and a portion is positioned in a low pressure vacuum stage 50. The relative DC offsets between ion guides 23, 39, 24, 40, 25, 41 and 26 can be adjusted to provide DC acceleration and fragmentation across any of the junctions. In the case where fragmentation is desired in a lower pressure region or a pressure gradient, acceleration can take place into ion guide 26. The positioning of ion guide 26 with respect to the junction 45 can be optimized to permit optimum pressure conditions. Similarly, resonant excitation can be applied to ion guide 40, 25, 44 or 26. In one example, both MS/$MS^2$ and MS/$MS^3$ can be performed in ion guide 26. Alternatively, MS/$MS^2$ can be performed using ion guide 25, followed by further manipulation on ion guide 26 for MS/$MS^3$, where the TOF spectra is obtained by subtracting the spectrum with one excitation frequency on from both excitation frequencies on. Finally, resonant excitation can be used for each stage of fragmentation in place of DC axial acceleration in the above embodiments.

A second approach using on-the-fly mass-to-charge selection of the fragment ion in the low pressure ion guide can be performed using a combination of resonant excitation and RF/DC techniques. As above, fragments can be generated in ion guide 25 or 26 by axial or radial acceleration. Moderate or large amplitude resonant excitation and wideband RF/DC can be applied to ion guides 25 or 26 to eject all ions but one or several m/z ranges, transmitting one or more fragment ions. A lower amplitude excitation source can be tuned to the m/z of the $MS^2$ fragment, which can be applied to the same ion guide 25 or 26 to generate the $MS^3$ fragments. Alternatively, the $MS^2$ fragmentation and isolation stages can be performed in ion guide 25 and $MS^3$ fragmentation step in ion guide 26, or isolation and further fragmentation can be applied to ion guide 26. An advantage of this last possibility within the embodiment of FIG. 2 is that the selectivity and power requirements for isolation in ion guide 26 may be optimized based on the location of junction 45 and the pressure gradients within ion guide 26.

As stated earlier, an advantage to resonant excitation waveforms used in the above embodiment is that they can transmit multiple m/z ranges simultaneously. It is possible to utilize this capability for higher throughput, for example in cases where the fragmentation spectra are known but quantitation is desired. This can be powerful when coupled with a high resolving power/high mass accuracy TOF 71 that yields a high degree of specificity with a high duty cycle.

Figure 16:
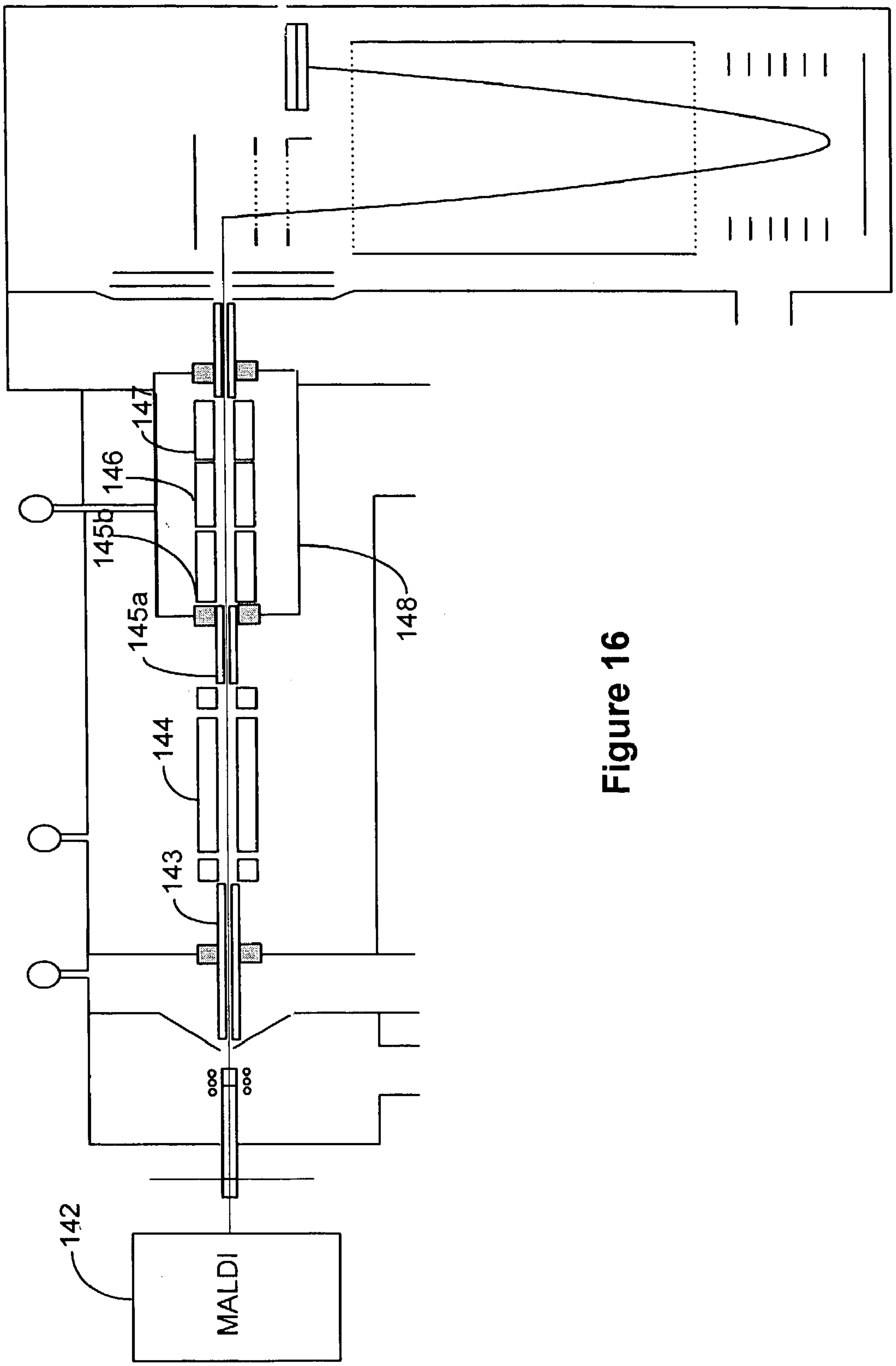
FIG. 16 illustrates an electrospray ion source orthogonal pulsing Time-Of-Flight mass analyzer with an ion reflector configured with nine multipole ion guides positioned in series along a common axis, and five differentially pumped vacuum regions. The first, and fifth and ninth ion guides extend continuously from a high pressure region to a lower pressure region. The three segments within the collision cell provide additional functionality.
Figure 19:
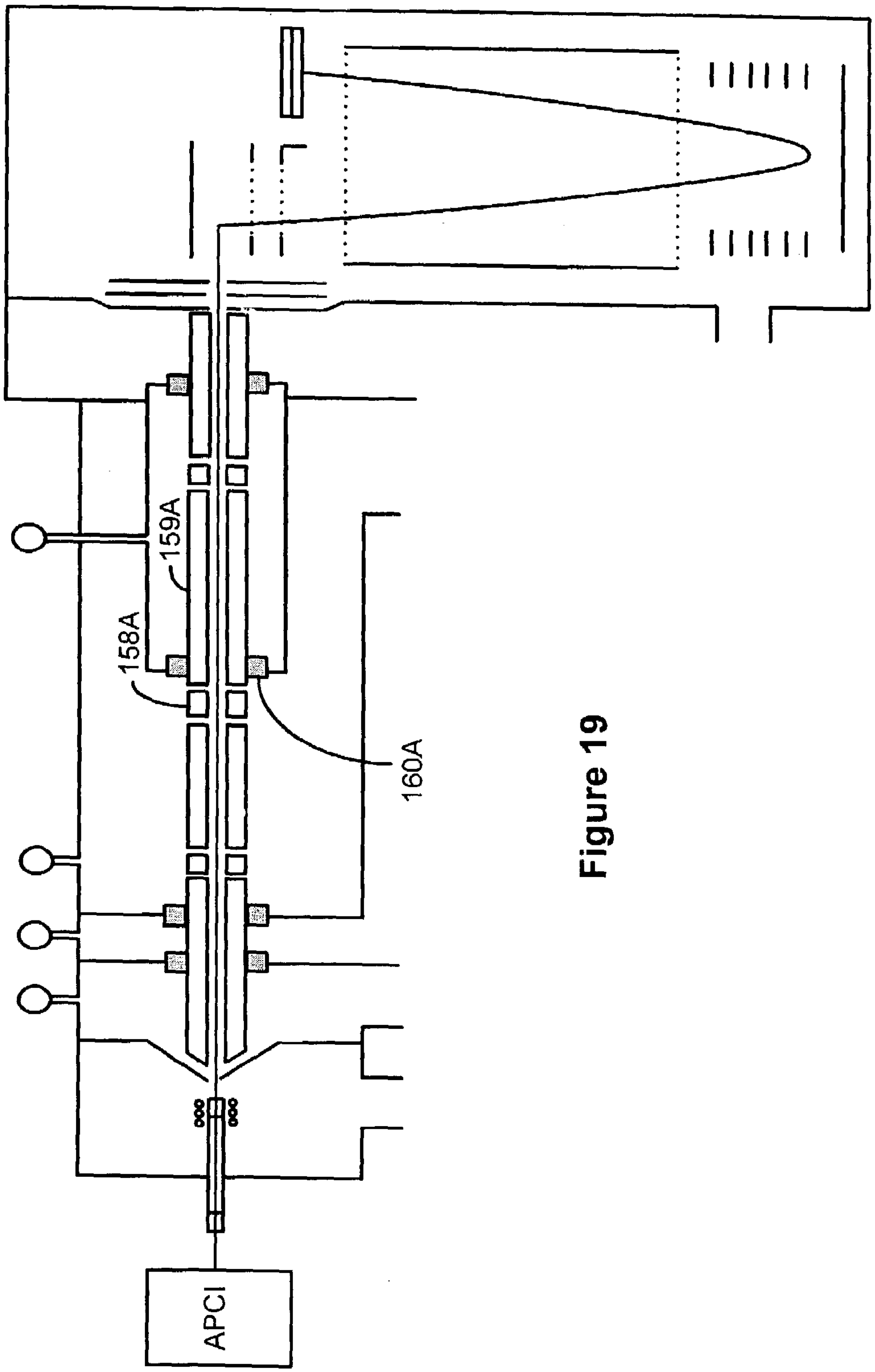
FIG. 19 illustrates an electrospray ion source orthogonal pulsing Time-Of-Flight mass analyzer with an ion reflector configured with seven multipole ion guides positioned in series along a common axis, and six differentially pumped vacuum regions. The first, and fifth and seventh ion guides extend continuously from a high pressure region to a lower pressure region.

An alternative approach to ion isolation and subsequent fragmentation MS/$MS^3$ is illustrated in FIG. 19. In the embodiment in FIG. 16, ions are generated by an atmospheric pressure MALDI source, are transported through the sampling region into ion guide 143, and mass to charge selected in the low-pressure ion guide 144. Ions are then accelerated into ion guide 145A or 145B by applying the appropriate DC offsets. In collision cell assembly 148, three ion guides 145B, 146 and 147 are configured to sequentially induce fragmentation, m/z isolation and subsequent fragmentation. The ion guides can be operated at the same voltage and frequency or different voltages and frequencies, and can be driven by separate RF supplies or can be capacitively coupled. Ion guide 145*a* or 145*b* is used for first stage fragmentation (using axial or radial CID). Ion mass to charge isolation occurs in segment 146 via a mixture of resonant excitation and RF plus +/−DC. Subsequent stage fragmentation is performed in ion guide 147. The lengths of each ion guide can be chosen to select the desired transit time through each ion guide. Five ion guides can be used for $MS^5$. An advantage of this approach is that each stage can be optimized separately for frequency and transit time, in order to optimize the overall $MS^n$ efficiency.

Trapping Methods

As stated in a previous section, trapping in a two dimensional ion guide permits the ion to have more time in the excitation fields, providing the opportunity to perform functions that may not be possible in a single mass continuous beam. For example, isolation techniques which require varying the RF voltage (thereby varying q) require more time than is often available during the ion transit through an ion guide, particularly in lower pressures. For example, an approach suitable for trapped ions which combines ramping the RF with a small range of excitation frequencies is described by Wells et. al. in U.S. Pat. No. 5,521,380. Ion trapping also permits clear definitions of timing, and clear definitions of ion beam composition, making it possible to synchronize multiple events. Some of the methods which can be used in conjunction with ion trapping are listed below. Some of these techniques are described in U.S. patent application Ser. No. 09/322,892 and are included herein by reference.

Referring again to FIG. 2, trapping voltages can be applied to segments 39, 40 and 41, as discussed in the above section on ion trapping. As discussed earlier electrostatic lenses can be applied in place of the segments or along with the segments if faster time response is required.

MS/MS can be performed using axial CID in ion guide 25 followed by the subsequent functions for MSn:

1. Multiple-stage/reverse-extraction and acceleration
2. Trap, isolate and radially excite in ion guide 25
3. Trap, isolate, radially excite in ion guide 26
4. Trap, isolate in ion guide 25 (RF/DC or radial methods) and axially activate in ion guide 26
5. Trap, isolate in ion guide 25 and radially excite in ion guide 26
6. Trap, isolate in ion guide 26 (using RF/DC or radial methods) and radially excite into ion guide 26
7. Trap, isolate in ion guide 26 using RF/DC or radial isolation; accelerate back into ion guide 25

Referring again to FIG. 2, MS/MS can be performed using radial CID in ion guide 25 followed by the subsequent functions for $MS^n$:

1. Trap, isolate and radially excite in ion guide 25
2. Trap, isolate, radially excite in ion guide 26
3. Trap, isolate in ion guide 25 (RF/DC or radial methods) and axially activate in ion guide 26
4. Trap, isolate in ion guide 25 and radially excite in ion guide 26
5. Trap, isolate in ion guide 26 (using RF/DC or radial methods) and radially excite into ion guide 26
6. Trap, isolate in ion guide 26 using RF/DC or radial isolation; accelerate back into ion guide 25

Synchronized trapping and release in ion guide 23 can take place while these events are occurring.

MS/MS$^n$ analytical functions can be run using a segmented ion guide operating at high pressure with a non-continuous primary ion beam as described in U.S. provisional patent Ser. No. 09/322,892. Several additional functional sequences are possible with multiple quadrupole assembly 22 and TOF mass analyzer 71 to conduct MS/MS$^n$ analysis with a non continuous primary ion beam in alternating pressure regions. The addition of multiple segments and additional quadrupole assemblies configured in higher and lower background pressure region allows operational and analytical variations not possible when conducting MS/MS$^n$ mass analysis sequences with a single segment or with a higher pressure analyzer region.

Referring again to FIG. 2A, in one embodiment of MS/MS$^2$, ions are accelerated into the pressurized ion guide 25 with ion guide voltage 40 held attractive, and they are trapped at the exit by applying repulsive voltages to ion guide 41. After some fill time Δt1 the voltage on ion guide 40 is raised to trap the ions at the entrance. Simultaneously, ion guide 39 can be held repulsive to trap ions in ion guide 23. M/z selection is performed over time Δt2 by one of the above-mentioned methods, for example according to the method described by Wells et. al. in U.S. Pat. No. 5,521,380 where a range of resonant frequencies is applied. As mentioned above, some combination of dipolar and quadrupolar excitation may be used, and the fundamental and/or higher order modes of excitation may be used. At time Δt3 an additional excitation source is applied such as resonant excitation, and finally at time Δt4 ions are released to the ion guide 26 by applying an attractive voltage to ion guide 41. Simultaneously, ion guide 23 releases a packet of trapped ions for mass selection in ion guide 24. Ion guide 26 is now triggered to perform high repetition rate trap-pulse into the TOF analyzer 71 according to U.S. Pat. No. 5,689,111.

In another embodiment of MS/MS$^2$, referring again to FIG. 2*a*, ion trapping in combination with a method of reverse extraction and acceleration, can be used. At t=0, a pulsed packet of ions is mass selected by ion guide 24 in a low pressure region, while the remaining ions are stored in the ion guide 23 by applying appropriate voltage to ion guide 39. Ion guide 41 is simultaneously raised repulsive. The packet of m/z-selected ions is fragmented in ion guide 23 through DC (or radial) acceleration using the appropriate DC offset on the ion guides 23, 39, 24, and 25. After a small time Δt1, the voltage on ion guide 40 is raised repulsive. The ions are given another small time Δt2 to cool and equilibrate with the background gas, at which point they are reverse-extracted into. After time Δt3 the ion guide voltage 40 is lowered, the voltage on ion guide 24 is set to RF-only at q=0.7, for example, while ion guide 39 is raised repulsive. The ions are released and trapped in low pressure ion guide 24, which benefits from weak leaks that surround it due to pressure gradients. The +/−DC is raised to provide a window of m/z transmission, which is further reduced by applying an additional resonant waveform to eject the remainder of unwanted ions. This waveform may simply be one additional excitation frequency. After some small time Δt4 ions are re-accelerated into the collision cell region for further fragmentation. After time Δt5 the trap-pulse sequence is triggered for ions to be passed through to ion guide 26 for pulsing into the TOF analyzer 71.

Background Reduction in Quadrupole Ion Guides

The configuration in FIG. 2 can be used to reduce chemical noise, thereby improving the TOF MS spectra quality. In one embodiment, ion guide 23 can operate with a small amount of +/−DC to reject high mass chemical noise. Alternatively, a wide range of auxiliary excitation frequencies, or a combination thereof, can be applied to eject background ions. Additionally, even in single MS mode using ion guide assembly 24 in RF-only mode and the TOF analyzer 71, advantage can be made of the pressurized collision cell 51, whereby ions can be accelerated at a sufficiently low voltage to preserve the ions of interest but sufficiently high to fragment undesirable weakly bound chemical contaminants (such as cluster ions).

Controllable Conductance in Multipole Ion Guides

Figure 17:
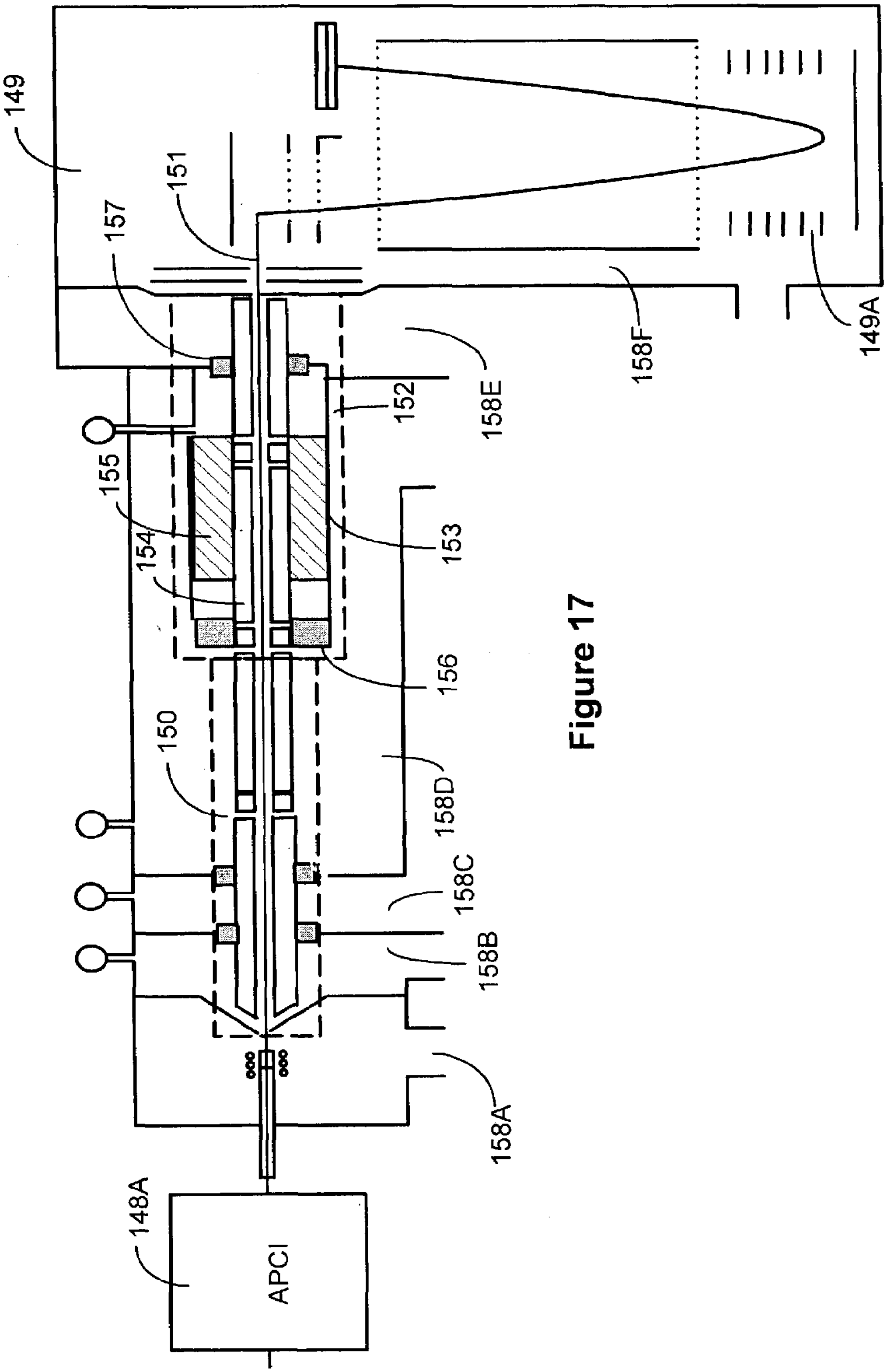
FIG. 17 illustrates an Atmospheric Pressure Ionization Source ion source orthogonal pulsing Time-Of-Flight mass analyzer with an ion reflector configured with seven multipole ion guides positioned in series along a common axis and six differentially pumped vacuum regions with a collision cell that is designed to be conductance limiting in a controlled manner.
Figure 18:
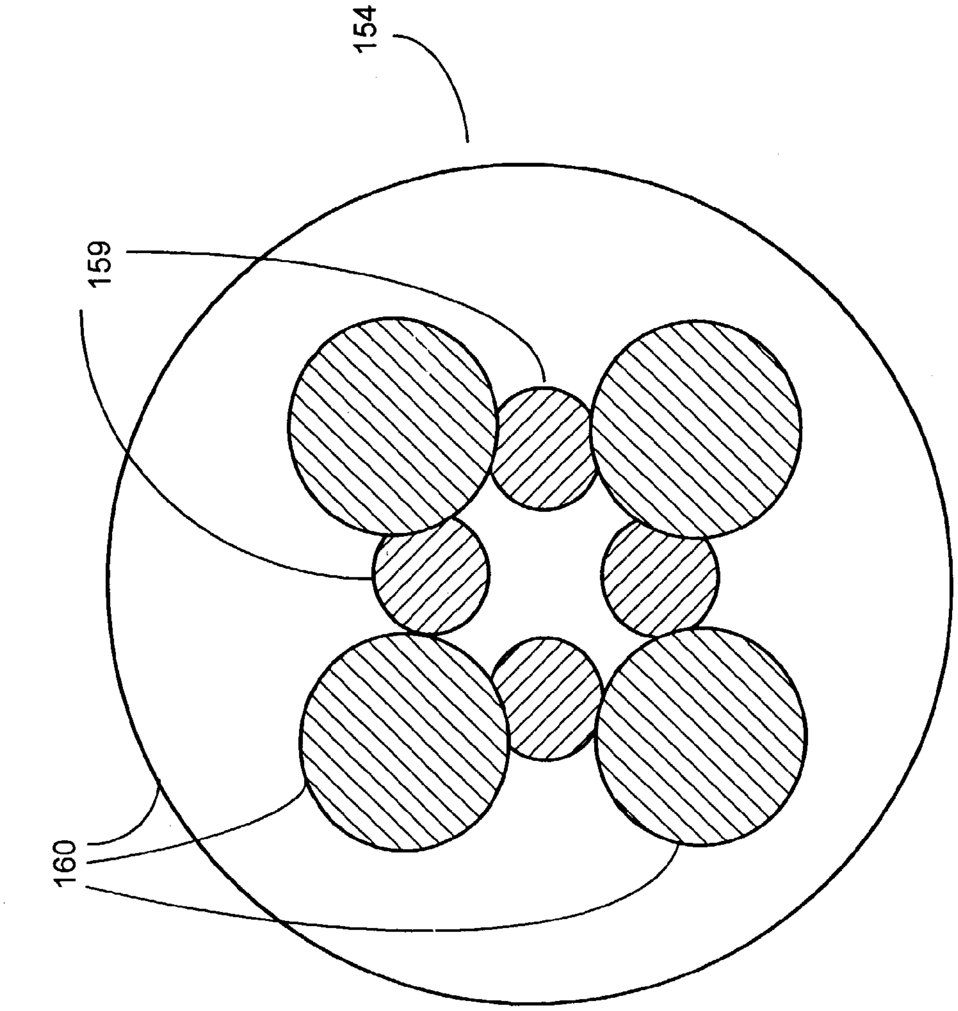
FIG. 18 illustrates the cross section of one embodiment of such a conductance limiting ion guide in FIG. 17.

The conductance through the ion guide can be manipulated or controlled in numerous ways. This is possible for both the ion guides that separate low and high pressure as well as the ion guides which extend into collision cell 51. FIG. 17 illustrates an Atmospheric Pressure Ionization Source 148, an orthogonal pulsing Time-Of-Flight mass analyzer 149 with ion reflector 149A configured with a seven multipole ion guide assembly 150 positioned in series along common axis 151 and six differentially pumped vacuum regions 158A–F. Ion guide assembly 154 in collision cell 153 that is designed to provide a neutral gas limit in a controlled manner. This has the advantage of reducing the gas load into the low-pressure vacuum stage 158D as well as providing control over pressure gradients within the ion guide 154. Collision cell 153 is constructed in such a way that ion guide mount 155 also serves to constrict the gas flow to path only ghrough the inside diameter bounded by the rods of ion guide 154. FIG. 18 illustrates a radial cross section of one embodiment of a conductance limited ion guide. The volume defined by quadrupole ion guide rods 159 is bounded by insulators 160 to restrict gas conductance through ion guide 154 without compromising performance. Similarly, the position of the junctions 156 and 157 can be varied with respect to the distance traveled along the ion guide to vary the conductance and the pressure gradients.

Ion Guide Positioning

As discussed earlier, the position of an ion guide with respect to the junction between low and high pressure regions can be adjusted judiciously for the optimum pressure regime. FIG. 19 illustrates an embodiment whereby ion guide 158 is placed in a low-pressure region and ion guide 159 extends through junction 60A. This configuration is desirable if element 158A performs trapping with higher efficiency in a lower pressure region, for example. The exact positioning of the ion guides depends on the particular application.

Number of Ion Guides

Figure 20:
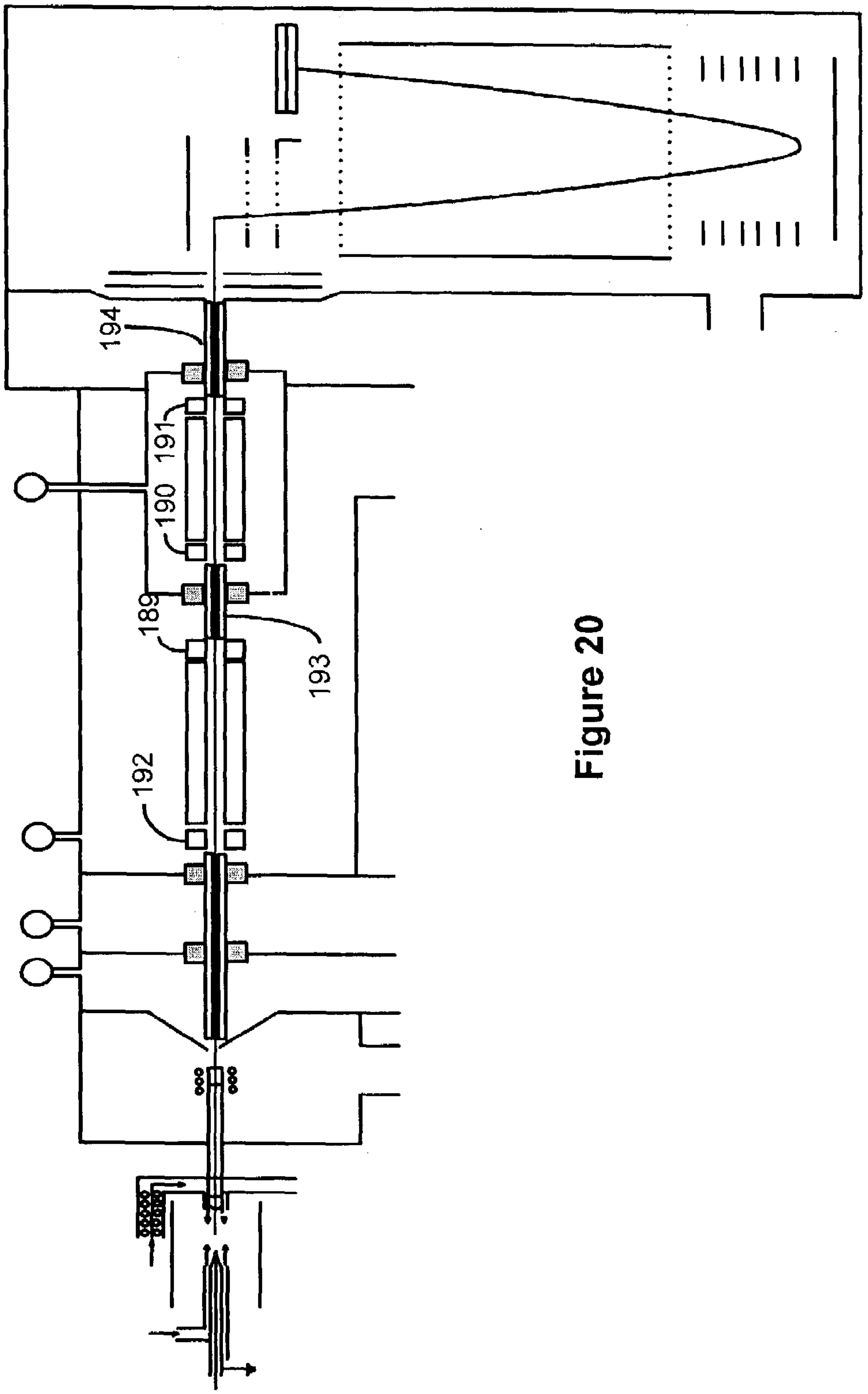
FIG. 20 illustrates an electrospray ion source orthogonal pulsing Time-Of-Flight mass analyzer with an ion reflector configured with nine multipole ion guides positioned in series along a common axis, and six differentially pumped vacuum regions. The first, fifth and seventh multipole ion guides are of smaller diameter than the rest, and extend continuously from a high pressure region to a lower pressure region. The first ion guide extends continuously through two vacuum regions.

Although the preferred embodiment in FIG. 2 diagrams a seven ion guide assembly, the number of ion guides in such assembly can range from one to as many as ten or more. FIG. 20 illustrates an alternative embodiment comprising nine ion guides whereby smaller length ion guides 189, 190, 191 and 192 may be used as ion gates to perform trapping functions, and smaller diameter rod ion guides 192 and 193 of longer length may be preferable to provide a conductance limit for higher pressure regions, as well as additional functions in the pressure gradients. Thus the number of ion guides, and their lengths and diameters, can be varied to optimize performance for a desired application.

Triple Quadrupole Capability

The term triple quadrupole is conventionally used to describe a configuration of three multipole ion guides axially aligned and positioned in a common vacuum pumping stage.

RF and DC potentials applied to individual multipole ion guide assembly in a triple quadrupole are supplied from separate RF and DC supplies. The collision cell in "triple quadrupoles" may be configured as a quadrupole, hexapole or octapole ion guide and is typically operated in RF only mode. The hybrid multiple quadrupole TOF as configured in FIG. 2 be can operated to simulate triple quadrupole MS/MS operating modes with the TOF operation replacing scanning quadrupole, obtaining full TOF spectra of fragment ions. Alternatively software methods can be used to correlate product ions and precursor ions without stepwise scanning. Conversion dynode 77 with detector 76 has been configured to detect ions that traverse pulsing region 56 and are not pulsed into TOF drift region 73.

As is also evident from FIG. 2, ion guide 26 can also serve as a second mass analyzing quadrupole, with the detector assembly 74, 75, 76, 77 and 78 permitting direct collection of the triple quadrupole ion current. Thus the preferred embodiment of the hybrid TOF instrument contains full triple quadrupole capability using ion guides or some combination of ion guides and the analyzing TOF 71. Ion guide 26 can be operated as a linear ion trap with mass selective axial ejection as described in U.S. Pat. No. 6,177,688 and in Hager et. al. Rapid Comunications in Mass Spectrometry 203; 17; 1056–1064.

Finally, as discussed earlier, the invention permits the improvement of the transmission characteristics of a resolving quadrupole. Therefore FIG. 7*a* represents an embodiment of the invention that yields improved triple quadrupole performance, and FIG. 8 represents an embodiment of the invention that yields improved single quadrupole performance. While FIG. 7A displays small diameter hexapole ion guides 111 and 114, it is appreciated that any multipole ion guide configuration can be used, of any appropriate diameter suitable for the vacuum pump requirements, including a quadrupole configuration. A quadrupole configuration for 111 and 114 may be preferable to yield additional functionality, as stated and to provide a narrower beam profile. Finally, electrostatic lens 111 can be removed (similar to FIG. 2A) with ion guide 113 providing the entrance for collision cell assembly 126.

Improved QMF Resolving Power Due to Increased Number of Cycles

Referring again to FIG. 2, higher resolving power can be achieved with the appropriate electric fields applied to the rods of quadrupole 24 if the ion population of interest spends more time resident in quadrupole 24, or experiences a greater number of cycles in the RF field. An advantage to the present invention is that ions can be transported between ion guides and between pressure regions continuously, with few losses. Ions can be trapped in the low pressure region 48 using a combination of ion trapping voltages applied to ion guides 39 and 44, and a judicious selection of ion guide 23 geometry, position and conductance, to yield the optimum pressure gradient into ion guide 39 and 24 and 40. If a small pressure gradient exists on either end of ion guides 31 and 40, then the ions can be selectively cooled as they are trapped in low pressure region 48. The RF plus +/−DC can be ramped to eject all ions except for the ion to be transmitted at the apex of the stability diagram. Additionally resonant excitation such as quadrupolar excitation applied to a lower resolving power RF/DC quadrupole can aid in improving resolving power and reducing losses do to asymmetric DC fringe fields.

Multi-Segmented Ion Guide for Ion Separation in Pressurized Regions

Figure 21:
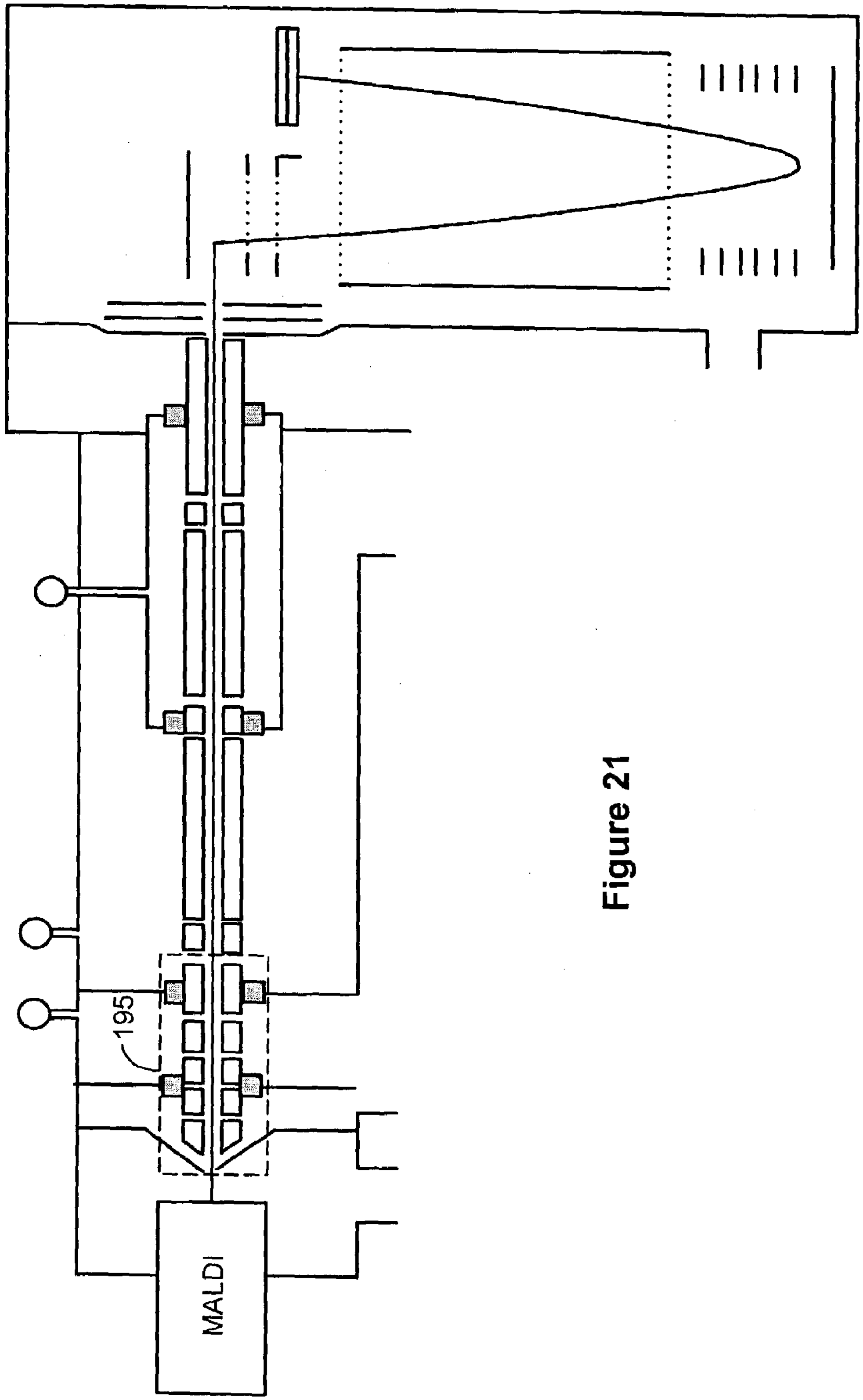
FIG. 21 illustrates a multiple segmented ion guide with the first ion guide consisting of discrete segments, one segment which extends continuously through a vacuum gradient, configured with a MALDI source.
Figure 22:
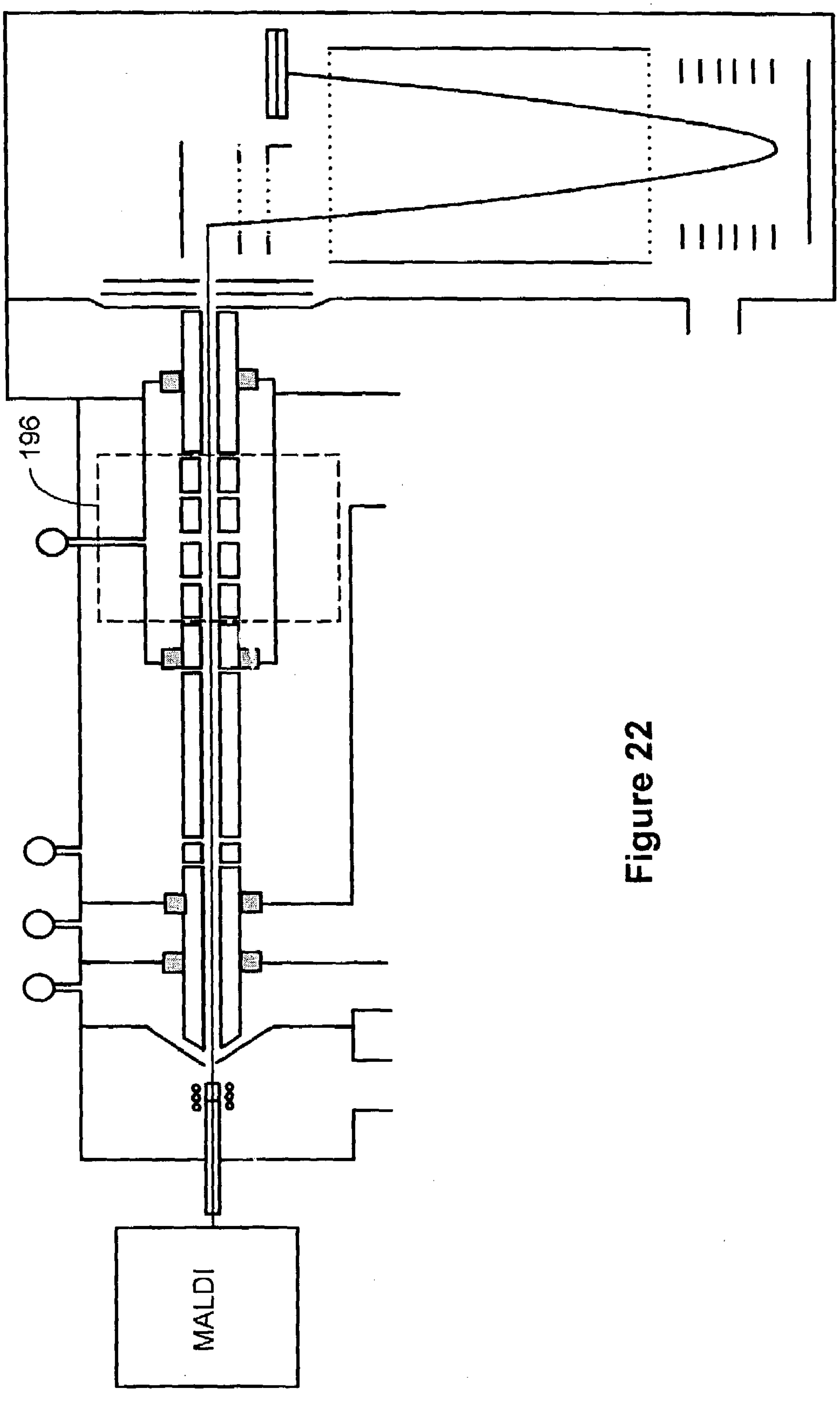
FIG. 22 illustrates a multiple segmented ion guide with the collision cell ion guide consisting of discrete segments, one segment which extends continuously through a vacuum gradient, configured with a MALDI source.

FIGS. 21 and 22 illustrate configurations whereby ion guides comprise shorter length segments configured coaxially. A DC gradient is applied along the segments. At least one segment of ion guide assembly 195 in FIG. 21 is positioned in a lower vacuum pressure region. As diagrammed in FIG. 22, ion guide assembly 196 can be configured such that the electric field gradient along the segmented ion guide assembly does not extend into a lower pressure region. It is possible to accelerate ions against the background gas to achieve ion mobility separation. This can aid in reducing spectral background by separating the components, and can serve as an additional source of information about the ion, such as molecular size and structure (via cross section measurements) or functional group bond strengths (via single collision energy dependence of fragmentation).

Continuous Ion Guide with Varied $r_0$ in Adjacent Pressure Regions

Figure 23:
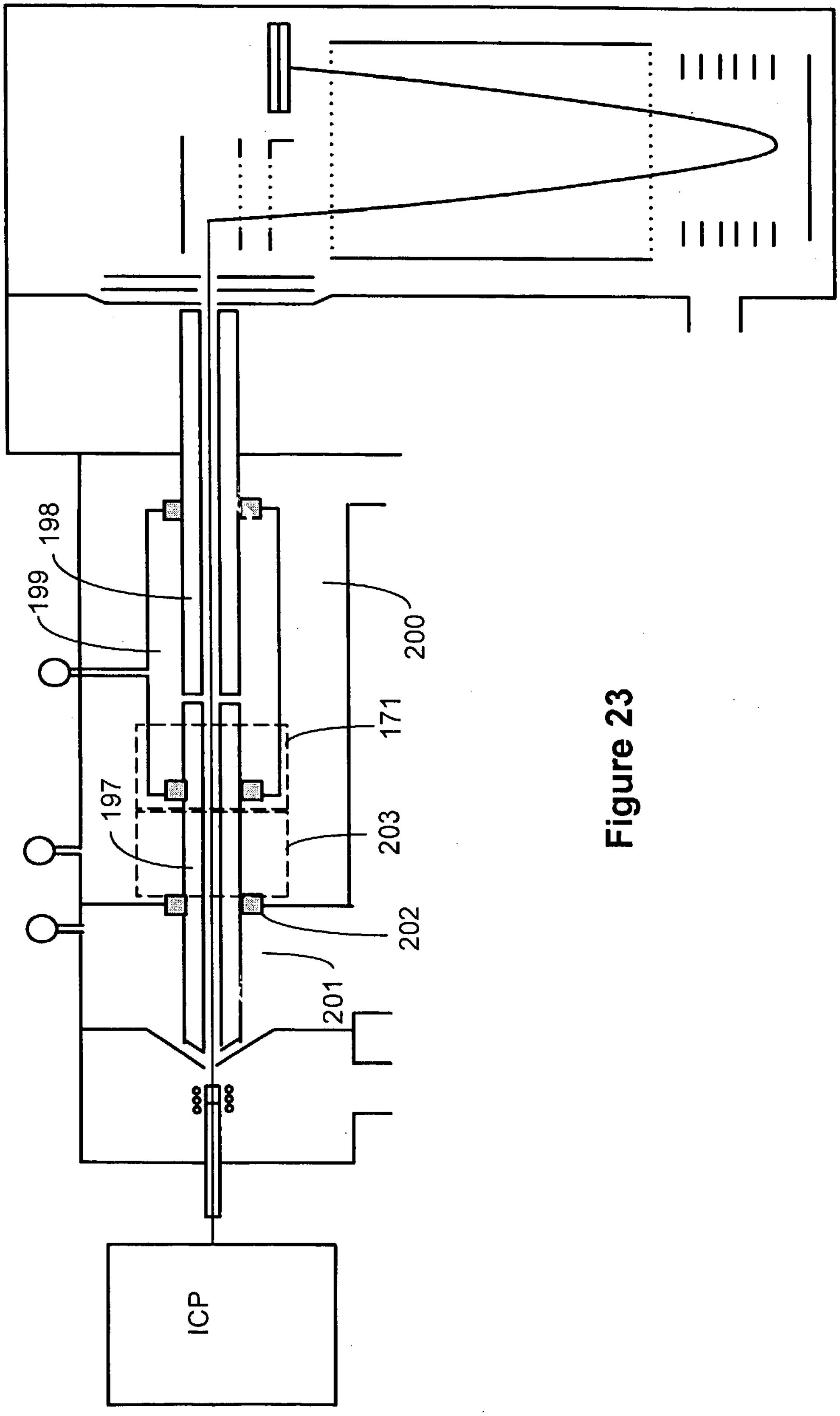
FIG. 23 illustrates two ion guides that extends continuously through five vacuum gradients, configured with a MALDI source.

FIG. 23 illustrates two ion guides 197 and 198 of equal $r_0$ that extend through adjacent vacuum regions. Collision cell 199 can be positioned anywhere along the ion path within vacuum stage 200. In this embodiment, ion cooling occurs in higher pressure vacuum stage 201 and ions are then smoothly transferred across junction 202 into lower pressure vacuum stage 200. Mass-to-charge selection can then be performed in region 203 using low amplitude resonant excitation, without substantially perturbing the ions in the high-pressure region 201. The increasing pressure gradient in region 204 aids to improve the resolving power of ion ejection due to a small amount of collisional cooling that occurs, preserving the low kinetic energy of the ion beam, and permitting a sufficient number of cycles within the RF field.

Figure 24:
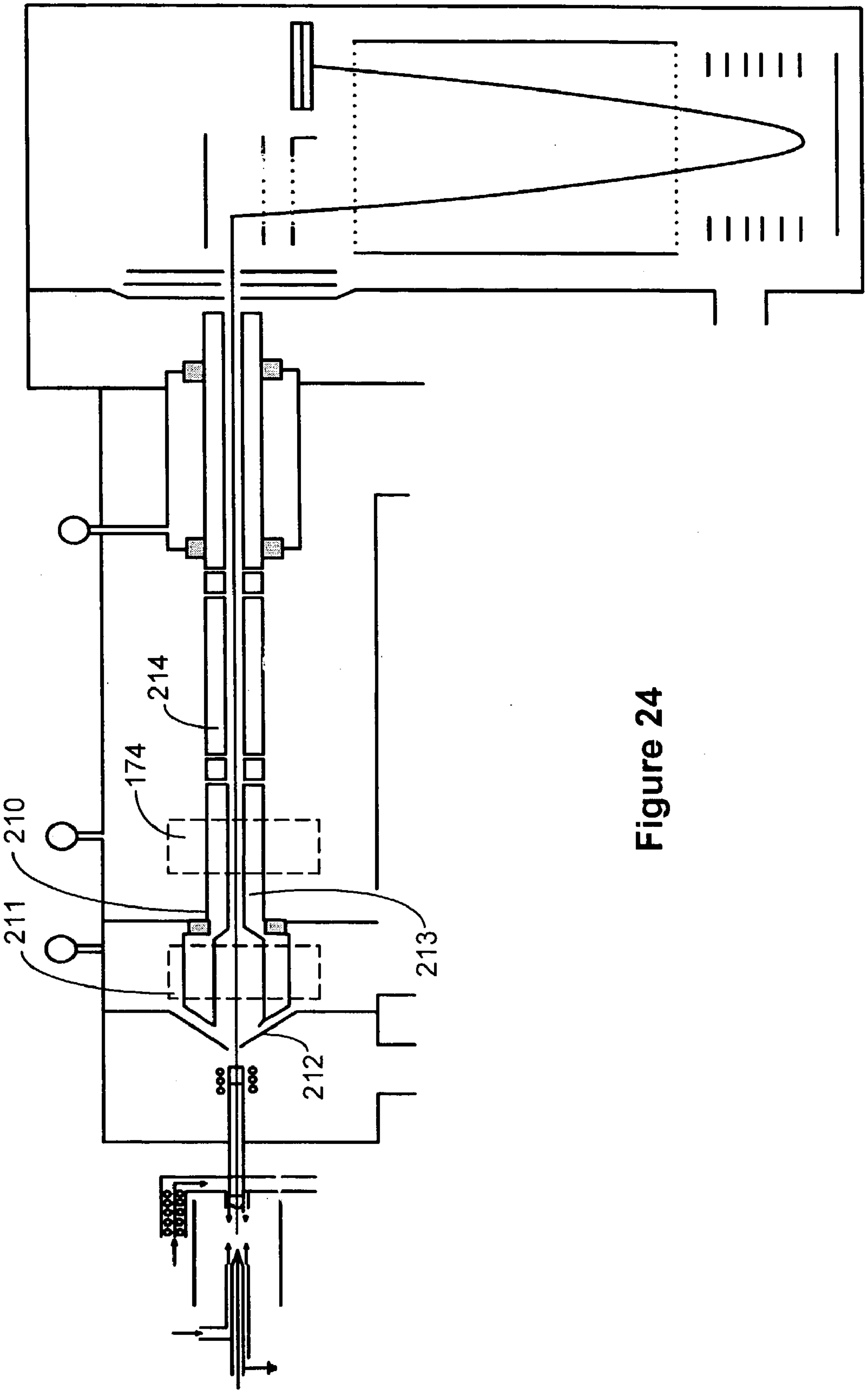
FIG. 24 illustrates multiple ion guides that extends continuously through five vacuum gradients, one that is configured with two discrete $r_0$ values, configured with a MALDI source.
Figure 25:
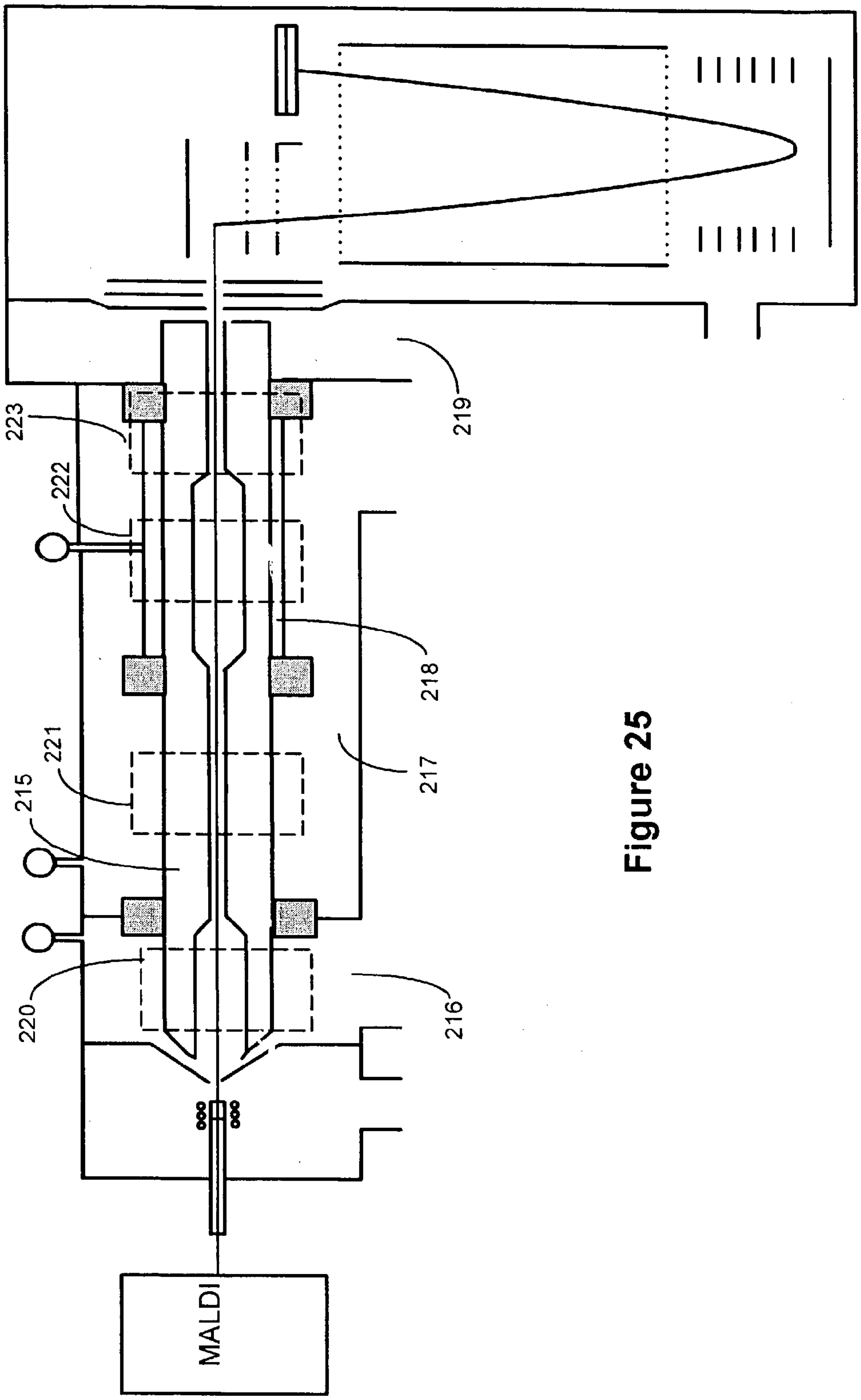
FIG. 25 consists of one ion guide of variable $r_0$ that extends continuously through two vacuum gradients MALDI source.

FIGS. 24 and 25 illustrate ion guide cross sections in which the vale of $r_0$ varies in a discrete fashion over the length of the rods. In FIG. 24, a single RF voltage is applied to the rods of ion guide 210. Two discrete values of q are created along the ion guide length that can be manipulated to serve a variety of purposes in various pressure regions. For example, region 211 operates at low q, and efficiently collects ions in region 211 of ion guide 210 downstream of skimmer 212. The inner diameter of rods 213 of ion guide 210 reduce to an effectively smaller $r_0$ yielding higher q. This configuration provides improved ion cooling prior to quadrupole 214.

FIG. 25 illustrates an embodiment whereby a single rodset 215 extends through multiple pressure regions 216, 217, 218 and 219. Again the rod $r_0$ is large is configured larger in region 220, is configured to a smaller value for region 221, enlarged for region 222, and shrunken for region 223. This configuration can be altered and optimized to improve performance for particular applications. The embodiment has the advantage of one RF power supply and potentially very high sensitivity. A range of resonant frequencies applied using dipolar excitation at ω can be used to mass select ions in the low pressure region 217 at low amplitude, and a larger amplitude different resonant frequency, for example at 2ω using quadrupolar excitation, can be used for CID, with a judicious choice of ro. Any number of permutations of this idea may prove useful.

Figure 26:
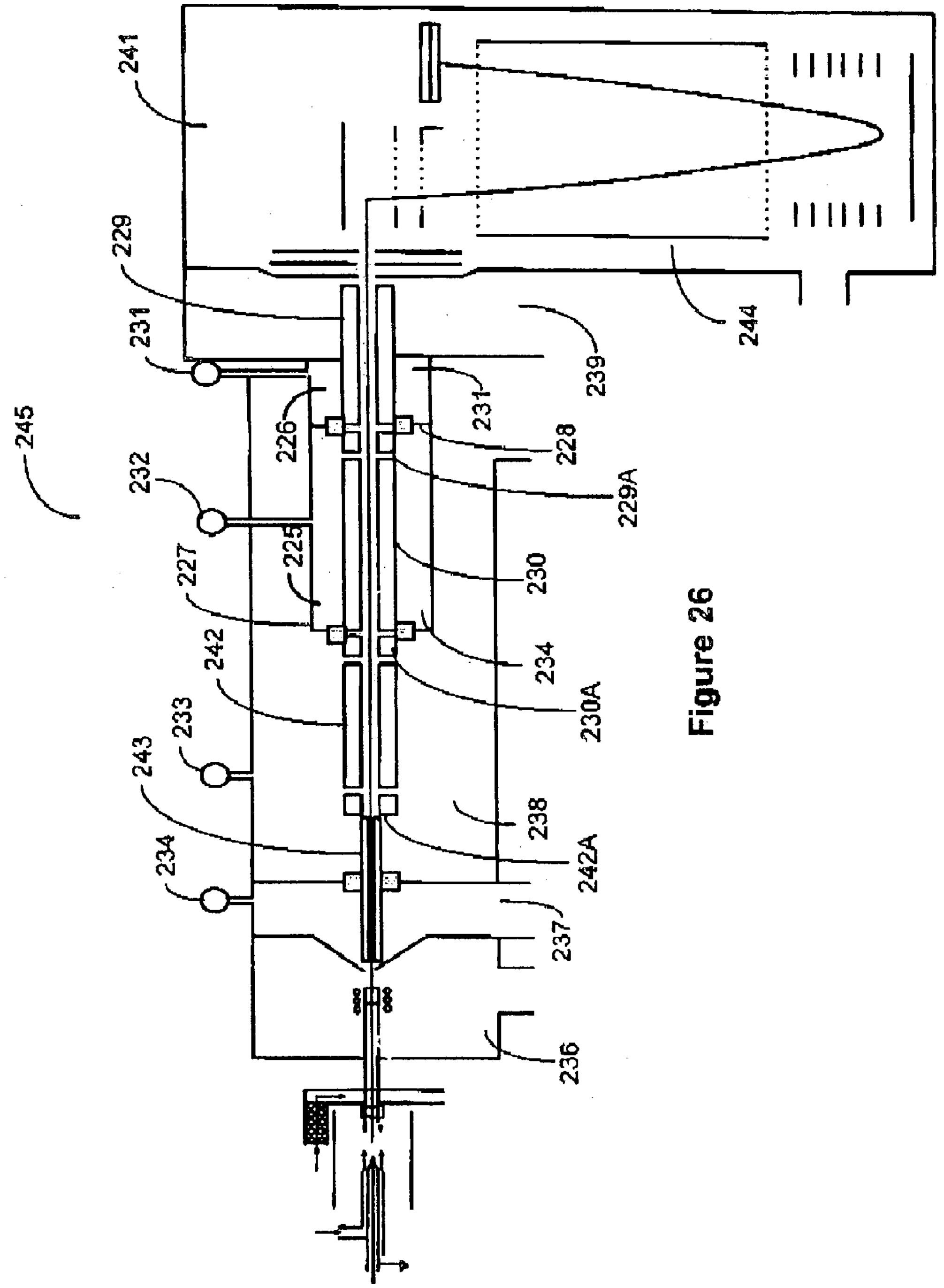
FIG. 26 illustrates an electrospray ion source orthogonal pulsing Time-Of-Flight mass analyzer with an ion reflector configured with seven multipole ion guides and two electrostatic lenses, with the seventh ion guide housed in a separate pressurized region. The ion guides are positioned in series along a common axis, and five differentially pumped vacuum regions. The first and seventh multipole ion guides extend continuously from a high pressure region to a lower pressure region.

Another embodiment of the invention is illustrated in FIG. 26. FIG. 26 diagrams an Electrospray ion source multiple quadrupole two dimensional (or linear) trap TOF (ES Quad 2D Trap TOF) 245 mass spectrometer comprising four multipole ion guide assemblies 243, 242, 230 and 229. Ion guides 242, 230 and 229 comprise entrance RF only segment or Brubaker lenses 242A, 230A and 229A respectively.

Independently controlled ion guides 230 and 226 extend into collision cell 227. Ions produced in the Electrospray ion source are swept from atmospheric pressure into first vacuum stage 236 and pass through the skimmer into ion guide 243. Ion guide 243, shown in this embodiment as a hexapole, extends through vacuum stage 237 and into vacuum stage 238. As discussed previously, ions may be trapped in hexapole 243 or directed through RF only section 242A and into quadrupole 242 by applying the appropriate relative offset potentials to the rods of ion guides 243, 242A and 242. Ions may be trapped in quadrupole 242 or directed through RF only segment 230A into quadrupole 230 by applying the appropriate relative offset potentials to the rods of ion guides 242, 230A and 230. RF/DC ion mass to charge selection can be conducted in ion guide 242 when vacuum stage 238 is maintained at sufficiently low pressure, typically below $3\times10^{-5}$ torr to avoid scattering losses caused by ion collisions with neutral background molecules. Ions may be axially accelerated into ion guide 230 with sufficient energy to fragment ions by CID with background neutral molecules provided sufficient background pressure is maintained in region 225 of collision cell assembly 227. Alternatively, ions can be fragmented with resonant frequency CID in quadrupole 230. The collision gas flow into region 225 of collision cell assembly 227 is varied by adjusting vacuum leak valve 232. The leak rate through the entrance end of ion guide 230 and 230A and the entrance end of ion guide 229 and 229A and the gas flow rate through valve 232 into region 225 establishes the background pressure in region 225.

The optimal operating pressure maintained in region 225 is application dependent. Vacuum pressure, ranging from $1\times10^{4}$ through 20 mTorr, can be set low to minimize ion transfer time through ion guide 230, increased to improve fragmentation efficiency or ion translational damping or adjusted to allow optimal ion mass to charge selection with minimum scattering losses. Parent or fragment ions may pass through or be trapped in quadrupole 230 by applying the appropriate offset potentials to the rods of ion guides 230A, 230 and 229A. One or more ion mass to charge ranges can be selected in quadrupole 230 by applying multiple notch resonant frequencies, adjusting RF amplitude, applying low level +/−DC and/or modulating the RF amplitude as explained in previous sections prior to gating or directing ions into ion guide 229. Additional ion fragmentation can be conducted using ion axial acceleration CID or ion resonant frequency excitation CID with neutral background gas. The gas pressure in region 226 of collision cell 227 can be separately varied relative to region 225 by adjusting the gas flow through vacuum leak valve 231. To improve or maintain consistent performance in orthogonal pulsing TOF mass analyzer 241, it is advantageous to maintain sufficient pressure in the entrance region of quadrupole 229 for collisional damping of ion translational energy to occur. Upstream ion mass to charge selection and fragmentation processes can increase the energy spread and change phase space trajectories of an ion beam leading to variable downstream electrostatic ion focusing conditions.

Collisional damping of ion translational energies in quadrupole 229 decouples the upstream analytical processes or even the ion selection and fragmentation processes occurring in quadrupole 229 by producing a low energy spread and reduced phase space profile ion beam prior to the ion beam exiting quadrupole 229 and traversing into the orthogonal pulsing region of TOF mass analyzer 241.

As was discussed earlier, efficiently damping the translational energy spread of the ion beam in ion guide 229 provides a consistent and well defined ion beam into the TOF pulsing region. By decoupling the upstream mass to charge selection and fragmentation processes from the ion energy and focusing properties entering the TOF pulsing region, optimal TOF performance can be maintained independent of the type MS to the $MS^n$ experiment being conducted. The pressure maintained in region 226 can be adjusted to achieve sufficient ion translational energy damping with trap or trappulse operation in the TOF mass analyzer 241. The pressure in region 225 can be varied to independently optimize performance for ion fragmentation and/or mass to charge selection steps conducted in quadrupole 230. The entrance and exits of collision cell assembly 227 are positioned in different vacuum stages 238 and 239 respectively. The gas conductance limit junction 228 in collision cell 227 allows a pressure differential to be maintained along the axis of collision cell assembly 227. The pressure in vacuum regions 238 and 239 can be maintained at different pressures by adjusting the respective pressures in regions 225 and 226. Adjusting the vacuum pressure in region 226 will affect the vacuum pressure in vacuum stage 239. Both pressures can be set to optimize ion guide 229 performance, minimize the gas load into TOF analyzer vacuum stage 244 and avoid ion to neutral collisions for ions exiting ion guide 229.

It may be advantageous to increase the background pressure in ion guides 242 or 243 for example to allow fragmentation of ions with CID in quadrupole 242. Gas can be leaked into vacuum to increase the pressure in vacuum stages 237 and 238 by adjusting the gas flow rate through vacuum leak valves 234 and 233 respectively. The embodiment shown in FIG. 26 provides increased flexibility in optimizing MS and $MS^n$ operation by incorporating multiple ion guide assemblies extending into a multiple pressure region collision cell with the ability to adjust background vacuum pressure in vacuum pumping stages 237, 238, 239 and regions 225 and 226 of collision cell 227.

Figure 27:
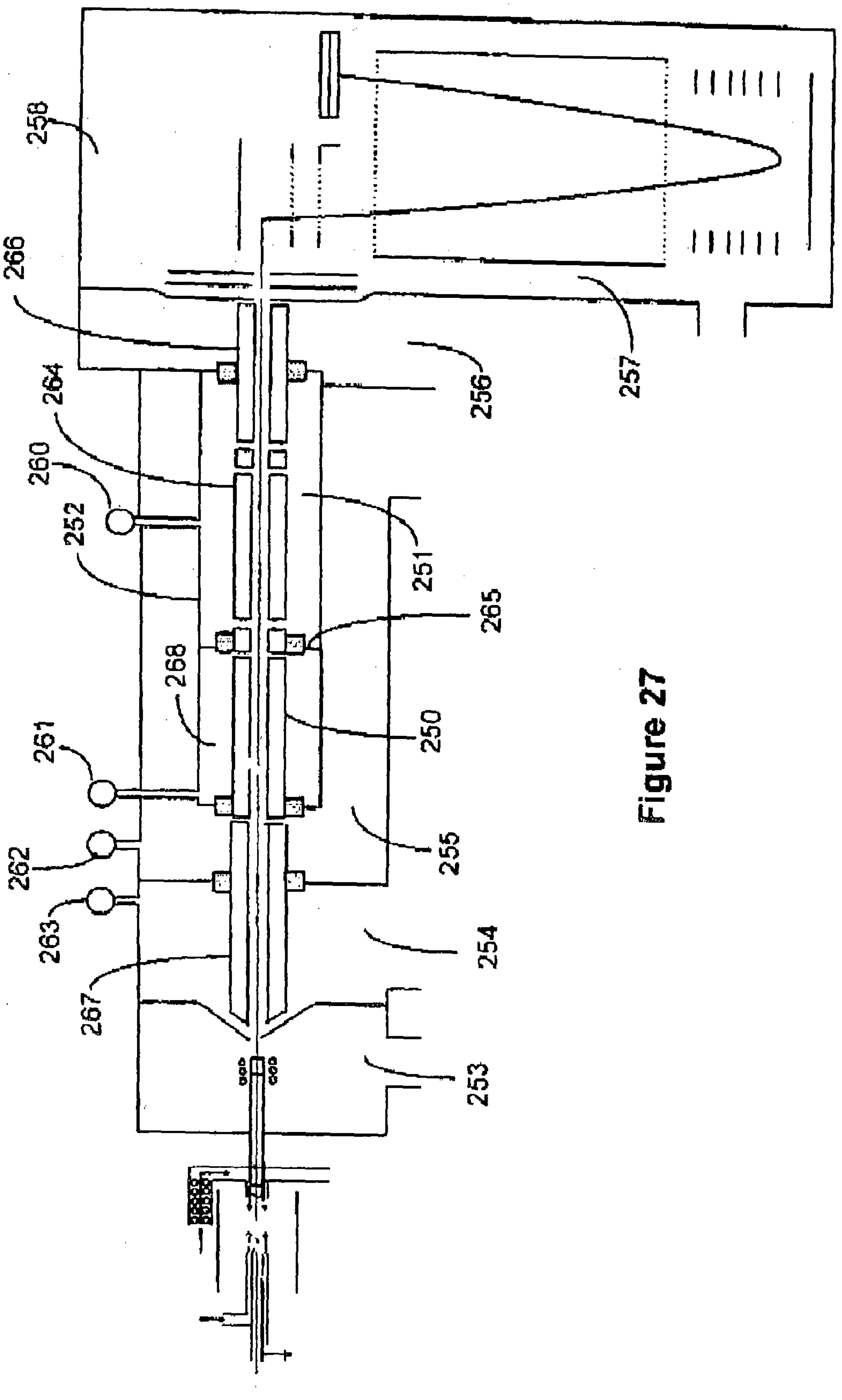
FIG. 27 illustrates a six segmented multipole arrangement, with the second ion guide in a separate pressurizable region.

An alternative embodiment to the invention is shown in FIG. 27 comprising three ion guide assemblies 250, 251 and 264 extending into or position in collision cell assembly 252 in a multiple quadrupole 2D trap TOF mass spectrometer. Collision cell 252 comprises two pressure regions 268 and 251 separated by gas conductance limiting junction 265. Background gas pressure can by separately varied in regions 268 and 251 by independently adjusting gas flow through valves 261 and 260 respectively. Background pressures in vacuum stages 254 and 255 can be further varied by adjusting the gas flow rate through valves 263 and 262 respectively. The hybrid TOF mass spectrometer embodiment shown in FIG. 27 is configured with five vacuum stages 253, 254, 255 256 and 257. Ion guide 250 extends from vacuum pumping stage 255 through collision cell region 268 and into collision cell region 251. One advantage of configuring three ion guides in collision cell assembly 252 is that $MS^4$ ion mass to charge analysis can be conducted with three axial acceleration steps into ion guides 250, 251 and 166 respectively after initial parent ion selection in ion guide 267. Sequential mass to charge selection of first and second generation ions is conducted in ion guides 250 and 264 respectively during $MS^4$ operation. $MS^4$ can be conducted with a continuous ion beam or with ion trapping with gated release in one or more ion guides 267, 250, 251 and 266 to achieve optimal performance. Axial acceleration provides efficient fragment ion production and allows retention of the full mass to charge scale. Typically, the bottom third of the mass to charge scale is lost with resonant frequency excitation CID. Alternatively, resonant frequency excitation CID can be performed in ion guides 267, 250, 251 and 261 if more selective and/or multiple component selective ion fragmentation is desired.

Figure 28:
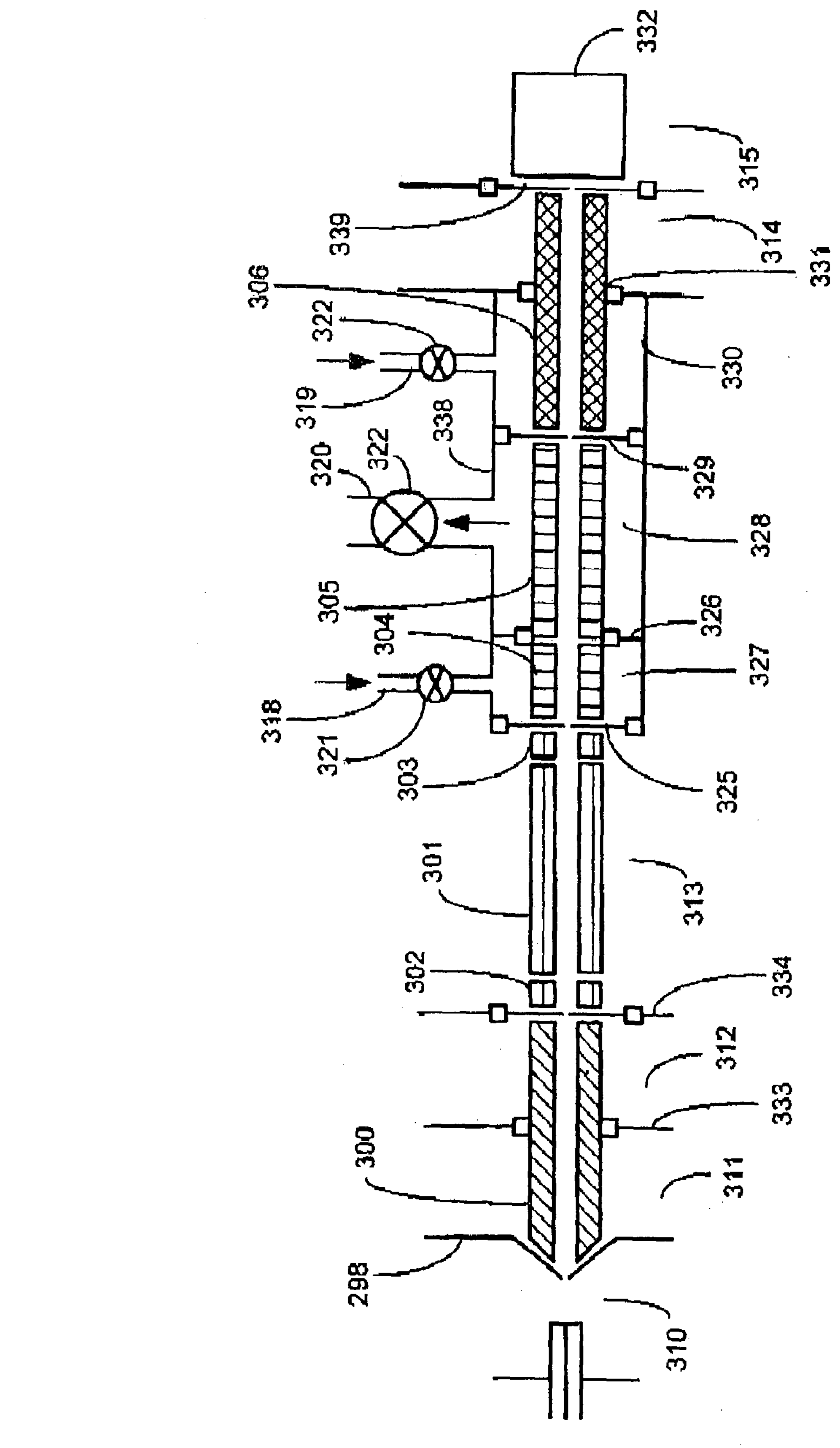
FIG. 28 illustrates multiple ion guide assemblies configured in a multiple quadrupole 2D trap mass spectrometer with an atmospheric pressure ion source, six vacuum pumping stages, and a collision cell assembly comprising three pressure regions.

Multiple Pressure Regions in Collision Cells Configured with One Vacuum Pumping Stage An alternative embodiment of the invention is shown in FIG. 28 wherein a four ion guide assemblies are configured in an atmospheric pressure ion source multiple quadrupole 2D trap mass spectrometer where the last mass to charge analysis step may be conducted with a range of mass analyzers including but not limited to TOF, FTMS, Quadrupole, three dimensional ion traps, two dimensional or linear ion traps, Magnetic Sector or Orbitrap mass analyzers 332. The hybrid mass analyzer as diagramed comprises six non variable pumping speed vacuum stages 310, 311, 312, 313, 314 and 315 and a variable vacuum pumping speed port connected to region 328 of collision cell assembly 338. Ion guide 300 extends from just downstream of skimmer 298 through and vacuum stages 311 and 312. Element 334 serves as an electrostatic lens and a vacuum partition between vacuum stages 312 and 313. Ion guide 301 with entrance and exit Brubaker lenses 302 and 303 respectively is positioned in vacuum stage 313. The vacuum pressure is maintained sufficiently low in vacuum stage 313 to enable conducting mass to charge selection with RF/DC in ion guide 301 with minimal ion scattering losses due to collisions with neutral background gas. The entrance end of collision cell assembly 338 is located in vacuum stage 313 and the exit end is positioned in vacuum stage 314. Vacuum stage 314 and 315 are separated by vacuum partition and electrostatic lens 339.

Collision cell assembly 338 comprises three pressure regions 327, 328 and 330 separated by gas conductance limit junctions 326 and 329. Regions 327 and 330 comprise separate gas leak inlets 318 and 319 respectively. Vacuum pressure in regions 327 and 330 can be separately varied by adjusting the gas flow rate through valves 321 and 322 respectively. Electrostatic lens, vacuum partition and collision cell assembly 338 entrance orifice 325 provides a gas conductance limit between region 327 and vacuum stage 313. Gas flow conductance limit junction 326 separates regions 327 and 328 allowing gas conductance only through the internal volume of ion guides 304 and 305. Element 329 with an orifice positioned on the centerline of ion guides 306 and 305 serves as an electrostatic lens and gas conductance limit between ion guides 305 and 306 and regions 328 and 330. Vacuum pumping port 320 with configured with valve 322 to adjust pumping speed evacuates region 328 of collision cell assembly 338. The collision cell assembly 338 embodiment as shown in FIG. 28 provides a increased flexibility and control of pressure gradients within ion guides 304, 305 and 306 configured in collision cell assembly 338. Maximum ion fragmentation efficiency can be achieved with axial acceleration of ions from ion quadrupole 301 into quadrupole 304 by increasing the pressure in region 327. Ion guide 304 can be capacitively coupled to ion guide 305 to reduce the number of independent power supplies and maximize ion transmission efficiency between ion guide sections 304 and 305. The pressure in region 328 can be reduced by pumping through vacuum port 320 to optimize ion mass to charge selection performance or ion resonant frequency excitation CID. The pressure gradient along ion guide segments 304 and 305 can be minimized by closing vacuum valve 332. The vacuum pressure in region 330 can be separately optimized by adding gas through inlet 319 for ion CID fragmentation, ion translational energy damping and decoupling of the upstream ion beam translational energy history with downstream mass analyzer 332. Although gas conductance orifices in elements 325 and 329 may reduce ion transmission efficiency between adjacent ion guides they allow larger ion guide rod diameters to be configured for ion guides 301, 304 and 305 when limited and lower cost vacuum pumping speed is available in vacuum stages 313 and 314. In practice vacuum pumping port 320 was connected to an unused interstage of a three interstage turbomolecular pump. Consequently, an increase in functional flexibility was achieved with minimum cost increase in the embodiment shown in FIG. 28.

Figure 29:
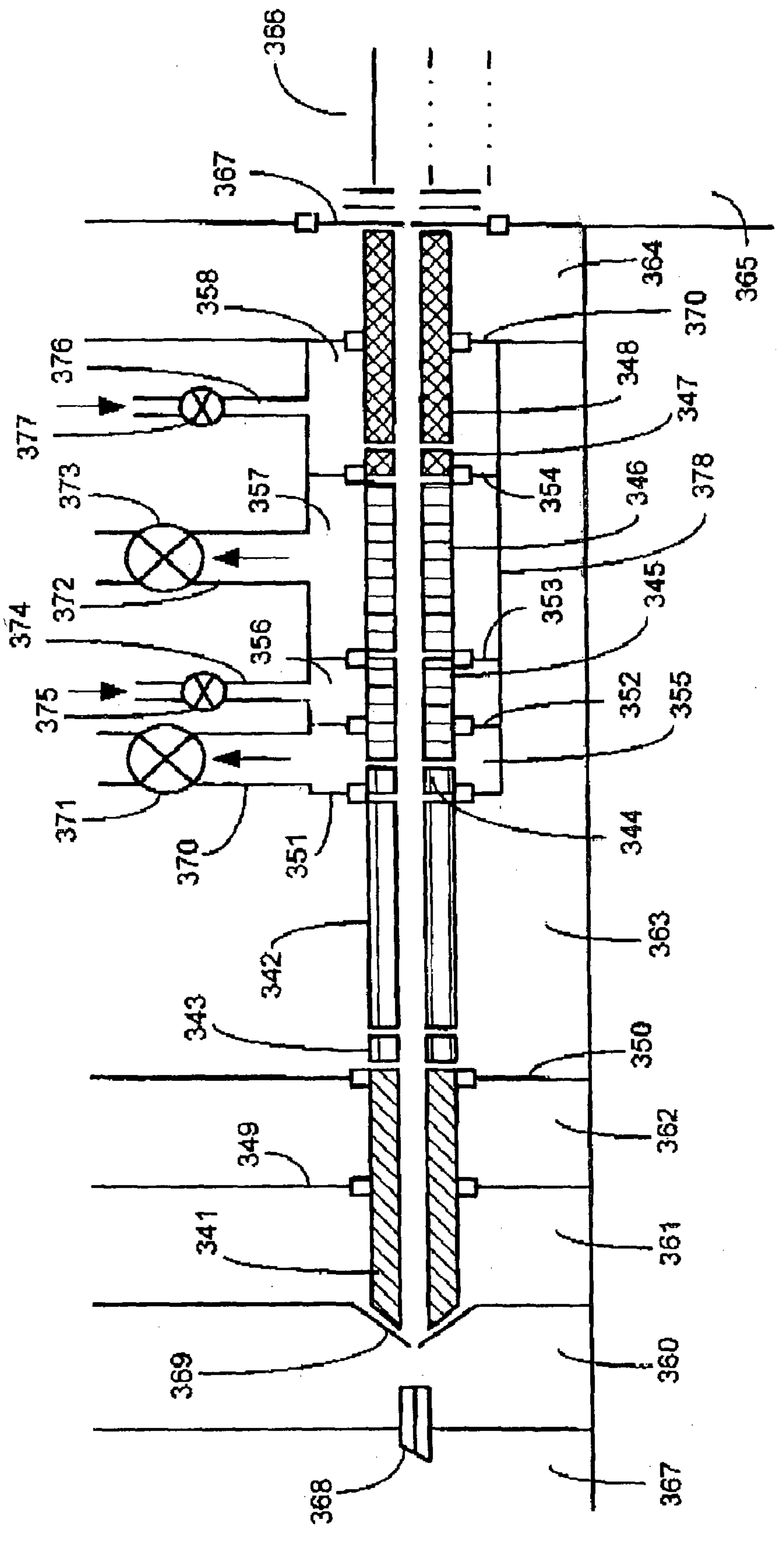
FIG. 29 illustrates multiple ion guide assemblies configured in an atmospheric pressure quadrupole 2D trap orthogonal pulsing TOF hybrid mass spectrometer with eight vacuum pumping stages, and a collision cell assembly comprising four pressure regions.

An alternative embodiment to the invention is shown in FIG. 29 where collision cell assembly 378 comprises four different pressure regions 355, 356, 357 and 358. Four quadrupoles assembles are configured in an eight vacuum stage atmospheric pressure quadrupole 2D trap orthogonal pulsing TOF hybrid mass spectrometer. Vacuum stages 360, 361, 362, 363, 364 and 365 are configured with non variable vacuum pumping speeds. Vacuum stages 355 and 357 configured in collision cell assembly 378 are evacuated through vacuum ports 370 and 372 respectively. Vacuum ports 370 and 372 are configure with adjustable vacuum valves 371 and 373 respectively. All electrostatic lens vacuum or conductance limit partitions positioned between ion guides in the previous embodiment have been removed in the embodiment shown in FIG. 29 to maximize ion transmission through the ion guide assembly and maximize analytical MS/MS$^n$ flexibility. A second vacuum pumping stage 355 has been added at the entrance of collision cell assembly 378 to reduce the gas load into vacuum stage 363 through quadrupole 342 with entrance and exit Brubaker lenses 343 and 344. Quadrupole 342 with exit Brubaker lens 344 extends from vacuum stage 363 through junction 351 and into region 355 of collision cell assembly 378. Quadrupole 341 extends through vacuum stages 361 and 362 exiting into vacuum stage 363. Quadrupole ion guide 348 with entrance Brubaker lens 347 extends through region 358 of collision cell assembly 378 and vacuum pumping stage 364. The entrance and exit ends of collision cell assembly 378 are positioned in different vacuum pumping stages 363 and 364 respectively to allow greater flexibility when optimizing the vacuum pressure in these regions. The cost effective eight vacuum system is evacuated with three modest size three interstage turbomolecular pumps and one rotary backing pump. The rotary backing pump also evacuates vacuum stage 360 with gas entering from atmospheric pressure ion source 367 through capillary orifice 368.

The four region collision cell assembly 378 shown in FIG. 29 allows higher pressure to be maintained in regions 356 and 358 during operation to maximize ion CID fragmentation efficiency and ion translation energy damping. Higher pressure gradients along the axis of collision cell assembly 378 can also be maintained with dual vacuum ports configured in collision cell assembly 378. The pressure in region 356 is varied by adjusting the gas flow rate through vacuum leak valve 375 connected to gas inlet 374. Similarly, the pressure in region 358 can be controlled by adjusting the gas flow rate through vacuum leak valve 377 connected to gas inlet 376. Vacuum stage 355 reduces gas conductance into vacuum stage 363 while maximizing ion transmission efficiency between ion guide assembly 342 and 346. Vacuum stage 357 allows selective reduction of pressure in region 357 while maintaining maximum ion transmission efficiency between in guides 345, 346, 347 and 348. The collision gas entering through gas inlets 374 or 376 may be heated and/or all or portions of collision cell assembly 378 may be heated to improve fragmentation efficiency in ion axial or resonant frequency excitation CID fragmentation. The DC offset potentials applied to ion guide sections 343, 344 and 347 can be switched to trap ions in or release ions from upstream ion guides into downstream ion guides or vice versa. Ion mass to charge selection can be conducted in ion guides 341, 342, 346 and 348 and ion CID fragmentation can be conducted in ion guides 341, 342, 345, 346 and 348 to achieve MS/MS$^n$ mass analysis functions. The pressure gradient along the length of the multiple quadrupole ion guides extending into and located in collision cell assembly 378 can be adjusted to maximize performance for each MS$^n$ function. Alternatively hexapole or octopole ion guides may be configured instead of quadrupoles for one or more ion guides shown in FIG. 29. Alternative mass analyzers including but not limited to FTMS, Quadrupole, Magnetic Sector, three dimensional ion trap, two dimensional ion trap or Orbitrap may be configured instead of the TOF mass analyzer as diagrammed in FIG. 29 with orthogonal pulsing region 366.

Figure 30:
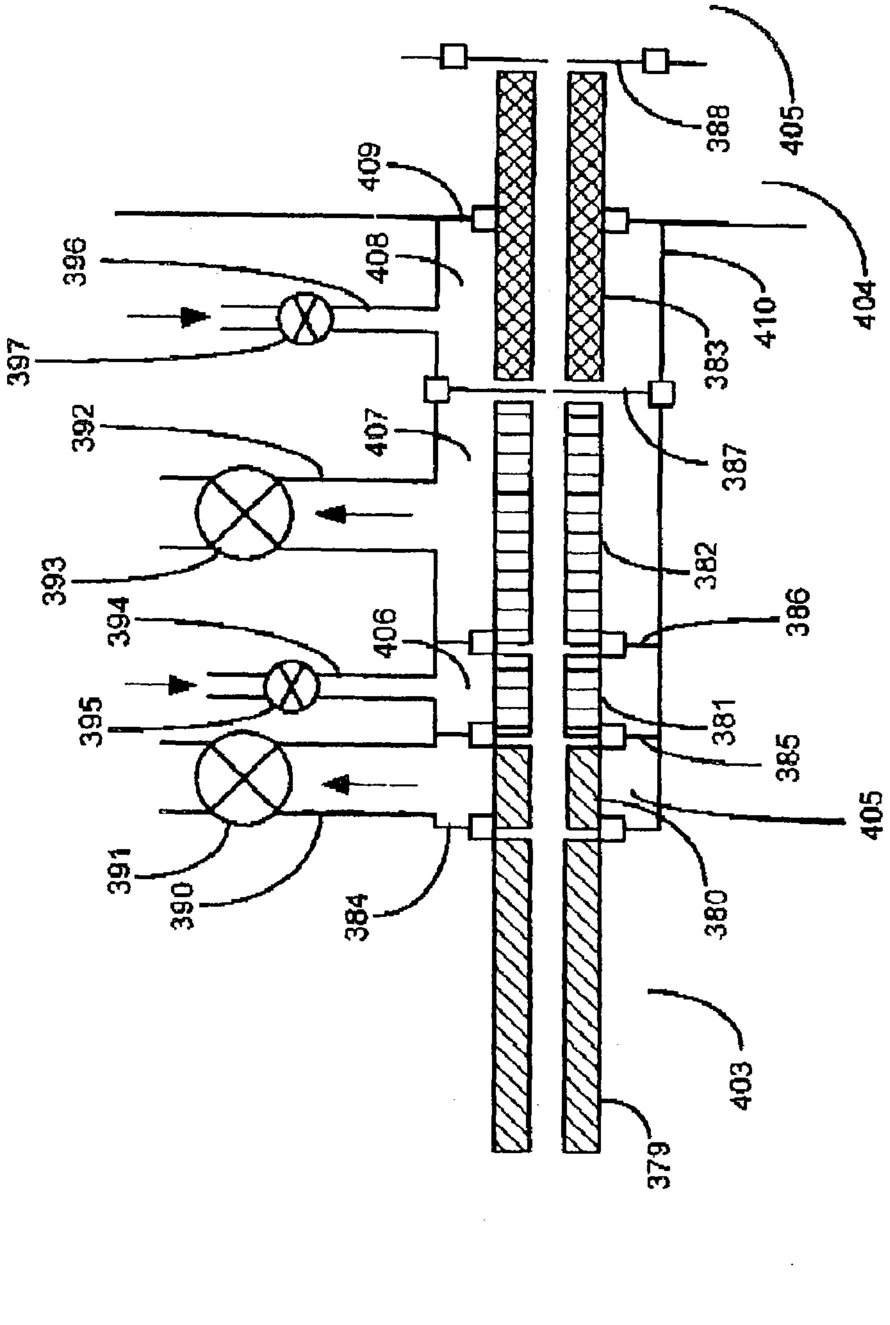
FIG. 30 illustrates the multipole ion guide assemblies diagrammed in FIG. 29 in which an electrostatic lens and vacuum conductance limit element replaces one of the ion guide sections, or Brubaker lens, configured in the embodiment shown in FIG. 29.

An alternative embodiment to the invention is shown in FIG. 30 where electrostatic lens and vacuum conductance limit element 387 has replaced ion guide section or Brubaker lens 347 in FIG. 29. The addition of DC lens 387 creates a more restricted conductance limit that allows a larger pressure differential to be maintained between regions 407 and 408 of collision cell assembly 410. The compromise is reduced ion transport efficiency between ion guides 382 and 383. A higher pressure in collision cell region 408 can be maintained by adding gas through entry 396 to maximize ion axial CID efficiency and ion translational damping while minimizing the gas load into collision cell region 407. The pressure in region 407 can be reduced by opening vacuum valve 393 connected to vacuum port 392. Lower pressure may be maintained in region 407 compared with upstream and downstream regions 406 and 408 to optimize mass to charge selection and/or radial excitation CID fragmentation performance or to increase ion transit speed through ion guide 382. Vacuum pumping region 405 with vacuum pumping port 390 and vacuum valve 391 reduces the gas load flowing through junction 384 into low pressure vacuum stage 403 from the higher pressure collision cell region 406. Ion guide section 380 may be capacitively coupled to quadrupole 379 to minimize power supply requirements and maximize ion transmission efficiency between ion guide rod sets. Similarly, ion guide 381 may be capacitively coupled to ion guide 382. Collision cell regions 405, 406, 407 and 408, bounded by gas conductance limit junctions 384, 385, 386, 387 and 409, provide a high degree of flexibility to create optimal pressure regions and gradients in ion guides 380, 381, 382 and 383 to maximize MS/MS$^n$ performance. The entrance and exit ends of collision cell assembly 410 are configured in different vacuum stages 403 and 404 respectively allowing a decoupling of entrance and exit gas loads into the upstream and downstream vacuum regions. Electrostatic lens element 388 forms a vacuum partition between vacuum stages 404 and 405. A variety of mass analyzers can be configured downstream of lens 388 as described above. DC potentials can be applied to the rods of quadrupole ion guides 403, 380, 381, 382 and lens elements 387 and 388 to allow trapping and release of ions in adjacent ion guides to improve ion mass to charge selection resolving power, resonant frequency excitation CID fragmentation efficiency and translational energy damping. The ability to optimize each step of an MS/MS$^n$ experiment and to effectively decouple the upstream MS/MS$^n$ processes from the final mass analysis step increases sensitivity, resolving power, mass measurement accuracy and consistency of performance in MS/MS$^n$ experiments.

Figure 31:
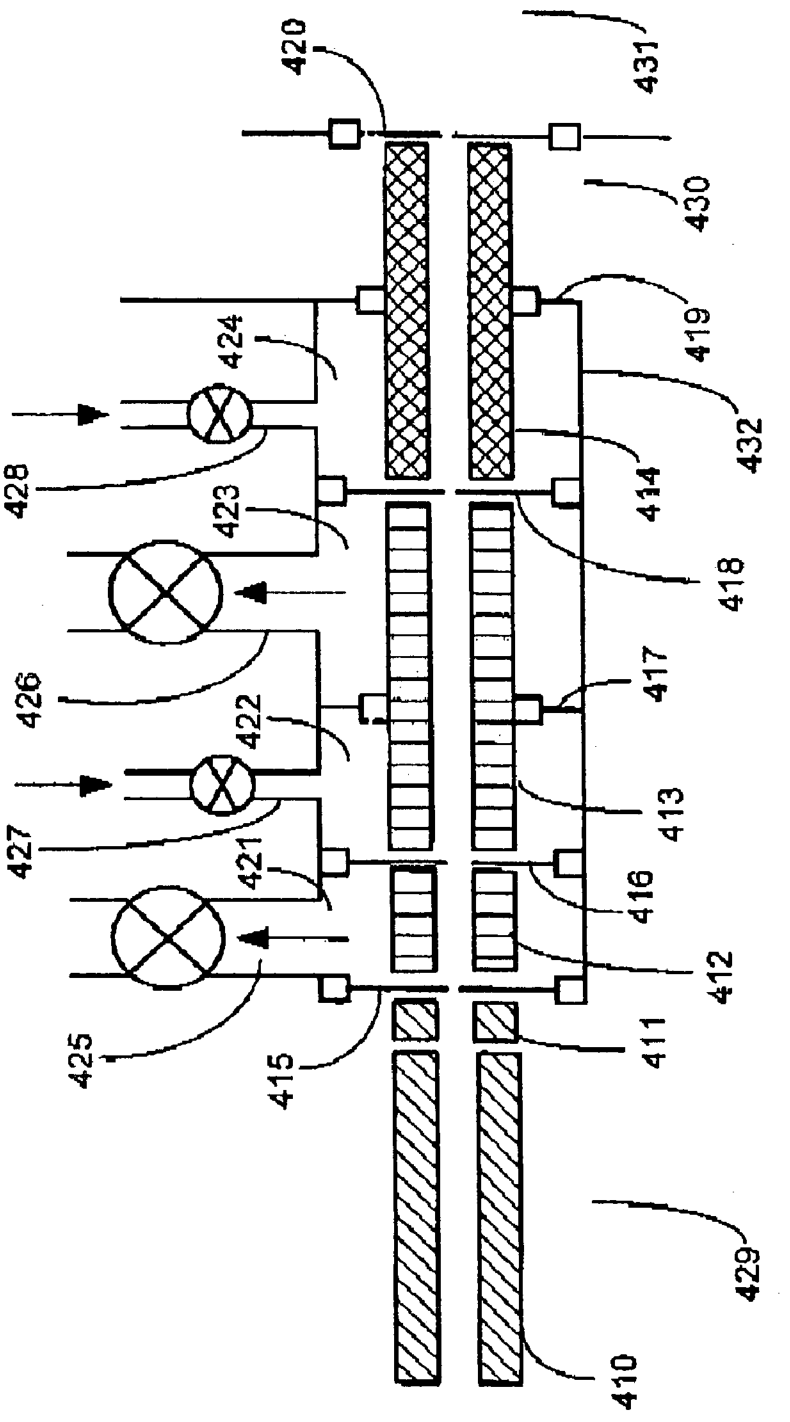
FIG. 31 illustrates an embodiment of the invention wherein electrostatic lenses separate four ion guide assemblies and different vacuu stage and collision cell regions.

An alternative embodiment of the invention is shown in FIG. 31 where lens elements 415, 416 and 418 are configured as gas conductance limits between regions 421, 422, 423 and 424 of collision cell assembly 432. The reduced gas conductance provided by elements 415, 416 and 418 allow greater pressure differentials to be maintained in regions 421, 422, 423 and 424 of collision cell assembly 432. A higher gas pressure can be maintained in region 422 with less gas load delivered to vacuum stage 429 allowing lower pressure operation in ion guides 410 and 411. Junction 417 provides a gas conductance limit along the length of ion guide 413. This allows the maintenance of a vacuum pressure gradient through the length of ion guide 413 similar to the vacuum pressure gradient that can be maintained along the length of ion guide 414 during operation. The pressure in the upstream end of both ion guides 413 an 414 can be increased to allow efficient ion fragmentation or ion energy damping. The ion guide exit ends extend into a reduced pressure region that allows more controlled ion mass to charge selection and ion transport through downstream lens elements 418 and 420 with fewer collisions with neutral background gas molecules. Ion guide 412 which may be capacitively coupled to ion guide 413 or connected to an independent set of power supplies can be operated as a collision region with ion fragmentation, ion trapping and/or ion mass to charge selection functions. Conductance limiting elements 415, 416 and 418 allow ion guides 410, 41 412, 413 and 414 to be configured with larger rod diameters and $r_0$ values even with limited vacuum pumping speeds available through vacuum ports 425, 426 and in vacuum pumping stage 429. Reduced gas conductance between collision cell regions allows higher pressure to be maintained, if required, in regions 422 and 424 with lower gas flow rates through gas inlets 427 and 428 respectively. The lower total gas load into the vacuum system the smaller and more cost effective the vacuum pumps required to maintain desired vacuum pressure levels. The tradeoff of reduced gas conductance DC lenses configured between ion guides is a reduction in ion transfer efficiency between ion guides reducing sensitivity and analytical function flexibility. The embodiment shown in FIG. 31 can be configured with several types of mass analyzers positioned in downstream region 431. DC voltages can be applied to ion guides 410, 411, 412, 413 and 414 and lens elements 415, 416, 418 and 420 to allow ions to pass between ion guides or to trap ions in ion guides with gated release into adjacent ion guides or the downstream mass to charge analyzer.

Linear Trap Quadrupole Mass to Charge Analyzers

Figure 32:
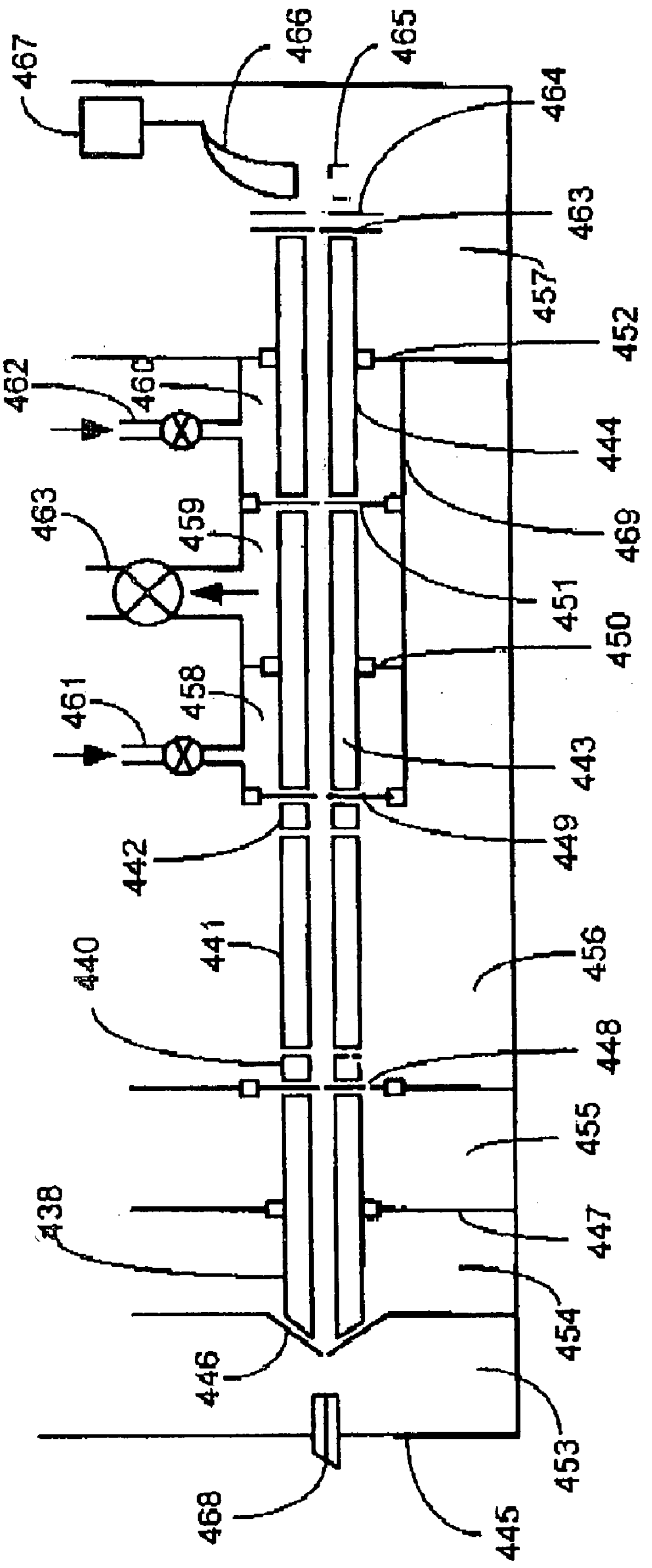
FIG. 32 illustrates multiple ion guide assemblies configured in a five vacuum stage system, including a collision cell assembly comprising three variable pressure regions, wherein the last quadrupole ion guide can be operated in RF/DC scanning mode or can be operated as a linear ion trap with mass selective axial ejection.

A alternative embodiment for a triple quadrupole is shown in FIG. 32 wherein quadrupole ion guide 444 can be operated in RF/DC scanning mode or can be operated as a linear ion trap with mass selective axial ejection. Linear ion trap mass selective axial ejection operation in a conventionally configured triple quadrupole is described in U.S. Pat. No. 6,177,668 B1 and in Hager et. al. Rapid Commun. Mass Spectrom. 2003; 17: 1056–1064. The embodiment shown in FIG. 32 comprises a five vacuum stage system with non variable pumping speed vacuum stages 453, 454, 455, 456 and 457 and one variable pumping speed vacuum port 463 configured in collision cell assembly 469. Ions entering vacuum through capillary orifice 468 vacuum configured with a vacuum seal in partition 445 pass through vacuum stage 453 and skimmer 446 into ion guide 440. Ion guide 438 extends through vacuum stages 454 and 455 and vacuum partition junction 447 and directs ions into ion guides 440, 441 and 442 through electrostatic lens and vacuum partition element 448. Quadrupole 441 with entrance and exit RF only or Brubaker sections 440 and 442 respectively, operates in a low vacuum region allowing efficient RF/DC ion mass to charge selection. Mass selected ions are directed from ion guide 441 through segment 442 and electrostatic lens and gas conductance limit element 449 into ion guide 443 configured in collision cell assembly 469. Collision cell assembly 469 comprises three variable pressure regions 458, 459 and 460 with junction 450 and lens element 451 serving as gas conductance limit partitions between regions. Ion guide 443 extends through regions 458 and 459 and a pressure gradient can be maintained along its length by control of gas flow through gas inlet 461 and vacuum pumping speed through vacuum pumping port 463.

MS or $MS^n$ can be performed with the embodiment shown in FIG. 32. For example $MS^3$ can be performed in this embodiment with axial acceleration fragmentation of selected parent ions in ion guide 443. First generation ion fragmentation is followed by mass to charge selection of one or more fragment ion species in ion guide 443 with resonant frequency ejection or other methods as described above. Selected first generation fragment ions are then axially accelerated into ion guide 469 where they are trapped and mass analyzer with mass selective axial ejection through exit lens 463, lens 464 and detected with electron multiplier 446 configured with conversion dynode 465 and data acquisition system 467. This two axial acceleration ion fragmentation $MS^3$ function can be run with a continuous ion beam or with trapping and release of ions in one or more ion guide. The pressures maintained in collision cell regions 548, 459 and 460 during operation may be adjusted to optimize performance for each MS or $MS^n$ operating mode. The pressure gradient maintained along the length of ion guide 444 allows collisional damping of ion energies particularly in ion trapping mode in the entrance region of ion guide 444 while enabling collision free scanning of ions from the exit end through exit lens 463. Collisional damping of ion translational energy decouples the scanning or mass selection processes conducted in ion guide 444 from upstream mass to charge selection and ion fragmentation steps that can result in increased ion beam energy spread or variable phase space conditions. Two ion guides extending into collision cell assembly 469, multiple variable pressure regions in collision cell assembly 469, the ability to trap ions with gated release in any ion guide 440, 442, 443 and 444 and the ability to conduct multiple ion fragmentation, mass to charge selection and scanning functions in ion guides 443 and 444 allows improved MS and MS/$MS^n$ performance with increased analytical capability compared with conventional triple quadrupole configurations and operation. Linear ion trap with mass selective axial ejection can be performed using ion guide 444 to improve sensitivity in some triple quadrupole operating modes. The entrance and exit ends of collision cell assembly 469 are located in different vacuum pumping stages allowing separate optimization of operating vacuum pressure in each vacuum stage during MS and MS/$MS^n$ operation.

Figure 33:
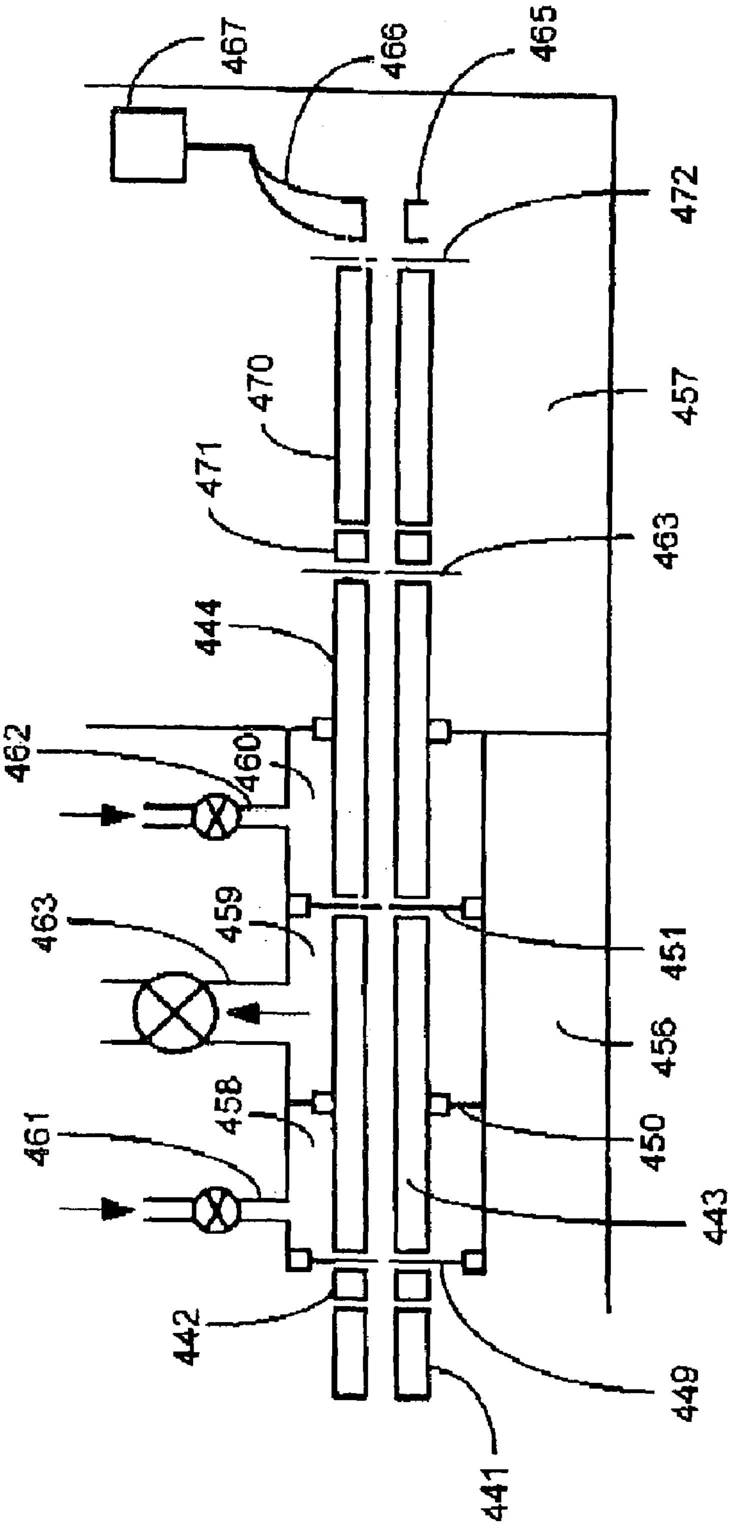
FIG. 33 illustrates an alternative embodiment of the invention configured with an additional quadrupole ion guide located downstream of the collision cell assembly, where the additional quadrupole ion guide can be operated in RF/DC scanning mode or as a linear ion trap with mass selective axial ejection.

An alternative embodiment of the invention is shown in FIG. 33 wherein an additional quadrupole ion guide 470 has been configured downstream of ion guide 444. Quadrupole ion guide 470 with RF only or Brubaker section 471 is operated in a low vacuum region where RF/DC ion mass to charge selection or scanning can be conducted with minimum ion loss due to collisional scattering. Quadrupole ion guide 470 can be operated in RF/DC scanning mode or operated as a linear ion trap with mass selective axial ejection. Ion guide 444 may also be operated in RF/DC or mass selective axial ejection mode to minimize the ion population directed into ion guide 470 when operated in trapping mode. By directing only those ions or mass range of interest into linear trap ion guide 470, minimum space charge occurs allowing more consistent analytical conditions and higher mass analysis performance over a wide range of MS and $MS^n$ functions and samples types. Scan speeds may also be increased using 470 as no pressure gradient is maintained over its length allowing ions to travel more rapidly through quadrupole 470.

Additional Alternative Embodiments

Different ion sources can be configured with the hybrid multiple quadrupole ion guide TOF hybrid instrument. Even ion sources which operate in vacuum or partial vacuum can be configured with multipole ion guides operating at higher background vacuum pressures. With ion sources that operate in vacuum, gas may be added to the vacuum region containing the multipole ion guide to operate in higher pressure m/z selection and ion fragmentation modes.

The invention can be applied to variations of TOF mass analyzer geometries. For example, the TOF mass analyzer may be configured with an in line pulsing region, a multiple stage or curved field ion reflector or a discrete dynode multiplier.

In alternative embodiments, the ion guides may be curved or straight, or a combination of either. The portions of segmented multipole ion guides or individual multipole ion guides located in a higher pressure vacuum regions can also be configured to operate in ion transfer, ion trapping and any of the CID ion fragmentation modes described above as well as in m/z scanning or m/z selection mode or combinations of these individual operating modes. The CID ion fragmentation, ion mass to charge selection, and MS/$MS^n$ methods described in the embodiments of the invention can be extended to alternative embodiments of the invention. In one such alternative embodiment of the invention, the last mass analysis step of any MS or MS/$MS^n$ sequence is performed by a quadrupole ion guide.

Although the invention has been described in terms of specific preferred embodiments, it will be obvious and understood to one of ordinary skill in the art that various modifications and substitutions are included within the scope of the inventions as described herein. In particular other types of mass analyzers including but not limited to conventional quadrupole, magnetic sector, Fourier Transform three dimensional ion traps and Time of Flight mass analyzers can be configured with embodiments of the invention as described herein. Any type of ion source including but not limited to the atmospheric pressure ion sources described herein and the ion sources that produce ions in vacuum listed in the above description can also be interfaced with embodiments of the invention described herein. In addition, various references relevant to the disclosure of the present application cited above are hereby incorporated herein by reference.

We claim:

1. An apparatus for analyzing chemical species, comprising:

an ion source for operation at substantially atmospheric pressure to produce ions from a sample substance;

at least one vacuum stage having means for pumping away gas to produce a partial vacuum;

means for delivering said ions from said ion source into one of said at least one vacuum stage;

a collision cell configured in at least one of said at least one vacuum stage such that said ions may be directed into said collision cell, wherein said collision cell comprises at least one higher neutral gas pressure region, in which the neutral gas is controllably elevated to be higher than in other vacuum regions proximal to said collision cell, such that collisions between said ions and neutral gas molecules occur within said higher neutral gas pressure region while such collisions essentially do not occur within other vacuum regions proximal to said collision cell;

a detector configured in one of said at least one vacuum stage;

at least two multipole ion guide segments, each of said multipole ion guide segments having a plurality of poles, wherein at least a portion of each of said at least two multipole ion guide segments is positioned within said collision cell; and independent RF frequency and DC voltage sources applied to each of said at least two multipole ion guide segments, wherein said RF frequency and DC voltages applied to each of said at least two multipole ion guide segments are controlled independently of each other.

2. An apparatus according to claim 1, further comprising means for conducting mass to charge selection in at least one of said multipole ion guide segments.

3. An apparatus according to claim 2, further comprising means for conducting collisional induced dissociation ion fragmentation in at least one of said multipole ion guide segments.

4. An apparatus according to claim 1, further comprising means for conducting mass to charge selection in at least one of said multipole ion guide segments, and means for conducting collisional induced dissociation ion fragmentation in at least one of said multipole ion guide segments.

5. An apparatus according to claim 1, further comprising a mass analyzer in one of said at least one vacuum stage.

6. An apparatus according to claim 5, further comprising means for conducting mass to charge selection in at least one of said multipole ion guide segments.

7. An apparatus according to claim 5, further comprising means for conducting collisional induced dissociation ion fragmentation in at least one of said multipole ion guide segments.

8. An apparatus according to claim 5, further comprising means for conducting mass to charge selection in at least one of said multipole ion guide segments, and means for conducting collisional induced dissociation ion fragmentation in at least one of said multipole ion guide segments.

9. An apparatus according to claim 1, 2, 3, 4, 5, 6, 7 or 8, wherein a portion of at least one of said multipole ion guide segments extends outside said collision cell.

10. An apparatus according to claim 9, wherein any of said multipole ion guide segments that extend outside said collision cell is configured to substantially impede the conductance of gas out from said collision cell.

11. An apparatus according to claim 1, 2, 3, 4, 5, 6, 7 or 8, wherein said at least two multipole ion guide segments are configured in series along a common centerline wherein said ions can be transferred from one multipole ion guide segment to the next.

12. An apparatus according to claim 1, 2, 3, 4, 5, 6, 7 or 8, wherein said ion source is an Electrospray ion source.

13. An apparatus according to claim 1, 2, 3, 4, 5, 6, 7 or 8, wherein said ion source is an Atmospheric Pressure Chemical Ionization ion source.

14. An apparatus according to claim 1, 2, 3, 4, 5, 6, 7 or 8, wherein said ion source is an Inductively Coupled Plasma ion source.

15. An apparatus according to claim 1, 2, 3, 4, 5, 6, 7 or 8, wherein said ion source is a Glow Discharge ion source.

16. An apparatus according to claim 1, 2, 3, 4, 5, 6, 7 or 8, wherein at least one of said multipole ion guide segments is a quadrupole.

17. An apparatus according to claim 1, 2, 3, 4, 5, 6, 7 or 8, wherein at least one of said multipole ion guide segments is a hexapole.

18. An apparatus according to claim 1, 2, 3, 4, 5, 6, 7 or 8, wherein at least one of said multipole ion guide segments is a octapole.

19. An apparatus according to claim 1, 2, 3, 4, 5, 6, 7 or 8, wherein at least one of said multipole ion guide segments has more than eight poles.

20. An apparatus according to claim 5, 6, 7 or 8, wherein said mass analyzer is a quadrupole mass spectrometer.

21. An apparatus according to claim 5, 6, 7 or 8, wherein said mass analyzer is a quadrupole mass analyzer.

22. An apparatus according to claim 5, 6, 7 or 8, wherein said at least two multipole ion guides are configured with said mass analyzer to form a triple quadrupole mass analyzer.

23. An apparatus according to claim 5, 6, 7 or 8, wherein said mass analyzer is a magnetic sector mass spectrometer.

24. An apparatus according to claim 5, 6, 7 or 8, wherein said mass analyzer is a Fourier Transform mass spectrometer.

25. An apparatus according to claim 5, 6, 7 or 8, wherein said mass analyzer is a ion trap mass spectrometer.

26. An apparatus according to claim 5, 6, 7 or 8, wherein said mass analyzer is a Time-Of-Flight mass spectrometer.

27. An apparatus according to claim 5, 6, 7 or 8, wherein said mass analyzer is a Time-Of-Flight mass spectrometer configured with orthogonal pulsing.

28. An apparatus according to claim 5, 6, 7 or 8, wherein said mass analyzer is a Time-Of-Flight mass spectrometer configured with linear pulsing.

29. An apparatus according to claim 5, 6, 7 or 8, wherein said mass analyzer is a Time-Of-Flight mass spectrometer comprising an ion reflector.

* * * * *